United States Patent
Nishiyama et al.

[11] Patent Number: 6,007,737
[45] Date of Patent: Dec. 28, 1999

[54] LIQUID CRYSTAL COMPOSITIONS

[75] Inventors: Shinichi Nishiyama; Yuichirou Tatsuki; Takahiro Fujiyama; Chiho Hirano; Hideo Hama; Tohru Yamanaka, all of Sodegaura, Japan

[73] Assignee: Mitsui Chemicals, Inc., Tokyo, Japan

[21] Appl. No.: 08/952,732

[22] PCT Filed: May 31, 1996

[86] PCT No.: PCT/JP96/01478

§ 371 Date: Nov. 25, 1997

§ 102(e) Date: Nov. 25, 1997

[87] PCT Pub. No.: WO96/38513

PCT Pub. Date: Dec. 5, 1996

[30] Foreign Application Priority Data

Jun. 1, 1995 [JP] Japan .................................. 7-135211
Aug. 25, 1995 [JP] Japan .................................. 7-217833
Aug. 31, 1995 [JP] Japan .................................. 7-246812

[51] Int. Cl.$^6$ .......................... C09K 19/52; C09K 19/32; C09K 19/20
[52] U.S. Cl. ............................. 252/299.01; 252/299.61; 252/299.62; 252/299.63; 252/299.64; 252/299.65; 252/299.66; 252/299.67
[58] Field of Search .................. 252/299.01, 299.61, 252/299.62, 299.63, 299.64, 299.65, 299.66, 299.67

[56] References Cited

U.S. PATENT DOCUMENTS

| | | | |
|---|---|---|---|
| 5,346,646 | 9/1994 | Kawabata et al. | 252/299.62 |
| 5,352,379 | 10/1994 | Nishiyama et al. | 252/299.62 |
| 5,393,460 | 2/1995 | Okabe et al. | 252/299.65 |
| 5,422,039 | 6/1995 | Kawabata et al. | 252/299.62 |
| 5,534,190 | 7/1996 | Johno et al. | 252/299.65 |
| 5,705,094 | 1/1998 | Takeuchi et al. | 252/299.01 |

FOREIGN PATENT DOCUMENTS 6-186518 7/1994 Japan .
6-194626 7/1994 Japan .
6-329591 11/1994 Japan .

Primary Examiner—Shean C. Wu
Attorney, Agent, or Firm—Sherman and Shalloway

[57] ABSTRACT

The first smectic liquid crystal composition of the invention has a voltage gradation parameter L of less than 0.6, said parameter being defined by the equation $L=S_H/S_O$ with the proviso that: a liquid crystal cell filled with a liquid crystal composition is placed between a pair of polarizing plates arranged in the crossed Nicols state; a voltage is applied to the liquid crystal cell to form a hysteresis curve showing a correlation between the voltage and a transmittance; and a tangent line $I_R$ of the hysteresis curve within a region wherein the transmittance steeply increases intersects a tangent line $I_F$ of the hysteresis curve within a region which is adjacent to the voltage-steep increase region and which is on the higher-voltage side at an intersection point P. In the above equation, $S_O$ is an area of a rectangular triangle having as an oblique side a straight line PQ which has, as both ends, the intersection point P and an intersection point Q of an axis of ordinate (V=0) and the hysteresis curve; and $S_H$ is an area of a region enclosed with the straight line PQ, the hysteresis curve and a constant-voltage straight line which passes the intersection point P. The second liquid crystal composition of the invention has a parameter G of 0 to 0.3, said parameter G being defined by the following equation with the proviso that when an absolute value $|V|$ of a voltage V applied in the same manner as described above is increased to the predetermined value $|V|_{min}$, the light quantity T becomes a maximum value $T_{max}$;

$$G = \frac{T_{max}/2 - T_{min}}{T_{max}/2 - T_0} \times \frac{S}{(T_{max} - T_{min}) \times |V|_{min}}.$$

In the above equation, S is an area of a region enclosed with the hysteresis curve, $T_{min}$ is a minimum value of the transmittance; and $T_0$ is a transmittance given when no voltage is applied.

17 Claims, 35 Drawing Sheets

V = 0
ANTIFERROELECTRIC LIQUID CRYSTAL STATE

LIQUID CRYSTAL COMPOSITIONS

TECHNICAL FIELD

The present invention relates to ferroelectric or antiferroelectric liquid crystal compositions, further smectic liquid crystal compositions, and particularly liquid crystal compositions favorably used for an active matrix driving system. More particularly, the invention relates to liquid crystal compositions which impart voltage gradation (gradation given by variation of voltage) properties to liquid crystal elements.

BACKGROUND ART

Attempts to use liquid crystal elements which utilize electrooptic effect of a twisted nematic (TN) liquid crystal phase (referred to as "TN liquid crystal elements" hereinafter) as display elements of display devices for transient images of moving objects (moving images) have been heretofore made.

The TN liquid crystal elements includes a liquid crystal cell wherein a liquid crystal material capable of exhibiting a twisted nematic (TN) liquid crystal phase (said cell being referred to as "TN liquid crystal cell" hereinafter) is filled in a cell gap.

Most of the recent TN liquid crystal cells used in full color display devices for moving images are driven on an active matrix driving system utilizing TFT (thin film transistor) or MIM (metal insulator metal).

The TN liquid crystal elements having such liquid crystal cells as mentioned above can display images of excellent gradation property, so that they are favorably used for displaying full color images. The term "gradation property" means such a property that brightness intensities between the maximum brightness (white) and the minimum brightness (black) can be stepwise discriminated. For example, by the term "16-gradation" is meant that the brightness of 16 steps can be discriminated from each other between the maximum brightness and the minimum brightness. As the number of the discriminating brightness steps increases, the gradation property becomes better.

The TN liquid crystal elements, however, have a long (slow) electrooptic response time of several tens seconds. Therefore, the display devices using the TN liquid crystal elements cannot follow images of quick motions. Further, the range of the angle at which an image displayed using the TN liquid crystal element is visible is narrow, and when the images displayed by the TN liquid crystal element is observed with an angle outside of a particular range of angle, a problem of the image with reversed gradation or a problem of change in hue of the image takes place.

When the display elements as mentioned above are driven on the active matrix system, the frame frequency in the image display can be set at, for example, not less than 60 Hz, but the electrooptic switching time generally becomes at least several tens msec and occasionally becomes about 200 msec. Therefore, it is difficult to smoothly display moving images by means of the display devices for moving images using the TN liquid crystal elements.

In contrast therewith, liquid crystal elements utilizing electrooptic effect of a ferroelectric liquid crystal phase (referred to as "ferroelectric liquid crystal elements" hereinafter) and liquid crystal elements utilizing electrooptic effect of an antiferroelectric liquid crystal phase (referred to as "antiferroelectric liquid crystal elements" hereinafter) have extremely shorter electrooptic response time than that of the TN liquid crystal elements, and these elements have an advantage in that the range of an angle at which an Image displayed by the elements is visible is wide.

The ferroelectric liquid crystal phase reveals layer structures shown in, for example, FIG. 47(a) to FIG. 47(c).

FIG. 47(a) schematically illustrates an orientation state of liquid crystal molecules 101 which form an antiferroelectric liquid crystal phase between electrodes 102 and 102' provided on respective substrates 106 and 106' of a liquid crystal cell. In general, the electrode 102 and the electrode 102' are formed on one surface of the substrate 106 and one surface of the substrate 106', respectively. When the liquid crystal molecules 101 are orientated, the major axes of the liquid crystal molecules 101 are substantially parallel to the electrodes 102, 102', and the liquid crystal molecule major axes which are parallel to each other gather to form liquid crystal layers 103 perpendicular to the electrodes 102, 102'. When an orientation film (not shown) to control orientation directions of the liquid crystal molecules 101 is provided on the surface of one or both of the electrodes 102, 102', the liquid crystal layers 103 are in contact with the orientation film(s) with keeping a state as shown in FIG. 47(b) or FIG. 47(c). That is, the major axes of the liquid crystal molecules 101 which form the liquid crystal layers 103 have fixed tilt angles to a line which is perpendicular to the boundaries between the adjacent liquid crystal layers 103. The direction of spontaneous polarization of each liquid crystal molecule 101 is perpendicular to the surfaces of the electrodes 102, 102', however, the direction of the spontaneous polarization 104 shown in FIG. 47(b) and the direction of the spontaneous polarization 105 shown in FIG. 47(c) are opposite to each other. The orientation states of the liquid crystal molecules shown in FIG. 47(b) and FIG. 47(c) are both stable.

The ferroelectric liquid crystal element has two kinds of electrooptically stable states corresponding to the orientation states of the liquid crystal molecules shown in FIG. 47(b) and FIG. 47(c).

This has been reported by Clerk, et al., and they have proposed use of the ferroelectric liquid crystal elements as display devices.

As for the ferroelectric liquid crystal element, when a pulse voltage having a pulse width of several tens μsec is applied between the electrodes 102, 102' of the liquid crystal cell, one of the bistable states shown in FIG. 47(b) and FIG. 47(c) is selected to modulate the light. The state thus selected is maintained even after application of voltage is stopped. Accordingly, the ferroelectric liquid crystal element has a capacity for memorizing use.

When a direct voltage is applied between the electrodes 102, 102' of the liquid crystal cell, the ferroelectric liquid crystal element does not show a clear threshold value in the voltage-light quantity correlation, but when a pulse voltage is applied, the ferroelectric liquid crystal element not only shows a clear threshold value in the voltage-light quantity correlation but also has a capacity for memorizing use. For this reason, driving of the liquid crystal cell of the ferroelectric liquid crystal element on a simple matrix system has been studied.

Differently from the ferroelectric liquid crystal element, the antiferroelectric liquid crystal element found by Chandany, et al. (Jpn. J. Appl. Phys., 28, L1261, 1989) includes a liquid crystal cell wherein a liquid crystal material capable of exhibiting an antiferroelectric liquid crystal phase (referred to as "antiferroelectric liquid crystal material" hereinafter) is filled in the cell gap.

As for the antiferroelectric liquid crystal element, the antiferroelectric liquid crystal material filled in the cell gap of the liquid crystal cell is in an antiferroelectric liquid crystal phase when the antiferroelectric liquid crystal element is electrooptically changed.

The antiferroelectric liquid crystal phase reveals layer structures shown in FIG. 48(a) to FIG. 48(d).

The orientation state of the liquid crystal molecules 201 shown in FIG. 48(a) is the same as that of the liquid crystal molecules 101 shown in FIG. 47(a); the orientation state of the liquid crystal molecules 201 shown in FIG. 48(b) is the same as that of the liquid crystal molecules 101 shown in FIG. 47(b); and the orientation state of the liquid crystal molecules 201 shown in FIG. 48(d) is the same as that of the liquid crystal molecules 101 shown in FIG. 47(c).

In the antiferroelectric liquid crystal state shown in FIG. 48(c), the directions of spontaneous polarization 104 of the liquid crystal molecules in one liquid crystal layer 103 and the directions of spontaneous polarization 105 of the liquid crystal molecules in the adjacent liquid crystal layer 103 are opposite to each other, and the intensity of the spontaneous polarization as a whole becomes zero.

If the electrodes 102, 102' of the liquid crystal cell are transparent electrodes and if a low-frequency triangular wave voltage of about 0.1 Hz is applied between the electrodes 102, 102', the quantity of the transmitted light released (output) from the antiferroelectric liquid crystal element forms a double hysteresis curve shown in FIG. 49. Besides, if a direct voltage is applied between the electrodes 102, 102', the antiferroelectric liquid crystal element shows a clear threshold value in the voltage-light quantity correlation. For these reasons, driving of the liquid crystal cell of the antiferroelectric liquid crystal element on a simple matrix system has been studied.

Since the above-mentioned ferroelectric liquid crystal element and antiferroelectric liquid crystal element have quick electrooptic response time, it is feasible to drive the liquid crystal cells of these elements on a simple matrix system to display moving images. Moreover, the range of the angle at which the image thus displayed is visible is extremely wider than that of an image displayed by the TN-liquid crystal element, so that the image displayed using the ferroelectric or antiferroelectric liquid crystal element hardly suffers lowering of contrast even if the image is observed obliquely, said lowering of contrast being a serious problem in the TN liquid crystal element.

The liquid crystal element utilizing electrooptic effect of the antiferroelectric liquid crystal phase (referred to as "antiferroelectric liquid crystal element" hereinafter) can electrooptically control brightness of the transmitted light and has an electrooptic switching time of several tens to several hundreds μsec, as described by Jono, et al. in "Jpn. J. Appl. Phys." Vol. 29, L107 (1990), and therefore electrooptic switching can be made at a higher speed than the TN liquid crystal element.

At the International Ferroelectric Liquid Crystal Conference (Tokyo) in 1993, Nippon Denso Co., Ltd. and Citizen Co., Ltd. exhibited trial manufactures of antiferroelectric liquid crystal elements which were able to be driven on a simple matrix system using the above-mentioned properties. The trial manufactures have proved that use of the hysteresis of the antiferroelectric liquid crystal makes it possible to drive a display element of multi-scanning line display system on a simple matrix system.

The liquid crystal cell of the antiferroelectric liquid crystal element can be driven on a simple matrix system to display an image having gradation as described above, but in the existing circumstances, it is difficult to obtain the gradation enough to form a good full color image.

That is, because the electrooptic response speed of the display device using the antiferroelectric liquid crystal element is insufficient, the frame frequency in the image display cannot be increased to 60 Hz or more, and therefore moving images of natural motion cannot be displayed. In case that the conventional antiferroelectric liquid crystal element is driven on an active matrix system, if a voltage is applied between the electrodes of the liquid crystal cell, the quantity of the light output from the liquid crystal element having the liquid crystal cell (e.g., quantity of the polarized light in the given polarization direction) steeply varies at the voltage of a particular intensity (threshold voltage). Therefore, it has been hitherto considered that in the antiferroelectric liquid crystal element the mere electrooptic discrimination of the output light between the brightness and the darkness is basically possible and that the antiferroelectric liquid crystal element outputs only a light having two kinds of light quantities corresponding to the brightness and the darkness.

Japanese Patent Laid-Open Publication No. 194626/1994 proposes an antiferroelectric liquid crystal element having such a property that, in case that the liquid crystal cell of the element is driven on an active matrix system, if a voltage is applied between the electrodes 102, 102' of the liquid crystal cell, the light quantity varies correspondingly to the applied voltage to form a double hysteresis curve with small hysteresis width as shown in FIG. 50.

In such circumstances as mentioned above, the present inventors have further studied the smectic liquid crystal compositions, and as a result, have found that, if a liquid crystal element is made using a liquid crystal cell wherein a specific smectic liquid crystal composition is filled between electrodes and if a voltage is applied between the electrodes of the liquid crystal cell, the quantity of the polarized light output from the liquid crystal element in the given polarization direction varies continuously over a wide voltage range. The present inventors have also found that when the liquid crystal element having the above properties is used as a display element, an image of excellent gradation can be obtained by merely controlling the intensity of the voltage applied between the electrodes of the liquid crystal cell, and therefore the liquid crystal element is advantageously used for displaying moving images. Further, the present inventors have found that, in order to display an image of high gradation by driving the liquid crystal cell of the antiferroelectric liquid crystal element on an active matrix system, the small hysteresis is not necessarily sufficient, and additionally a specific parameter G defined below should be made as small as possible. The specific parameter G is defined by a maximum light quantity $T_{max}$ and a minimum light quantity $T_{min}$ of a light output from the antiferroelectric liquid crystal element, a light quantity $T_0$ of a light output from the antiferroelectric liquid crystal element when no voltage is applied between the electrodes of the liquid crystal cell, an area S enclosed with the double hysteresis curve formed when a positive or negative voltage is applied between the electrodes of the liquid crystal cell, and a minimum voltage $|V|_{min}$ at which the light quantity $T_{max}$ is obtained.

It is an object of the present invention to provide a smectic liquid crystal composition capable of imparting voltage gradation property to a liquid crystal element.

It is another object of the invention to provide a liquid crystal composition capable of imparting excellent voltage gradation property to a liquid crystal element.

It is a further object of the invention to provide a liquid crystal composition and a smectic liquid crystal composition by the use of which images of excellent gradation can be displayed when elements using the compositions are driven on an active matrix system.

It is a still further object of the invention to provide a liquid crystal element comprising any of the above liquid crystal compositions and a method of driving the element.

DISCLOSURE OF THE INVENTION

The first smectic liquid crystal composition according to the present invention is a liquid crystal composition having a voltage gradation parameter L of less than 0.6; said voltage gradation parameter L measured as follows. That is, the voltage gradation parameter L is defined by the following equation (A) with the proviso that:

(a) the smectic liquid crystal composition is filled and orientated between a pair of transparent electrodes of in a liquid crystal cell;

(b$_1$) a pair of polarization direction control means are arranged in the crossed Nicols state on both sides of the liquid crystal cell;

(b$_2$) said polarization direction control means and said liquid crystal cell are further arranged so that a light is transmitted by one of the polarization direction control means, the liquid crystal cell and the other of the polarization direction control means in this order;

(c) said polarization direction means and said liquid crystal cell are still further arranged so that the transmittance Tr of the light transmitted in the above order increases according to a voltage V applied between the pair of the electrodes; and (d) when a voltage V—light transmittance Tr correlation is measured to obtain a hysteresis curve formed between the voltage V and the light transmittance Tr, and a tangent line $I_R$ of the hysteresis curve within a region wherein the light transmittance Tr steeply increases in accordance with an increase of the voltage V is made to intersect a tangent line $I_F$ of the hysteresis curve within a region which is adjacent to the voltage-steep increase region on the higher-voltage side, at an intersection point P.

$$L = S_H / S_O \quad (A)$$

In this equation (A), $S_O$ is an area of a rectangular triangle having as an oblique side a straight line PQ which has, as both ends, the intersection point P and an intersection point Q of an axis of ordinate (V=0) and the hysteresis curve; and $S_H$ is an area of a region enclosed with the straight line PQ, the hysteresis curve within a region wherein the light transmittance Tr steeply increases, and a constant-voltage straight line which passes the intersection point P.

The first smectic liquid crystal composition of the invention preferably comprises an antiferroelectric liquid crystal compound represented by the following formula (I):

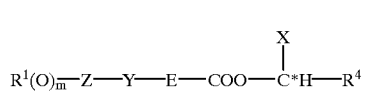
(I)

In the formula (I), Z is a group selected from the group consisting of

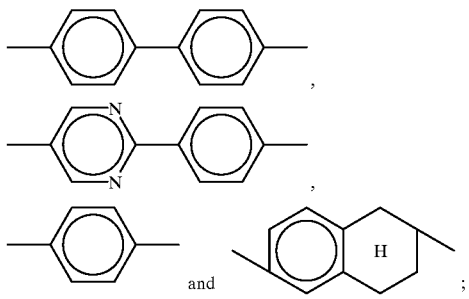

E is a group selected from the group consisting of

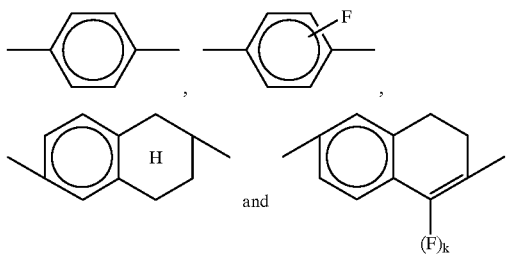

(k=0 or 1); and

R$^1$ is an alkyl group of 6 to 16 carbon atoms, with the proviso that hydrogen atom in the alkyl group may be substituted with halogen atom, a part of methylene groups and/or halomethylene groups in the alkyl group may be replaced with —O— group, and when methylene group and/or halomethylene group in the alkyl group are replaced with plural —O— groups, these plural —O— groups are not adjacent to each other.

R$^4$ is a straight-chain alkyl group having carbon atoms of an even number selected from 4, 6 and 8 or a group wherein one methylene group in said straight-chain alkyl group is replaced with —O— group.

X is a group selected from the group consisting of —CH$_3$ group, —CH$_2$F group, —CHF$_2$ group and —CF$_3$ group.

Y is a group selected from the group consisting of —COO—, —CH$_2$O—, —CH$_2$CH$_2$— and —OCH$_2$—.

m is 0 or an integer of 1.

K is 0 or a integer of 1.

The second liquid crystal composition according to the present invention is a liquid crystal composition having a parameter G of 0 to 0.3, which is measured as follows.

That is, the parameter G is defined by the following equation (B) with the proviso that: the liquid crystal composition is filled between a pair of transparent electrodes of a liquid crystal cell; two polarizing plates are arranged on the surfaces of the liquid crystal cell so that a polarized light output from one polarizing plate is transmitted by the liquid crystal cell and a polarized light having a polarization direction crossing that of the above polarized light at light angles is output from the other polarizing plate; and the liquid crystal cell is arranged so that the light quantity (T) of the light output from the other polarizing plate varies when a voltage V is applied between the transparent electrodes of the liquid crystal cell, to form a hysteresis curve which is substantially symmetrical with respect to the voltage of 0 (V=0) between a positive voltage region and a negative voltage region; and when the absolute value |V| of the voltage V is increased to the predetermined value $|V|_{min}$, the light quantity T becomes a maximum value $T_{max}$.

$$G = \frac{Tmax/2 - Tmin}{Tmax/2 - T_0} \times \frac{S}{(Tmax - Tmin) \times |V|min} \quad \text{(B)}$$

wherein $|V|_{min}$ and $T_{max}$ have the same meanings as described above; S is an area of a region enclosed with the V-T hysteresis curve shown in the positive or negative voltage region; $T_{min}$ is a minimum value of the light quantity T; and $T_0$ is a light quantity given when no voltage is applied.

The liquid crystal element using the liquid crystal composition of the invention includes a liquid crystal cell having a pair of substrates each of which is provided with a transparent electrode and containing the liquid crystal material (liquid crystal composition) of the above properties filled between the electrodes. This liquid crystal element exhibits gradation according to the intensity of a voltage applied between the electrodes.

Further, the gradation given by the liquid crystal element using the liquid crystal composition of the invention can be continuously or stepwise controlled by varying the intensity of the voltage applied between the transparent electrodes of the liquid crystal cell in the liquid crystal element.

BRIEF DESCRIPTION OF THE DRAWINGS

1: liquid crystal element, 10: liquid crystal cell, 11a, 11b: transparent substrate, 12a, 12b: transparent electrode, 13: smectic liquid crystal material, 14: cell gap, 15 spacer, 16: sealing material, 20: polarizing plate

Each of FIG. 7 to FIG. 12 graphically shows a hysteresis curve which is formed by a voltage applied between electrodes of a liquid crystal cell of a liquid crystal element and a transmittance of a light transmitted by the liquid crystal element, with the proviso that an example of the first smectic liquid crystal composition of the invention is filled between the electrodes of the liquid crystal cell.

Figure 13:
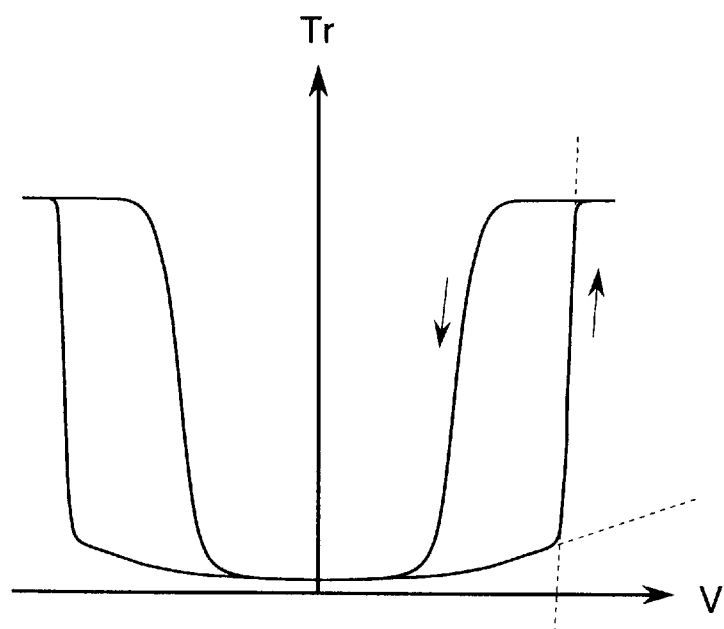

FIG. 13 graphically shows a hysteresis curve which is formed by a voltage applied between electrodes of a liquid crystal cell of an antiferroelectric liquid crystal element and a transmittance of a light transmitted by the antiferroelectric liquid crystal element, with the proviso that an antiferroelectric liquid crystal composition prepared for comparison is filled between the electrodes of the liquid crystal cell.

Each of FIG. 14 to FIG. 43 graphically shows a hysteresis curve which is formed by a voltage applied between electrodes of a liquid crystal cell of a liquid crystal element and a transmittance of a light transmitted by the liquid crystal element, with the proviso that an example of the first smectic liquid crystal composition of the invention is filled between the electrodes of the liquid crystal cell.

Figure 44:
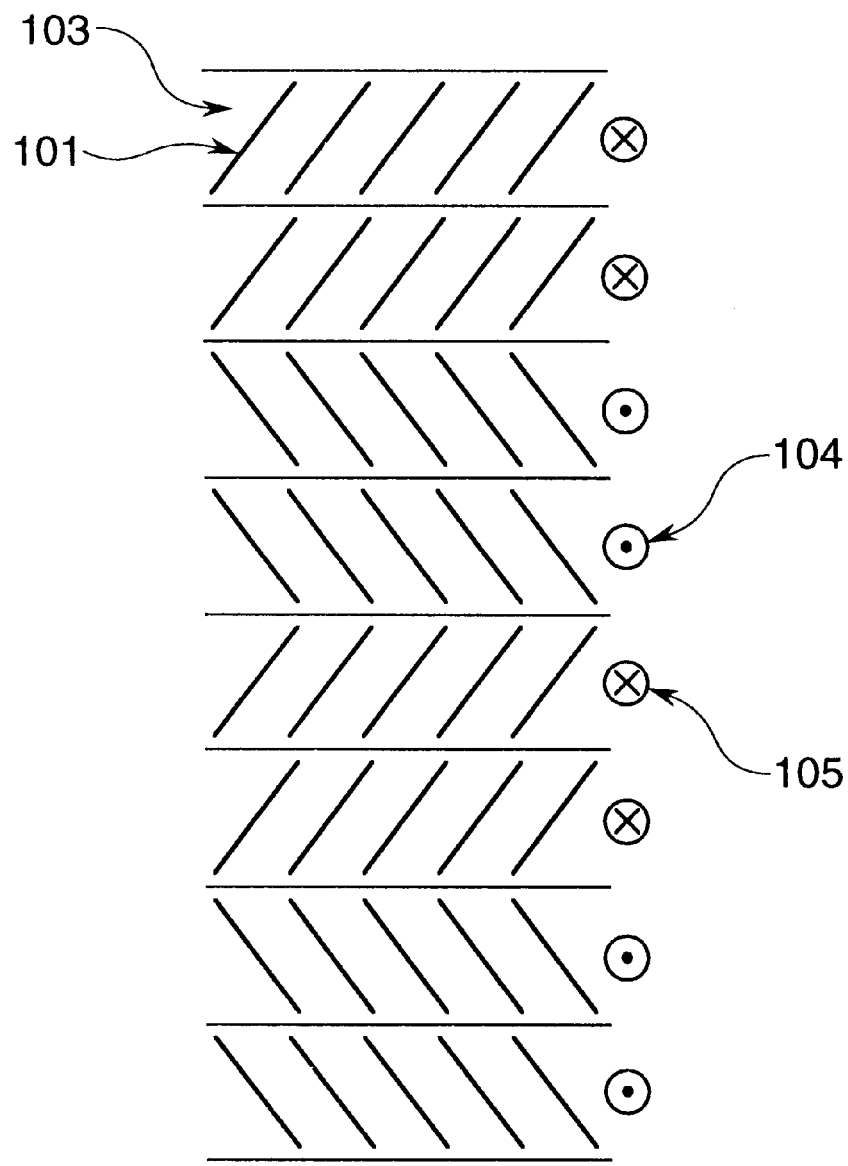

FIG. 44 is a drawing to explain an orientation state of liquid crystal molecules of the liquid crystal composition according to the present invention.

Figure 45:
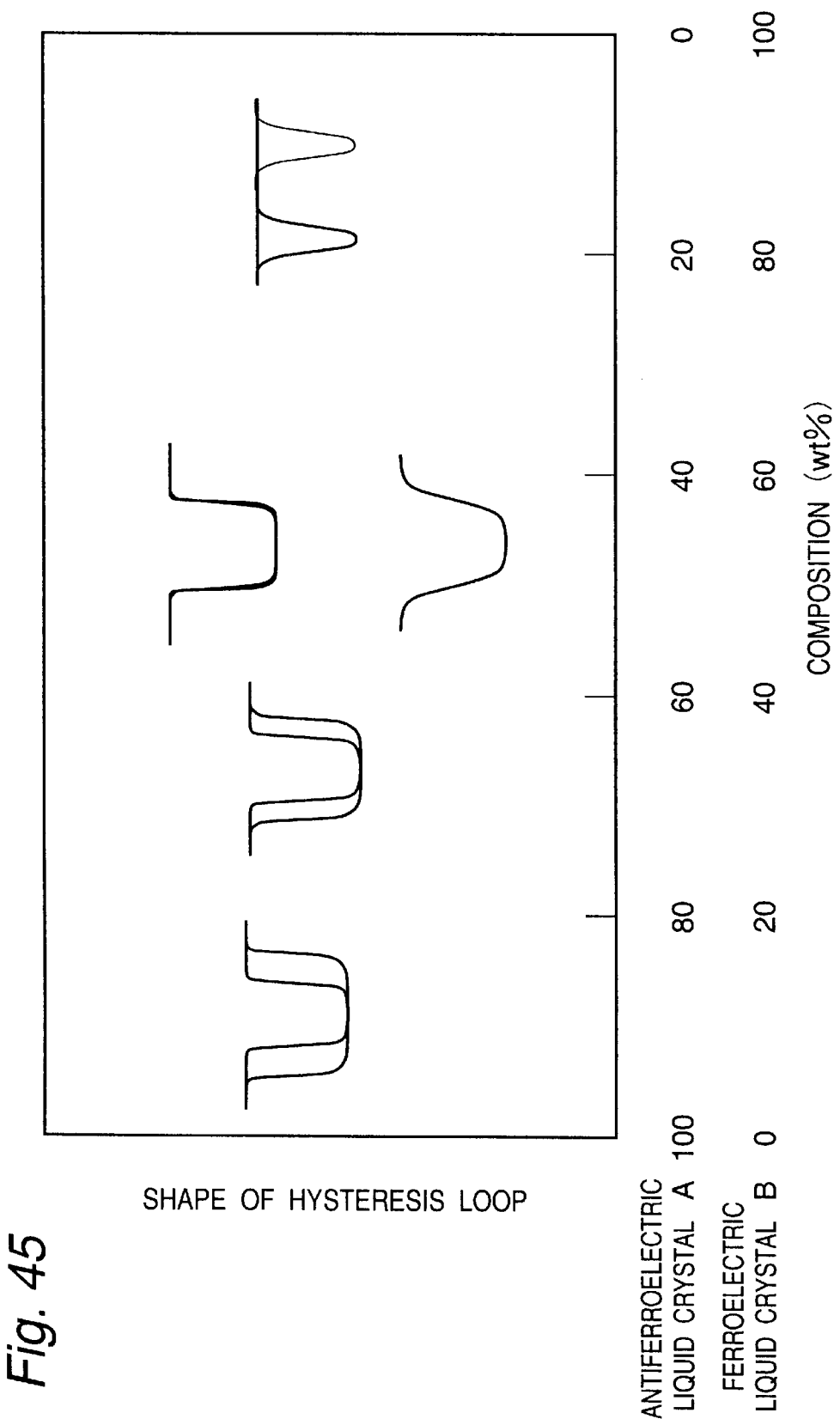

FIG. 45 shows a correlation between the quantity of an antiferroelectric liquid crystal compound in a mixture of an antiferroelectric liquid crystal compound and a ferroelectric liquid crystal compound used in the examples of the present invention, the quantity of a ferroelectric liquid crystal compound in the mixture, and the shape of hysteresis given by the quantity of a specific polarized light which is output from a liquid crystal element containing the mixture filled between electrodes of a liquid crystal cell in accordance with the voltage applied between the electrodes of the liquid crystal cell.

Figure 46:
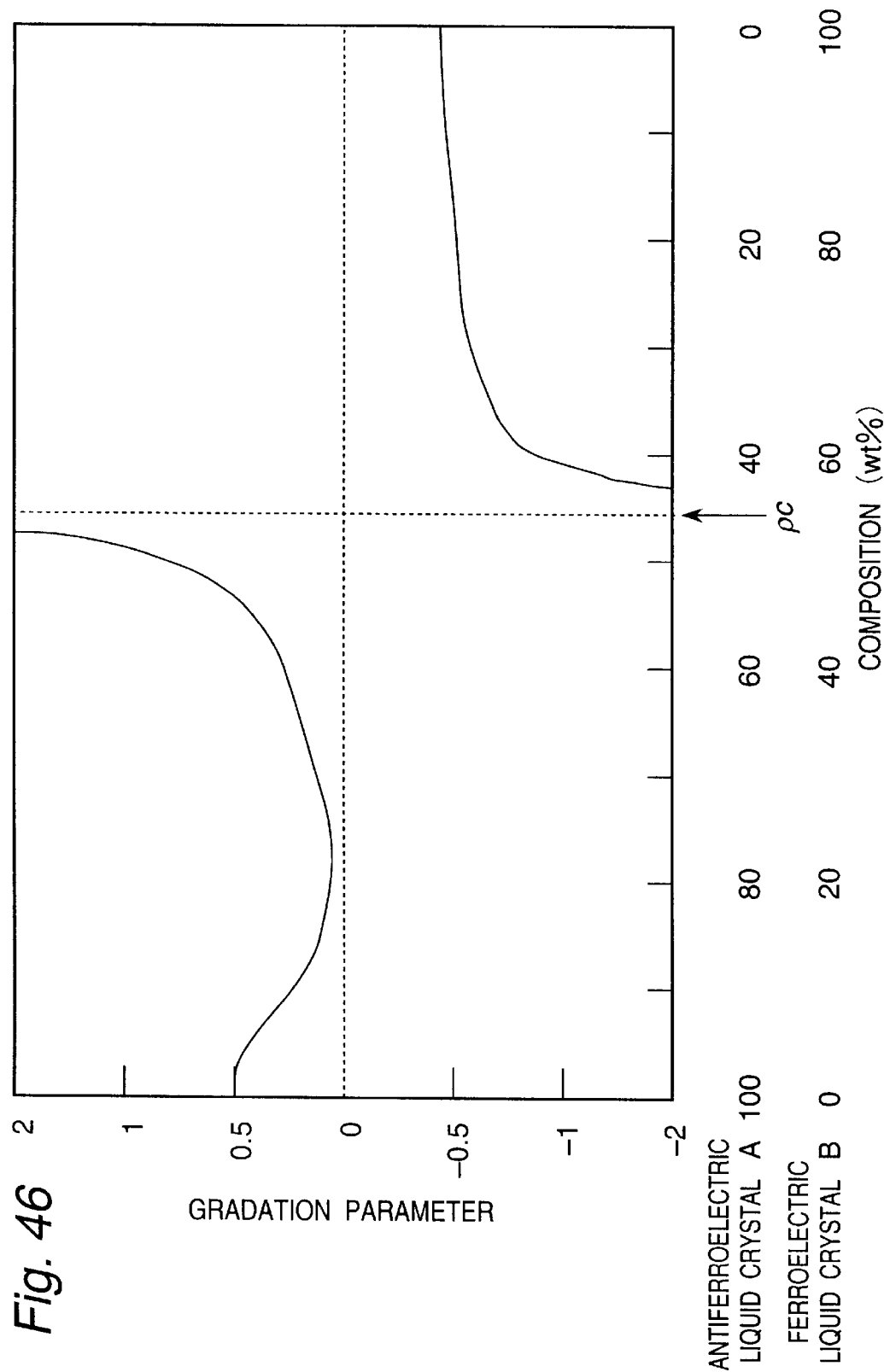

FIG. 46 shows a relationship between the quantity of an antiferoelectric liquid crystal compound in a mixture of an antiferroelectric liquid crystal compound and a ferroelectric liquid crystal compound used in the examples of the present invention, the quantity of a ferroelectric liquid crystal compound in the mixture, and the value of a parameter G for evaluating gradation of an image displayed by a liquid crystal element having a liquid crystal cell filled with the mixture.

Figure 47:
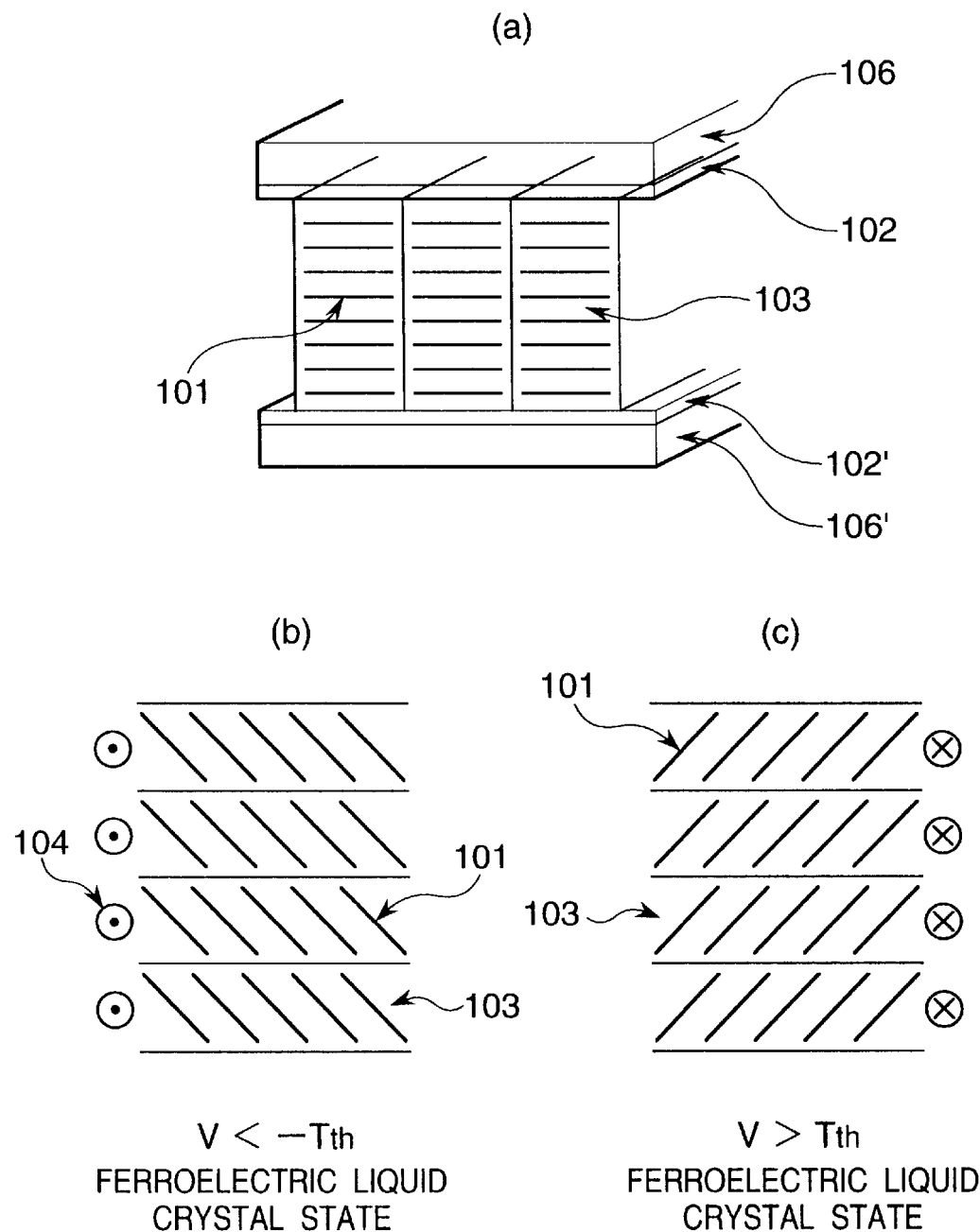

FIG. 47 is a drawing to explain an orientation state of a ferroelectric liquid crystal material in a liquid crystal cell.

Figure 48:
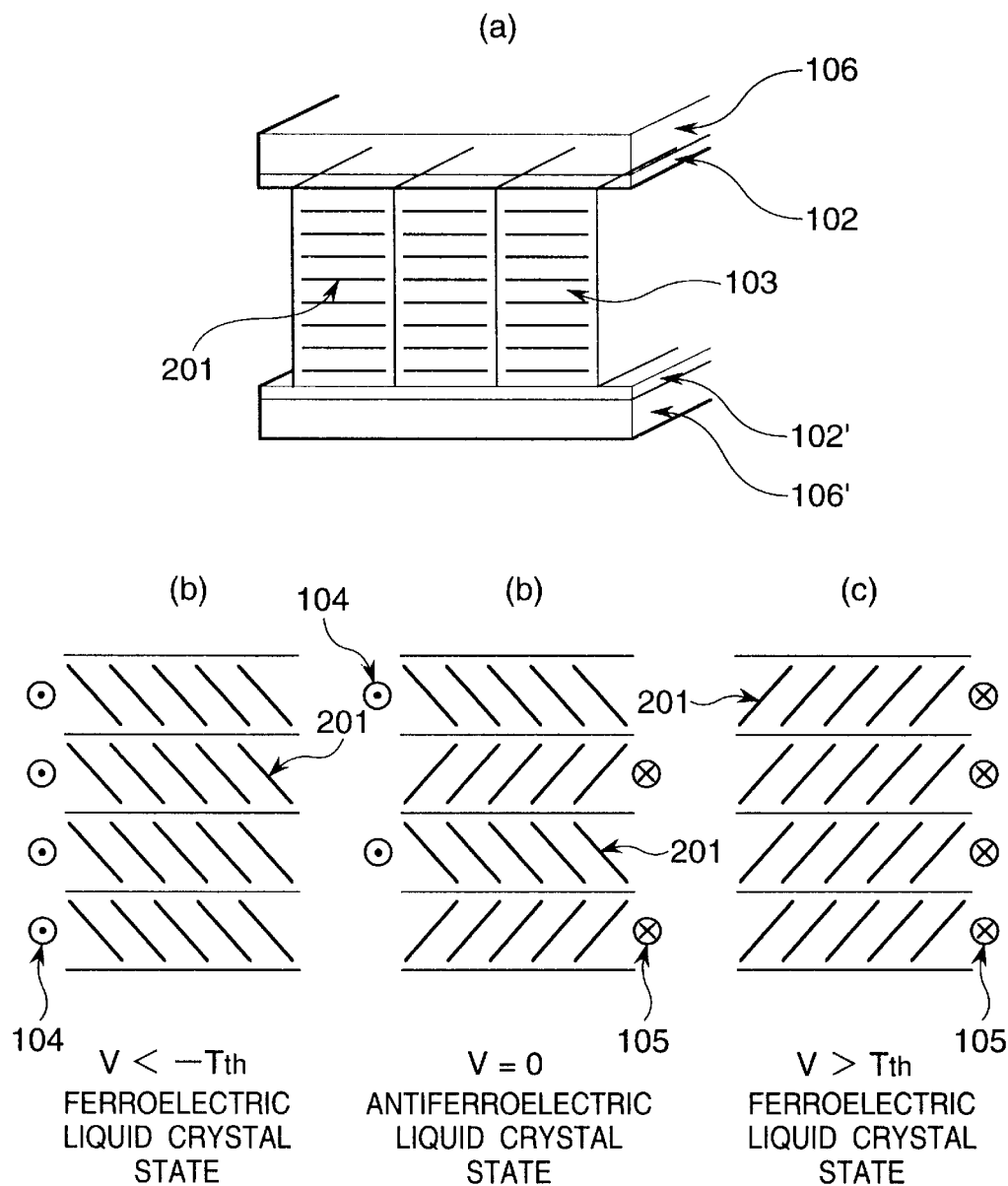

FIG. 48 is a drawing to explain an orientation state of a conventional antiferroelectric liquid crystal material in a liquid crystal cell.

Figure 49:
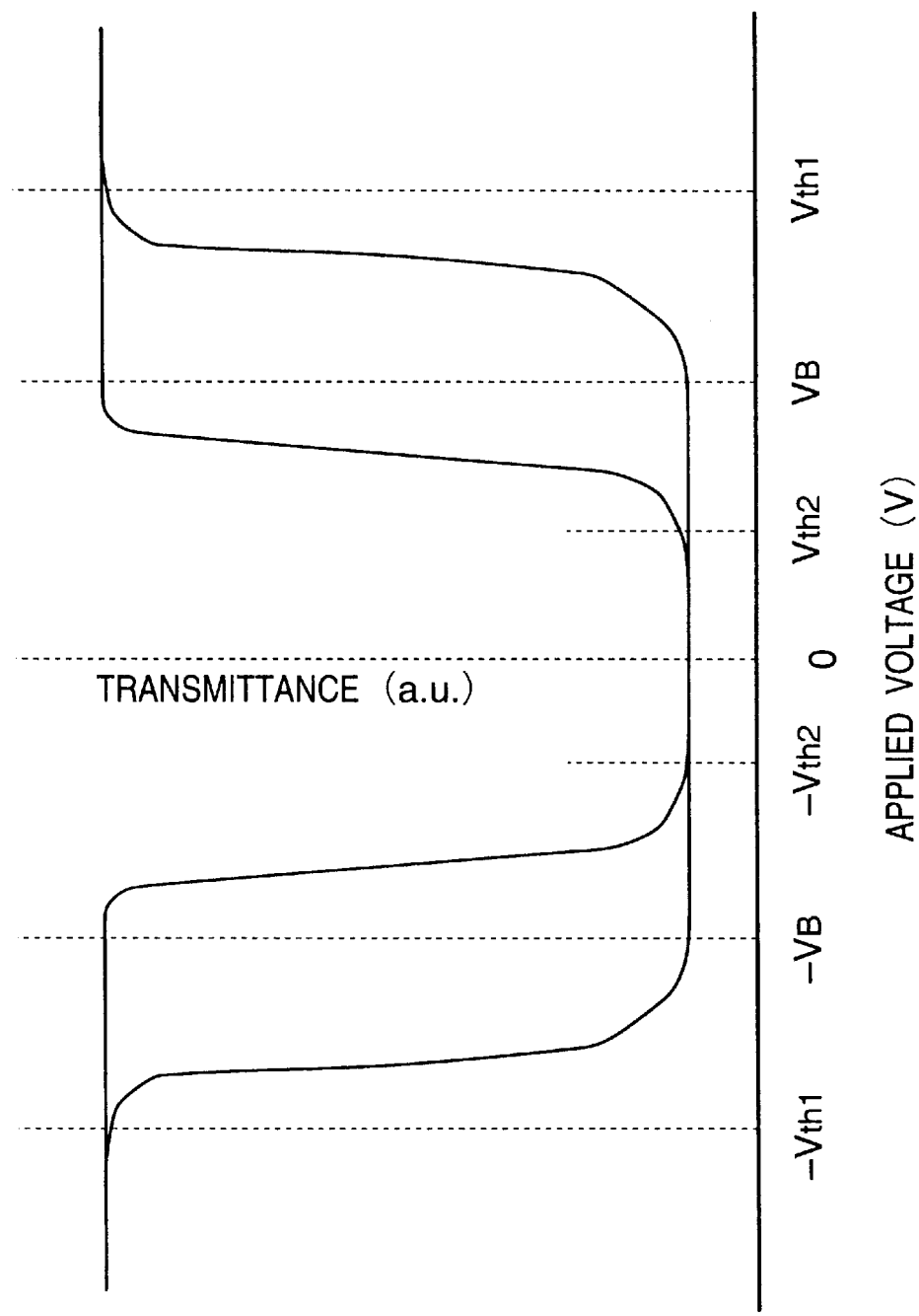

101, 201,: liquid crystal molecule, 102, 102': electrode, 103: liquid crystal layer, 104, 105: spontaneous polarization, 106, 106': substrate FIG. 49 shows a hysteresis curve formed by the quantity of a specific polarized light which is output from a liquid crystal element having a liquid crystal cell in accordance with a voltage applied between electrodes of the liquid crystal cell.

Figure 50:
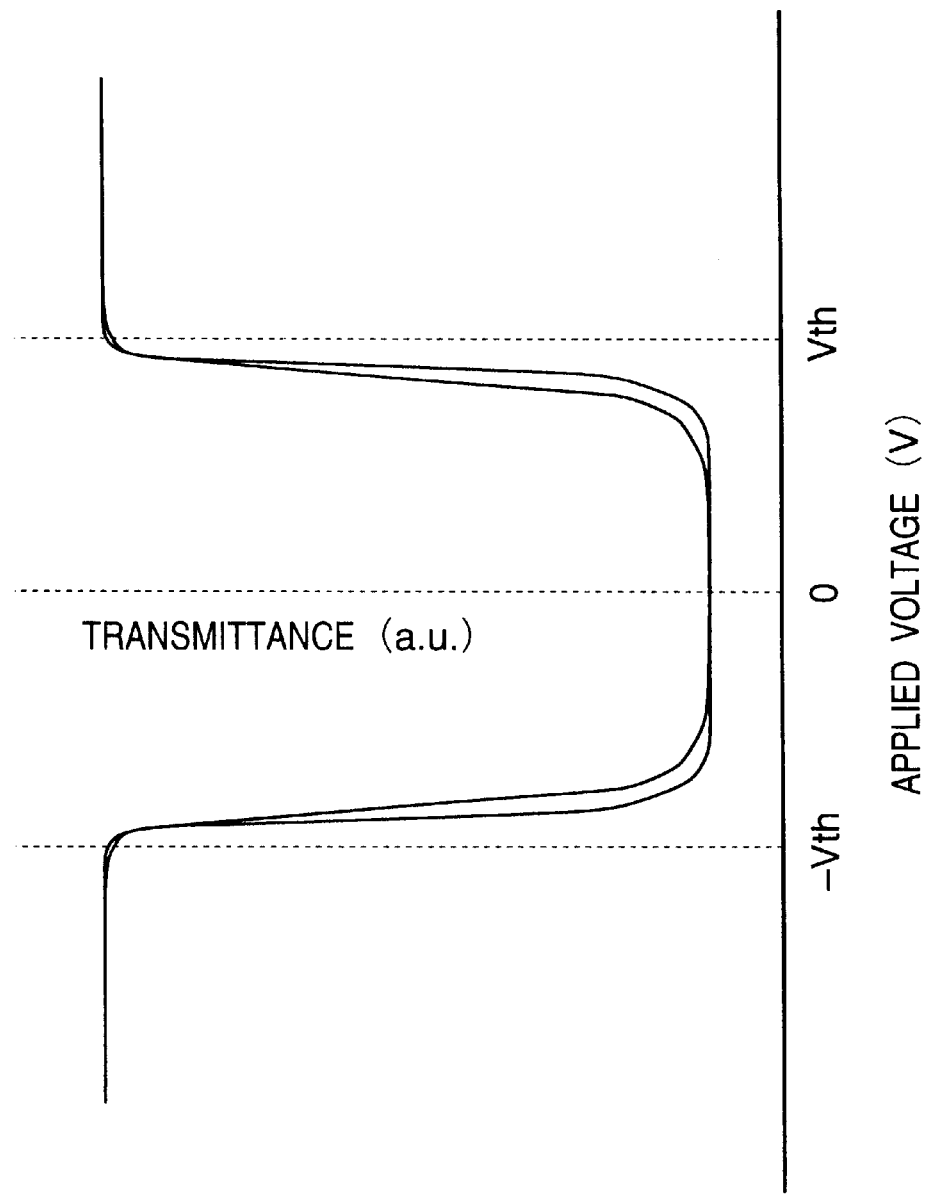

FIG. 50 shows an improved shape of the hysteresis curve shown in FIG. 49.

BEST MODE FOR CARRYING OUT THE INVENTION

Smectic Liquid Crystal Composition

First of all, the first smectic liquid crystal composition according to the invention is described in detail. The term "smectic liquid crystal composition" used herein means a composition capable of exhibiting a smectic liquid crystal phase.

The first smectic liquid crystal composition of the invention has a voltage gradation parameter L of less than 0.6.

The voltage gradation parameter L is measured and calculated in the following manner.

(a) The smectic liquid crystal composition is filled between a pair of transparent electrodes provided in a liquid crystal cell.

(b₁) A pair of polarization direction control means are arranged in the crossed Nicols state on both sides of the liquid crystal cell filled with the smectic liquid crystal composition.

(b₂) The liquid crystal cell and the polarization direction control means are further arranged so that a light is transmitted by one of the polarization direction control means, the liquid crystal cell and the other of the polarization direction control means in this order.

(c) The liquid crystal cell and the polarization direction control means are still further arranged so that, when a voltage V is applied between the pair of the transparent electrodes, the transmittance Tr of the light transmitted in the above order increases in accordance with an intensity of the voltage V.

Figure 5:
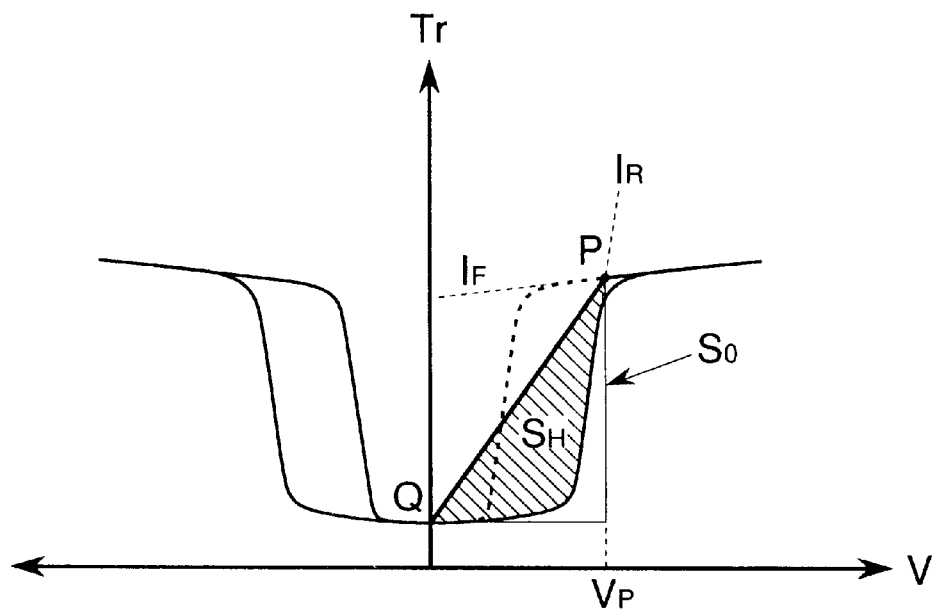
FIG. 5 is a drawing to explain a method of evaluating gradation property of a liquid crystal element.

(d) When a voltage V—light transmittance Tr correlation is measured, a hysteresis curve is formed between the voltage V and the light transmittance Tr. That is, even at the same voltage V, the light transmittance Tr given when the voltage V is increased is different from that given when the voltage V is decreased. For example, a hysteresis curve shown in FIG. 5 is obtained when the smectic liquid crystal composition exhibits antiferroelectricity.

An area $S_O$ of a rectangular triangle is measured, said rectangular triangle being formed by a straight line PQ (oblique side) having as its both ends an intersection point P at which a tangent line $I_R$ of the hysteresis curve within a region wherein the light transmittance Tr steeply increases in accordance with increase of the voltage V is made to intersect a tangent line $I_F$ of the hysteresis curve within a region which is adjacent to the voltage-steep increase region on the higher-voltage side, and an intersection point Q of an axis of ordinate (V=0) and the hysteresis curve; a straight line which is parallel to the axis of ordinate and passes the intersection point P (i.e., constant-voltage line); and a straight line which is parallel to the axis of abscissa and passes the intersection point Q (i.e., constant-transmittance line).

Separately, an area $S_H$ of a region (e.g., hatched portion in FIG. 5) is measured, said region being enclosed with the straight line PQ; the hysteresis curve within a region wherein the light transmittance Tr steeply increases; and a constant-voltage straight line which passes the intersection point P.

Using the values for the area $S_H$ and the area $S_O$ thus measured, the voltage gradation parameter L is calculated from the following equation.

$$L = S_H / S_O$$

As understood from in FIG. 5, when the area $S_H$ is 0, the hysteresis curve coincides with the line PQ having the intersection point P and the intersection point Q as both ends. As the area $S_O$ becomes larger, that is, as the absolute value |V| of the voltage V at the intersection point P and the light transmittance Tr become larger, the quantity of the specific polarized light output from the liquid crystal element can be more greatly varied correspondingly to the intensity of the voltage V applied between the electrodes of the liquid crystal cell filled with the smectic liquid crystal composition.

Accordingly, a smectic liquid crystal composition having a small voltage gradation parameter L can impart excellent voltage gradation property to a liquid crystal element having a liquid crystal cell filled with the smectic liquid crystal composition.

As for the conventional material capable of exhibiting an antiferroelectric liquid crystal phase (referred to as "antiferroelectric liquid crystal materials), even when an antiferroelectric liquid crystal composition, not to mention an antiferroelectric liquid crystal compound, is used as the liquid crystal material, its voltage gradation parameter L exceeds 0.9, and it was difficult to impart excellent voltage gradation property to a liquid crystal element having a liquid crystal cell filled with the antiferroelectric liquid crystal material.

In contrast therewith, the first smectic liquid crystal composition of the invention has a voltage gradation parameter L of less than 0.6, and it can impart to the liquid crystal element an excellent voltage gradation property beyond the expectation from the conventional antiferroelectric liquid crystal composition. The difference between the voltage gradation parameter L of the first smectic liquid crystal composition of the invention and the voltage gradation parameter L of the conventional antiferroelectric liquid crystal composition will be described later in the examples.

There is no specific limitation on the first smectic liquid crystal composition of the invention, as far as the composition has a voltage gradation parameter L of less than 0.6, and compositions containing various compounds and capable of being in a smectic liquid crystal phase, preferably an antiferroelectric liquid crystal phase, are available.

In the first smectic liquid crystal composition of the invention, smectic liquid crystal compounds having a chiral portion (asymmetric carbon atom) in the molecule are generally employed, but if necessary, smectic liquid crystal compounds having no chiral portion in the molecule may be employed.

The smectic liquid crystal composition containing an antiferroelectric liquid crystal compound and having a voltage gradation parameter L of less than 0.6 is particularly an antiferroelectric liquid crystal composition containing an antiferroelectric liquid crystal compound represented by the following formula (I).

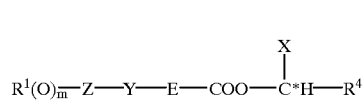

(I)

In the formula (I), Z is a group selected from the group consisting of

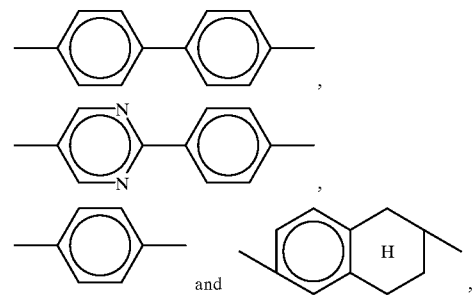

E is a group selected from the group consisting of

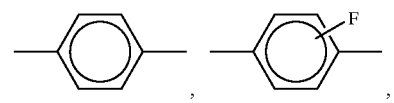

-continued

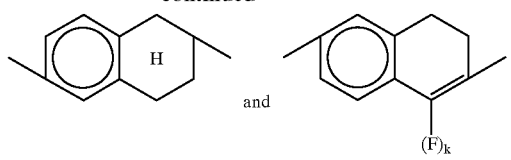

(k=0 or 1), and
E is preferably

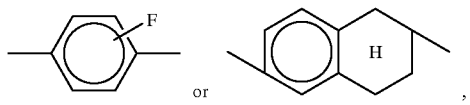

particularly preferably

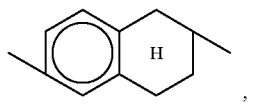

, from the viewpoint of obtaining a smectic liquid crystal composition being in an antiferroelectric liquid crystal phase at room temperature or temperatures near room temperature.

When the smectic liquid crystal composition is in an antiferroelectric liquid crystal phase at room temperature or temperatures near room temperature, a smectic liquid crystal element in which the liquid crystal composition is filled between electrodes of a liquid crystal cell can be driven even if the liquid crystal cell is scarcely or never heated.

$R^1$ in the formula (I) is an alkyl group of 6 to 16 carbon atoms. Hydrogen atoms in this alkyl group may be replaced with halogen atoms. A part of methylene groups in the alkyl group and/or halomethylene groups in a haloalkyl group obtained by substituting the alkyl group with the halogen atom may be replaced with —O— groups. The halomethylene group may be a halomethylene group wherein one hydrogen atom in a methylene group is replaced with a halogen atom or a halomethylene group wherein two hydrogen atoms in a methylene group are replaced with halogen atoms. When a part of methylene groups in the alkyl group and/or halomethylene groups in the haloalkyl group are replaced with plural —O— groups, these plural —O— groups are not adjacent to each other.

Examples of $R^1$ include alkyl groups of 6 to 16 carbon atoms, haloalkyl groups of 6 to 16 carbon atoms, alkoxy groups of 5 to 15 carbon atoms, haloalkoxy groups of 5 to 15 carbon atoms, alkyloxyalkylene groups of 15 or less carbon atoms, haloalkyloxyalkylene groups of 15 or less carbon atoms, alkyloxyhaloalkylene groups of 15 or less carbon atoms and haloalkyloxyhaloalkylene groups of 15 or less carbon atoms.

When $R^1$ is an alkyl group of 6 to 16 carbon atoms or a haloalkyl group of 6 to 16 carbon atoms, these groups may have optical activity.

$R^1$ is preferably a straight-chain alkyl group or a group wherein one methylene group in an alkyl group is replaced with —O— group, from the viewpoint of obtaining a smectic liquid crystal composition being in an antiferroelectric liquid crystal phase over a wide temperature range. Especially when $R^1$ is a group wherein one methylene group in an alkyl group is replaced with —O— group, it is preferred that the second or the third methylene group from the end carbon of the alkyl group be replaced with —O— group.

In the formula (I), $R^4$ is a straight-chain alkyl group having carbon atoms of an even number selected from 4, 6 and 8 or a group wherein one methylene group in said alkyl group having even carbon atoms is replaced with —O— group. From the viewpoint of obtaining a smectic liquid crystal composition being in an antiferroelectric liquid crystal phase over a wide temperature range, $R^4$ is preferably a straight-chain alkyl group. From the viewpoint of making the electrooptic response speed of the resulting liquid crystal element higher, $R^4$ is preferably a group wherein one methylene group in said alkyl group is replaced with —O— group. Therefore, selection of the straight-chain alkyl group or the group wherein one methylene group in the straight-chain alkyl group is replaced with —O— group as $R^4$ is determined according to the final purpose of the resulting liquid crystal element.

X in the formula (I) is a group selected from the group consisting of —$CH_3$ group, —$CH_2F$ group, —$CHF_2$ group and —$CF_3$ group. From the viewpoint of obtaining a smectic liquid crystal composition being in an antiferroelectric liquid crystal phase over a wide temperature range, X is preferably —$CH_3$ group or —$CF_3$ group, particularly preferably —$CF_3$ group.

Y in the formula (I) is a group selected from the group consisting of —COO—, —$CH_2O$—, —$CH_2CH_2$— and —$OCH_2$—.

m is an integer of 0 or 1. From the viewpoint of obtaining a smectic liquid crystal composition being in an antiferroelectric liquid crystal phase over a wide temperature range, m is preferably 1. From the viewpoint of making the electrooptic response speed of the resulting chiral smectic element higher, however, m is preferably 0. Therefore, selection of 0 or 1 as m is determined according to the final purpose of the resulting liquid crystal element.

When E in the formula (I) is a divalent tetralin ring, the first smectic liquid crystal composition of the invention can be in an antiferroelectric liquid crystal phase over a sufficiently wide temperature range as described later in Examples 1 to 12, even if m is 0. Accordingly, m is preferably 0 from the viewpoint of making the electrooptic response speed of the resulting liquid crystal element higher.

In the formula (I), k is 0 or 1.

Some examples of the antiferroelectric liquid crystal compounds represented by the formula (I) wherein Z is

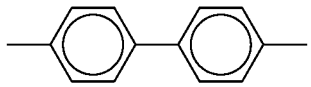

are given below.

An antiferroelectric liquid crystal compound represented by the following formula (Ia):

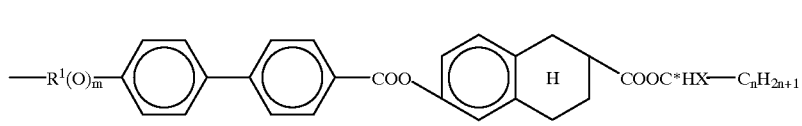

(Ia)

wherein
$R^1$ is a straight-chain alkyl group of 6 to 16 carbon atoms,
n is an integer selected from 4, 6 and 8,
X is —$CH_3$ group or —$CF_3$ group, and
m is an integer of 0 or 1.

An antiferroelectric liquid crystal compound represented by the following formula (Ib):

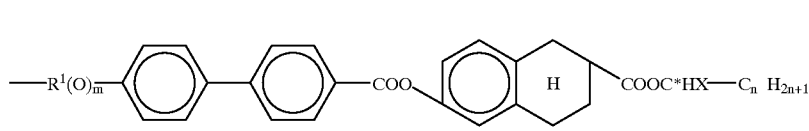

(Ib)

wherein
$R^1$ is the same group as that of $R^1$ in the formula (I),
n is an integer selected from 4, 6 and 8,
X is —$CH_3$ group or —$CF_3$ group, and
m is an integer of 0 or 1.

An antiferroelectric liquid crystal compound represented by the following formula (Ic):

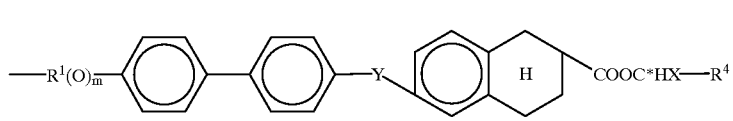

(Ic)

wherein
$R^1$, Y, $R^4$ and m have the same meanings as those of the corresponding symbols in the formula (I), $R^4$ is preferably an alkyl group having carbon atoms of an even number between 4 to 8, and Y is preferably a group selected from the group consisting of —COO—, —$CH_2O'$ and —$CH_2CH_2$—, and
X is —$CH_3$ group or —$CF_3$ group.

An antiferroelectric liquid crystal compound represented by the following formula (Id):

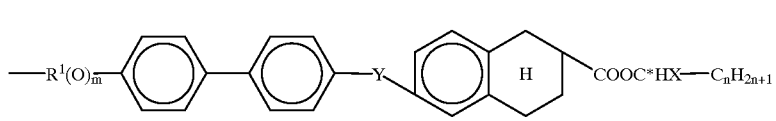

(Id)

wherein
$R^1$, Y and m have the same meanings as those of the corresponding symbols in the formula (I),
X is —$CH_3$ group or —$CF_3$ group, and
n is an integer selected from 4, 6 and 8.

If the content of the antiferroelectric liquid crystal compound of the formula (I) in the liquid crystal composition is too low, the composition is occasionally unable to be in the antiferroelectric liquid crystal phase. On this account, when a liquid crystal composition containing the antiferroelectric liquid crystal compound of the formula (I) is used, it is preferable that not less than 10% by weight of the antiferroelectric liquid crystal compound of the formula (I) is contained in the composition.

The first smectic liquid crystal composition of the invention has a voltage gradation parameter L of less than 0.6 by virtue of the interaction between the smectic liquid crystal compound (e.g., the antiferroelectric liquid crystal compound represented by the formula (I)) contained as a major component of the liquid crystal composition and other components.

Examples of the other components exerting the interaction together with the antiferroelectric liquid crystal compound of the formula (I) include compounds structurally analogous to the antiferroelectric liquid crystal compound of the formula (I). The compound structurally analogous to the antiferroelectric liquid crystal compound of the formula (I) are, for example, compound which is common to the compound of the formula (I) in that: two divalent cyclic groups (e.g., phenylene group, monofluorophenylene group, cyclohexylene group, tetrahydronaphthylene group) which may be the same or different are bonded through a divalent straight-chain group which has two atoms forming a main chain (e.g., —COO—, $CH_2O$—, —$CH_2CH_2$—, —$COCH_2$—), one of the divalent cyclic groups is bonded to a divalent straight-chain group which has two atoms forming the main chain (e.g., —COO— group) to thereby form a molecular skeleton, one end group which is directly bonded to the divalent cyclic group of the molecular skeleton is a straight-chain group of 16 or less atoms, and the other end group is an optically active group; but the analogous compounds are structurally different from the antiferroelectric liquid crystal compound of the formula (I) in at least one of the two divalent cyclic groups and the optical active group.

As described later in the examples, in case of the liquid crystal composition containing plural compounds of the formula (I) which are merely different from each other in $R^1$, the voltage gradation parameter L does not become less than 0.6 (see: Reference Example 2), but in case of the composition containing plural compounds of the formula (I) which are different from each other in at least one of Z, E and $R^4$, the voltage gradation parameter L becomes less than 0.6 (see: Examples 13–16, 18, 19, 21, 22, and 24–36).

In case of the liquid crystal composition containing the antiferroelectric liquid crystal compound of the formula (I) and a compound which is structurally identical with the compound of the formula (I) except for having an optically active group represented by the formula

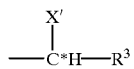

(wherein X' is a group selected from the group consisting of —$CH_3$ group, —$CH_2F$ group, —$CHF_2$ group and $CF_3$ group, and $R^3$ is a straight-chain group having atoms of an odd number selected from 3, 5, 7 and 9), the voltage gradation parameter L becomes less than 0.6 (see: Examples 1–12). In this case, this optically active group is structurally distinguished from the optically active group

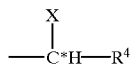

of the antiferroelectric liquid crystal compound of the formula (I) in that the number of atoms of $R^3$ is different from the number of atoms of $R^4$.

The compound which has such an optically active group as described above and thereby is structurally distinguished from the antiferroelectric liquid crystal compound of the formula (I) is, for example, a liquid crystal compound represented by the following formula (II).

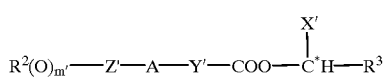
(II)

In the formula (II), Z' is a group selected from the group consisting of

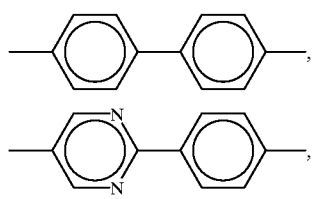

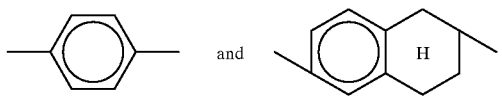

A is a group selected from the group consisting of

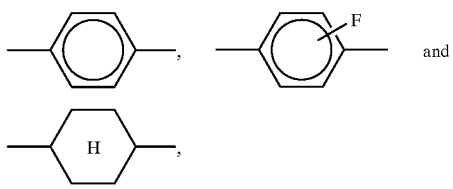

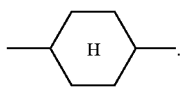

or a single bond, and preferably

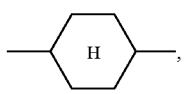

When the first smectic liquid crystal composition contains the antiferroelectric liquid crystal compound represented by the formula (I) and exhibits antiferroelectricity, a liquid crystal element filled with this first smectic liquid crystal composition has a voltage-transmittance correlation expressed by a specific double hysteresis curve, as described later in the examples.

As methods of driving the liquid crystal element on an active matrix system, there are a driving method wherein the absolute value of the voltage is increased to change the liquid crystal from the antiferroelectric state to the ferroelectric state, and the light transmittance is varied along the transition curve observed in the change to the ferroelectric state to drive the element; and a driving method wherein the liquid crystal changed to the ferroelectric state as described above is then changed from the ferroelectric state to the antiferroelectric state by decreasing the absolute value of the voltage and the light transmittance is varied along the transition curve observed in the change to the antiferroelectric state to drive the element.

When the element is driven utilizing both of the above methods, the hysteresis width formed by the two transition curves is desirably as small as possible, and it is ideally zero.

When A in the formula (II) is the liquid crystal element wherein a liquid crystal composition comprising the antiferroelectric liquid crystal compound of the formula (I) and the liquid crystal compound of the formula (II) is filled in a gap (cell gap) of a liquid crystal cell is characterized in that the hysteresis width is smaller than that in the liquid crystal element wherein the aforesaid liquid crystal composition is filled in a cell gap.

In the formula (II), B is the same group as that of E in the formula (I).

When A in the formula (II) is

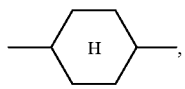

B is particularly preferably or

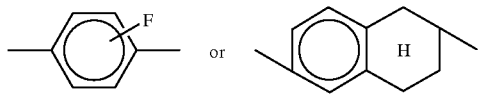

In the formula (II), $R^2$ is the same group as that of $R^1$ in the formula (I). For the same reason as described for the formula (I), $R^2$ is preferably a straight-chain alkyl group or a group wherein the second or the third methylene group from the end carbon in an alkyl group is substituted with —O— group, similarly to $R^1$ in the formula (I).

In the formula (II), $R^3$ is a straight-chain alkyl group having carbon atoms of an odd number selected from 3, 5, 7 and 9. One of —C—C— bonds in this alkyl group may be interrupted by —COO— group. Further, hydrogen atoms in this alkyl group may be replaced with halogen atoms other than an iodine atom, and a part of ethylene groups in the alkyl group may be each —CH=CH— or —C≡C—. $R^3$ is preferably a group wherein one —C—C— bond in the above straight-chain alkyl group may be interrupted by —COO— group, and is particularly preferably —CH$_2$—COO— C$_2$H$_5$— group.

In the formula (II), X' is a group selected from the group consisting of —CH$_3$ group, —CH$_2$F group, —CHF$_2$ group and —CF$_3$ group, and is preferably —CH$_3$ group or —CF$_3$ group.

In the formula (II), Y' is a group selected from the group consisting of —COO— group, —CH$_2$O— group, —CH$_2$CH$_2$— group and —OCH$_2$— group.

m' is an integer of 0 or 1, preferably 1.

Some examples of the liquid crystal compounds represented by the formula (II) wherein Z' is

are given below.

A liquid crystal compound represented by the following formula (IIa):

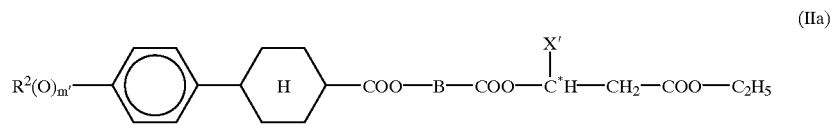

(IIa)

wherein B is a group selected from the group consisting of

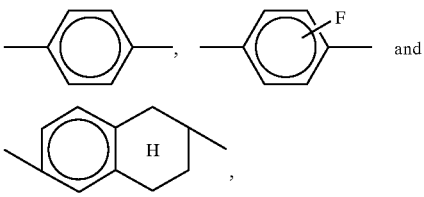

$R^2$ is a straight-chain alkyl group of 6 to 16 carbon atoms,
X' is —CH$_3$ group or —CF$_3$ group, and
m' is an integer of 0 or 1.

A liquid crystal compound represented by the following formula (IIb):

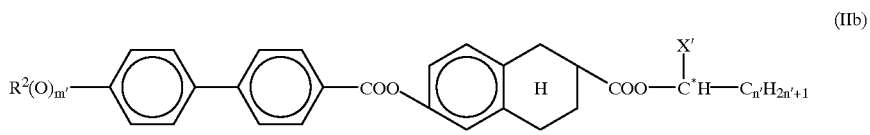

(IIb)

wherein $R^2$ is the same group as that of $R^2$ in the formula (I),
n' is an integer selected from 3, 5, 7 and 9,
X' is —CH$_3$ group or —CF$_3$ group, and
m' is an integer of 0 or 1.

A liquid crystal compound represented by the following formula (IIc):

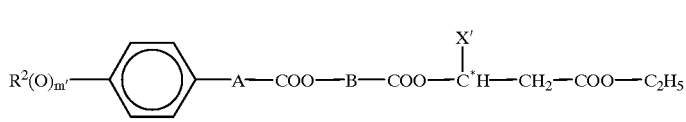

(IIc)

wherein A, B, $R^2$ and m' have the same meanings as those of the corresponding symbols in the formula (II), and X' is —$CH_3$ group or —$CF_3$ group.

A liquid crystal compound represented by the following formula (IId):

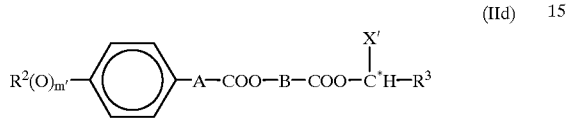

(IId)

wherein A, B, $R^2$ and ml have the same meanings as those of the corresponding symbols in the formula (II), $R^3$ is a straight-chain hydrocarbon group of 4 to 8 carbon atoms, with the proviso that a hydrogen atom in the hydrocarbon group may be replaced with a halogen atom other than an iodine atom, and X' is —$CH_3$ group or —$CF_3$ group.

As described later in the examples, in order to allow the smectic liquid crystal composition containing the antiferroelectric liquid crystal compound of the formula (I) to have a voltage gradation parameter L of less than 0.6, the other component (e.g., compound represented by the formula (II)) which interacts with the antiferroelectric liquid crystal compound of the formula (I) to produce the change is preferably contained in the composition in an amount of not less than 15% by weight. In order not to deteriorate the antiferroelectricity of the first composition of the invention, the other component (e.g., compound represented by the formula (II)) is preferably contained in an amount of not more than 55% by weight. The amount of the other component in the first composition of the invention varies according to the type of the antiferroelectric liquid crystal compound of the formula (I) contained in the composition, the type of the other component and the combination thereof. The amount thereof may be out of the above range.

When the first smectic liquid crystal composition of the invention is a liquid crystal composition comprising the antiferroelectric liquid crystal compound of the formula (I) wherein Z is

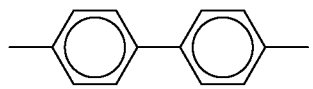

and the liquid crystal compound of the formula (II) wherein Z' is

, some examples of the compositions comprising preferable combinations of these compounds are given below:

(1) a composition comprising an antiferroelectric liquid crystal compound represented by the formula (Ia) and a liquid crystal compound represented by the formula (IIa);

(2) a composition comprising an antiferroelectric liquid crystal compound represented by the formula (Ib) and a liquid crystal compound represented by the formula (IIb);

(3) a composition comprising an antiferroelectric liquid crystal compound represented by the formula (Ic) and a liquid crystal compound represented by the formula (IIc);

and (4) a composition comprising an antiferroelectric liquid crystal compound represented by the formula (Id) and a liquid crystal compound represented by the formula (IId).

As a matter of course, the combination of the antiferroelectric liquid crystal compound represented by the formula (I) and the compound represented by the formula (II) to form the liquid crystal composition having a voltage gradation parameter L of less than 0.6 are not limited to the above examples, and for instance, Examples 17 and 20 described later show that other combinations also make a voltage gradation parameter L of the liquid crystal composition be in the range of less than 0.6.

To the first smectic liquid crystal composition of the invention, spherical particles having uniform diameters, e.g., spherical silica particles, or short fibers having uniform diameters, e.g., glass short fibers, may be optionally added to keep the distance between the electrodes of the liquid crystal cell. Further, known additives such as conductivity-imparting agents and life-extending agents may be optionally added in such amounts that the voltage gradation parameter L of the smectic liquid crystal composition can be maintained at a value of less than 0.6.

As described later in the examples, the first smectic liquid crystal composition of the invention may be produced by using a mixture of plural kinds of the smectic liquid crystal compounds as the major components, e.g., a mixture of two or more kinds of the antiferroelectric liquid crystal compounds represented by the formula (I), and may be produced by using a mixture of plural kinds of the compounds as the components which are mixed with the major component to allow the resulting smectic liquid crystal composition to have a voltage gradation parameter L of less than 0.6, e.g., a mixture of two or more kinds of the liquid crystal compounds represented by the formula (II).

When the liquid crystal element having a liquid crystal cell filled with the smectic liquid crystal composition is driven in the following manner, the gradation produced by the quantity of the transmitted light of the liquid crystal element is continuously or stepwise controlled.

The method of driving a liquid crystal element having a liquid crystal cell containing the smectic liquid crystal composition filled between a pair of electrodes, in which the gradation produced by the quantity of the transmitted light of the liquid crystal element is continuously or stepwise controlled by varying the intensity of a voltage applied between the electrodes of the liquid crystal cell, is referred to as "first method of driving a liquid crystal element according to the invention" hereinafter.

Figure 6:
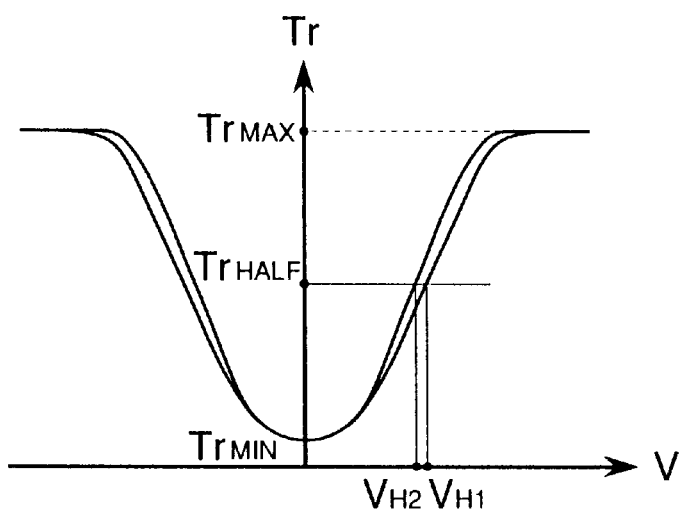
FIG. 6 is a drawing to explain a method of evaluating hysteresis width of a hysteresis curve formed by a voltage and a transmittance of a light transmitted by a liquid crystal element, said voltage being applied between electrodes of the cell filled with a smectic liquid crystal exhibiting antiferroelectricity in the liquid crystal element.

For example, when the liquid crystal element used in the first method of driving a liquid crystal element according to the invention has a liquid crystal cell containing the first smectic liquid crystal composition of the invention filled between a pair of electrodes, the voltage-transmittance (V-Tr) correlation forms such a specific double hysteresis curve as shown in FIG. 6. The hysteresis width of this curve is evaluated as a difference $\Delta V$ (=$V_{H1}-V_{H2}$) between two positive voltage values $V_{H1}$ and $V_{H2}$ applied to obtain a light transmittance $Tr_{HALF}\{=\frac{1}{2}(Tr_{MAX}+Tr_{MIN})\}$ which corresponds to ½ of the sum of the maximum light transmittance $Tr_{MAX}$ and the minimum light transmittance $Tr_{MIN}$ of the hysteresis curve. In the first method of driving a liquid crystal element according to the invention, the value $\Delta V$ (=$V_{H1}-V_{H2}$) is desirably as small as possible and ideally zero.

By the use of the smectic liquid crystal composition of the invention having a voltage gradation parameter L of less than 0.6, preferably less than 0.4, as the smectic liquid crystal material, the liquid crystal element comes to exhibit gradation according to the intensity of the voltage applied between the electrodes of the liquid crystal cell.

When the liquid crystal element wherein the smectic liquid crystal composition having such a low voltage gradation parameter L as mentioned above is filled between the electrodes of the liquid crystal cell is used as a display element, the gradation of a displayed image can be easily controlled by merely varying the intensity of the voltage applied to the liquid crystal cell.

Next, the second liquid crystal composition according to the invention is described in detail.

Liquid Crystal Composition

The second liquid crystal composition according to the invention is characterized by having a parameter G of 0 to 0.3, which parameter is measured a described later.

That is, the parameter G is defined by the following equation (B) with the proviso that: the liquid crystal composition is filled between a pair of transparent electrodes of a liquid crystal cell and two polarizing plates are arranged on the surfaces of the liquid crystal cell so that a polarized light output from one polarizing plate is transmitted by the liquid crystal cell and a polarized light having a polarization direction crossing that of the above polarized light at light angles is output from the other polarizing plate; and the liquid crystal cell is arranged so that the light quantity (T) of a light output from the other polarizing plate varies when a voltage V is applied between the transparent electrodes of the liquid crystal cell, to form a hysteresis curve which is substantially symmetrical with respect to the voltage of 0 (V=0) between a positive voltage region and a negative voltage region; and when the absolute value |V| of the voltage V is increased to the predetermined value $|V|_{min}$, the light quantity T becomes a maximum value $T_{max}$.

$$G = \frac{Tmax/2 - Tmin}{Tmax/2 - T_0} \times \frac{S}{(Tmax - Tmin) \times |V|min} \quad (B)$$

wherein $|V|_{min}$ and $T_{max}$ have the same meanings as described above; S is an area of a region enclosed with the V-T hysteresis curve shown in the positive or negative voltage region; $T_{min}$ is a minimum value of the light quantity T; and $T_0$ is a light quantity T given when no voltage is applied.

In connection with the equation (B), a parameter $G_1$ defined by the following equation (C) is not less than 1, and indicates an intensity of darkness in case of V=0.

$$G_1 = \frac{Tmax/2 - Tmin}{Tmax/2 - T_0} \quad (C)$$

As the value of $G_1$ becomes smaller, the intensity of darkness becomes lower, with the proviso that $T_{min}$ and $T_{max}$ are each constant. That is, display of higher contrast can be made by the use of a liquid crystal element having a liquid crystal cell containing the liquid crystal composition.

It can be seen from the equation (C) that as the value of $T_0$ becomes smaller, the value of $G_1$ becomes smaller, and $G_1$ is most preferably 1.

In connection with the formula (B), a parameter $G_2$ defined by the following equation (D) indicates a size of the aforesaid hysteresis.

$$G_2 = \frac{S}{(Tmax - Tmin) \times |V|min} \quad (D)$$

As the value of S becomes smaller, the value of $G_2$ (hysteresis) becomes smaller. That is, if the liquid crystal cell is driven on an active matrix system, an image of good gradation can be displayed by the use of a liquid crystal element having a liquid crystal cell containing the liquid crystal composition.

As described above, both of $G_1$ and $G_2$ are desired to be small, and therefore as the value of G, i.e., the product of $G_1$ and $G_2$, becomes smaller, an image of better gradation can be displayed with the liquid crystal element by driving the liquid crystal cell on an active matrix system.

The second liquid crystal composition of the invention having a parameter G of 0 to 0.3 is preferably a chiral smectic liquid crystal composition from the viewpoint of obtaining a high electrooptic response speed and making wide an angle at which an image displayed by the liquid crystal element having a liquid crystal cell containing the liquid crystal composition is visible.

The second liquid crystal composition of the invention having the above-mentioned electrooptic properties is, for example, a liquid crystal composition comprising 40 to 99% by weight of one or more antiferroelectric liquid crystal compounds and 60 to 1% by weight of one or more ferroelectric liquid crystal compounds.

In the liquid crystal composition, it is desired that the antiferroelectric liquid crystal compounds are each capable of being in an antiferroelectric liquid crystal phase, preferably chiral smectic $C_A^*$ phase, over a wide temperature range including ordinary temperature, in such a state that they are used singly or as a mixture of two or more kinds.

The antiferroelectric liquid crystal compound preferably used for forming the second liquid crystal composition of the invention can be selected from compounds which exhibit antiferroelectricity and are represented by the following formula (III).

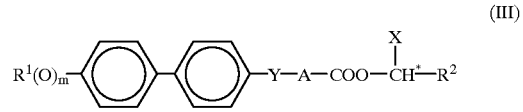

(III)

In the formula (III), $R^1$ is an alkyl group of 6 to 16 carbon atoms or a halogenated alkyl group of 6 to 16 carbon atoms, a part of —$CH_2$—, —CHL— and —$CL_2$— (L is a halogen atom) in these alkyl and halogenated alkyl groups may be replaced with —O— groups, and the alkyl or the halogenated alkyl group may have an asymmetric carbon atom.

$R^2$ is a straight-chain alkyl group having 4, 6 or 8 carbon atoms or a group wherein one —$CH_2$— in said straight-chain alkyl group is replaced with —O— group.

X is —$CH_3$ or —$CF_3$.

Y is a group selected from the group consisting of —COO—, —$CH_2O$—, —$CH_2CH_2$— and —$OCH_2$—

A is a group selected from the group consisting of

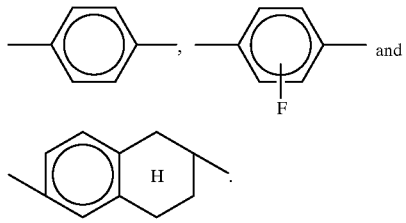

m is 0 or 1.

Some examples of the compounds which are represented by the formula (III) and exhibit antiferroelectricity are given below.

The second liquid crystal composition of the invention can be obtained by mixing one or more kinds of the antiferroelectric liquid crystal compounds with one or more kinds of the ferroelectric liquid crystal compounds in a specific mixing ratio.

The ferroelectric liquid crystal compounds for forming the second liquid crystal composition of the invention are capable of being in an antiferroelectric liquid crystal phase, preferably in a chiral smectic C* phase, singly or in combination.

The ferroelectric liquid crystal compound preferably used for forming the second antiferroelectric liquid crystal composition can be selected from compounds which exhibit ferroelectricity and are represented by the following formula (IV):

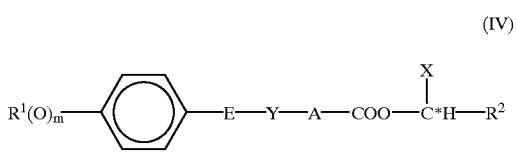

(IV)

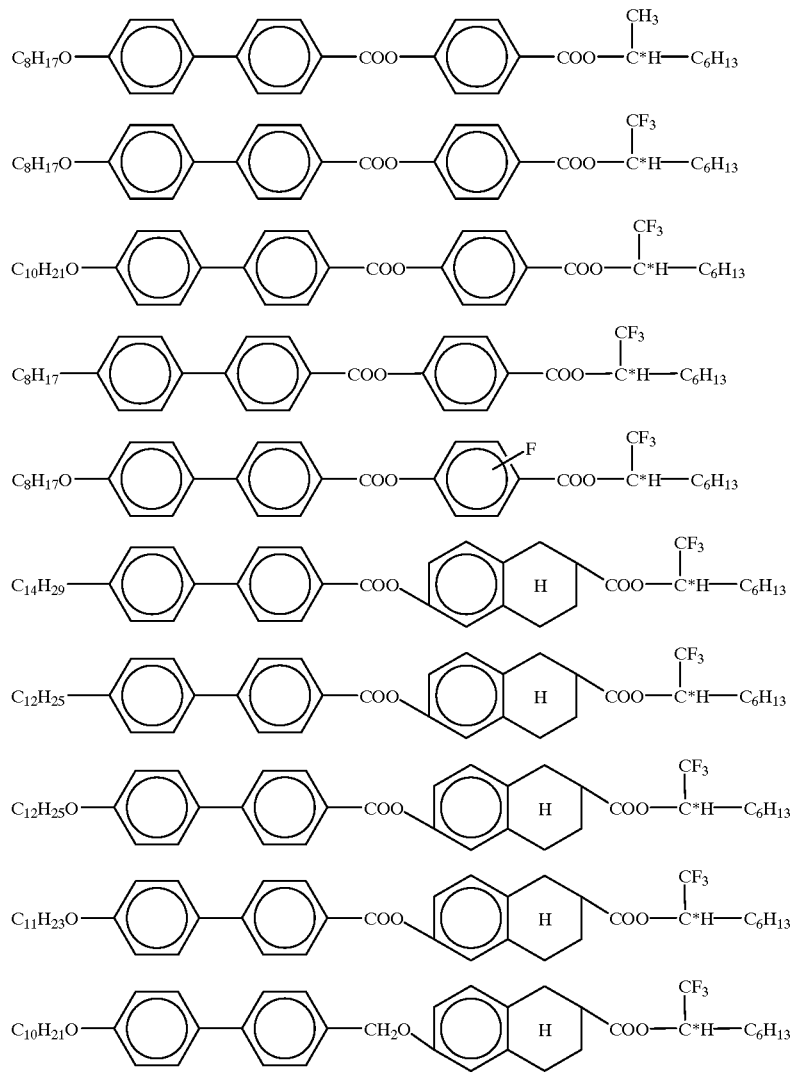

wherein $R^1$, $R^2$, X, Y, A and m have the same meaning as described above; and E is a group selected from the group consisting of

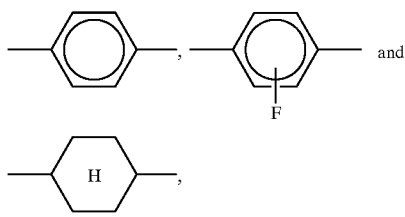

or a single bond.

Some examples of the compounds which are represented by the formula (IV) and exhibit ferroelectricity are given below.

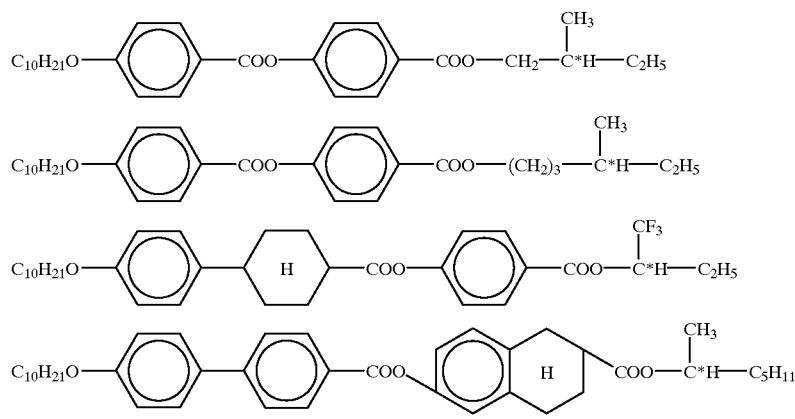

For preparing the second liquid crystal composition of the invention from the antiferroelectric liquid crystal compound(s) and the ferroelectric liquid crystal compound(s), the (total) amount of the antiferroelectric liquid crystal compound(s) used is in the range of 40 to 99% by weight, preferably 40 to 90% by weight; and the (total) amount of the ferroelectric liquid crystal compound(s) used is in the range of 60 to 1% by weight, preferably 60 to 10% by weight.

When the amount of the antiferroelectric liquid crystal compound exceeds 99% by weight and the amount of the ferroelectric liquid crystal compound is less than 1% by weight, a liquid crystal element having a liquid crystal cell whose cell gap is filled with the composition comprising the antiferroelectric liquid crystal compound and the ferroelectric liquid crystal compound can hardly display an image of excellent gradation even by driving the cell on an active matrix system. When the amount of the ferroelectric liquid crystal compound exceeds 60% by weight, the composition comprising this ferroelectric liquid crystal compound and the antiferroelectric liquid crystal compound exhibits a ferroelectric phase. That is, if the amount of the ferroelectric liquid crystal compound exceeds 60% by weight, it is impossible to obtain a liquid crystal composition which provides clear gradation when an image is displayed by a liquid crystal element having a liquid crystal cell filled with the liquid crystal composition. In other words, if the amount of the ferroelectric compound exceeds 60% by weight, the values of $T_0$ and $G_2$ tend to become extremely large, and the value of G varies according to the amount of the ferroelectric liquid crystal compound.

Liquid Crystal Element and Method of Driving the Element

In a liquid crystal element having a liquid crystal cell whose cell gap is filled with the liquid crystal composition comprising the specific amounts of the antiferroelectric liquid crystal compound and the antiferroelectric liquid crystal compound, an image of excellent gradation can be displayed by driving the liquid crystal cell on an active matrix system.

The reason is presumably as follows.

With respect to the liquid crystal composition comprising the specific amounts of the antiferroelectric liquid crystal compound and the ferroelectric liquid crystal compound, in the liquid crystal layers wherein the directions of spontaneous polarization of the liquid crystal molecules in one layer are opposite to those in the adjacent layers, blocks (ferroelectric liquid crystal layers) each of which is formed from a plural of the same liquid crystal layers in the directions of spontaneous polarization of the liquid crystal molecules as each other appear at appropriately short cyclic intervals in such a manner that the directions of spontaneous polarization of the liquid crystal molecules in one block are opposite to those in the adjacent block. Or, the directions of spontaneous polarization of the liquid crystal molecules for forming each liquid crystal layer in an antiferroelectric liquid crystal state differ at several-layer intervals. As a result in each case, the intensity of the spontaneous polarization as a whole becomes zero. For example, in the antiferroelectric liquid crystal state shown in FIG. 44, the directions of spontaneous polarization of the liquid crystal molecules differ at two-layer intervals. However, the number of the liquid crystal layers (ferroelectric liquid crystal individual layers) for forming one block wherein the directions of spontaneous polarization of the liquid crystal molecules are the same as each other is presumed to vary according to the amount of the ferroelectric liquid crystal compound contained in the liquid crystal composition.

If the amount of the ferroelectric liquid crystal compound in the composition comprising the antiferroelectric liquid crystal compound and the ferroelectric liquid crystal compound is too small, in the liquid crystal layers wherein the directions of spontaneous polarization of the liquid crystal molecules in one layer are opposite to those in the adjacent layers, ferroelectric liquid crystal layers appear at long cyclic intervals in such a manner that the direction of spontaneous polarization of the liquid crystal molecules in one ferroelectric liquid crystal layer are opposite to those in the adjacent ferroelectric liquid crystal layers. Besides, since the number of the ferroelectric liquid crystal individual layers for forming each ferroelectric liquid crystal layer is small, the width of the ferroelectric liquid crystal layer becomes smaller than the wavelength of a visible light. In case of too small amount of the ferroelectric liquid crystal compound, therefore, when the inside of a transmission type liquid crystal cell in which the composition comprising the antiferroelectric liquid crystal compound and the ferroelectric liquid crystal compound is filled in the cell gap is observed by a polarization microscope equipped with two polarizing plates arranged in the crossed Nicols state and a halogen lamp as a light source, the extinction position can be seen in the same direction as that of the conventional antiferroelectric liquid crystal phase, i.e., normal direction of the smectic layer.

Contrariwise, in case of too large amount of the ferroelectric liquid crystal compound, e.g., not less than 60% by weight, the composition comprising the antiferroelectric liquid crystal compound and the ferroelectric liquid crystal compound adversely exhibits a ferroelectric liquid phase.

In the liquid crystal composition comprising the specific amounts of the antiferroelectric liquid crystal compound and the ferroelectric liquid crystal compound, the following phenomenon presumably takes place. That is, when the amount of the ferroelectric compound is small, in the liquid crystal layers wherein the directions of spontaneous polarization of the liquid crystal molecules in one layer are opposite to those in the adjacent layers, ferroelectric liquid crystal layers appear at appropriately short cyclic intervals in such a manner that the directions of spontaneous polarization of the liquid crystal molecules in one ferroelectric liquid crystal layer are opposite to those in the adjacent ferroelectric liquid crystal layers. When the amount of the ferroelectric liquid crystal compound is increased, the ferroelectric liquid crystal layers appear in such a manner that the directions of spontaneous polarization of the liquid crystal molecules in one ferroelectric liquid crystal layer are opposite to those in the adjacent ferroelectric liquid crystal layers, and the width of each ferroelectric liquid crystal layer, i.e., the number of the ferroelectric liquid crystal individual layers for forming each ferroelectric liquid crystal layer, becomes large.

As described hereinbefore in the background art of the invention, the ferroelectric liquid crystal cell is known to have no electrooptic threshold value when a direct voltage is applied between the electrodes of the liquid crystal cell. This feature of the ferroelectric liquid crystal element is derived from the ferroelectric liquid crystal phase inside the liquid crystal cell provided in the ferroelectric liquid crystal element. In contrast therewith, the conventional antiferroelectric liquid crystal element has an electrooptically clear threshold value when a direct voltage is applied between the electrodes of the liquid crystal cell, and the quantity of the transmitted light forms a double hysteresis curve with large hysteresis as shown in FIG. 49 according to the applied voltage.

In the liquid crystal element having a liquid crystal cell wherein the liquid crystal composition comprising the specific amounts of the antiferroelectric liquid crystal compound and the ferroelectric liquid crystal compound is filled in the cell gap, therefore, the following phenomenon presumably takes place when a direct voltage is applied between the electrode of the liquid crystal cell. The liquid crystal composition contains a proper amount of the ferroelectric liquid crystal compound, so that if the liquid crystal composition filled in the cell gap of the liquid crystal cell is made to be in an antiferroelectric liquid crystal phase, a proper amount of a ferroelectric liquid crystal layer is formed in the antiferroelectric liquid crystal phase. Because of the ferroelectric liquid crystal layer, the element does not show an electrooptically clear threshold value, and the quantity of the transmitted light forms a double hysteresis curve with small hysteresis as shown in FIG. 50 according to the applied voltage.

To the liquid crystal composition of the invention, spherical particles having uniform diameters, e.g., spherical silica particles, or short fibers having uniform diameters, e.g., glass short fibers, may be optionally added to keep the distance between the electrodes of the liquid crystal cell, in addition to the above components. Further, known additives such as conductivity-imparting agents and life-extending agents may be added in such amounts that the objects of the invention are not marred.

The liquid crystal element using the liquid crystal composition of the invention can be manufactured in the same manner as for the conventional liquid crystal elements, except that the first smectic liquid crystal composition having a low value as the voltage gradation parameter L or the second liquid crystal composition having a specific value as the parameter G is filled between the electrodes of the liquid crystal cell.

Next, the liquid crystal element using the liquid crystal composition of the invention is described in detail with reference to the attached drawings.

Figure 1:
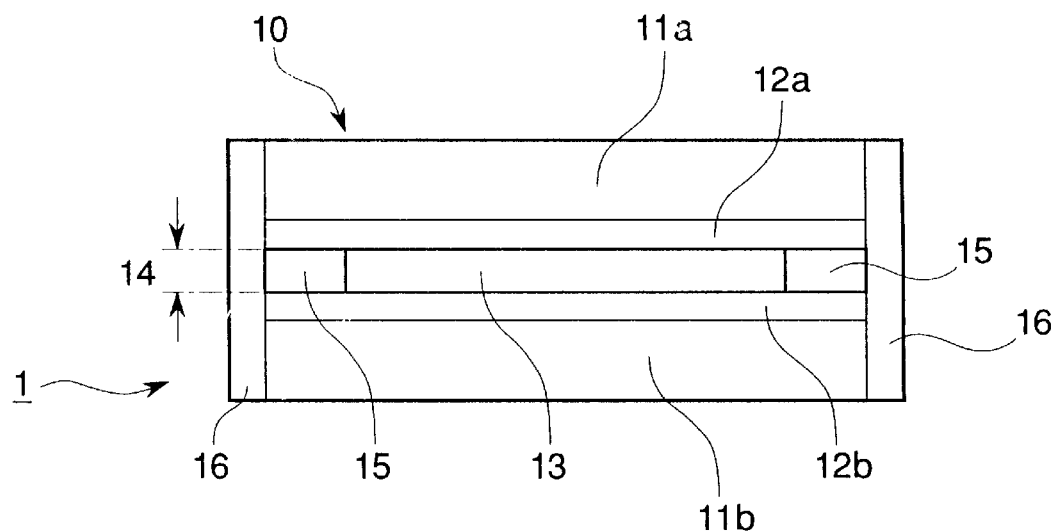
FIG. 1 is a schematic sectional view of one embodiment of a liquid crystal element using the liquid crystal composition of the present invention.
Figure 2:
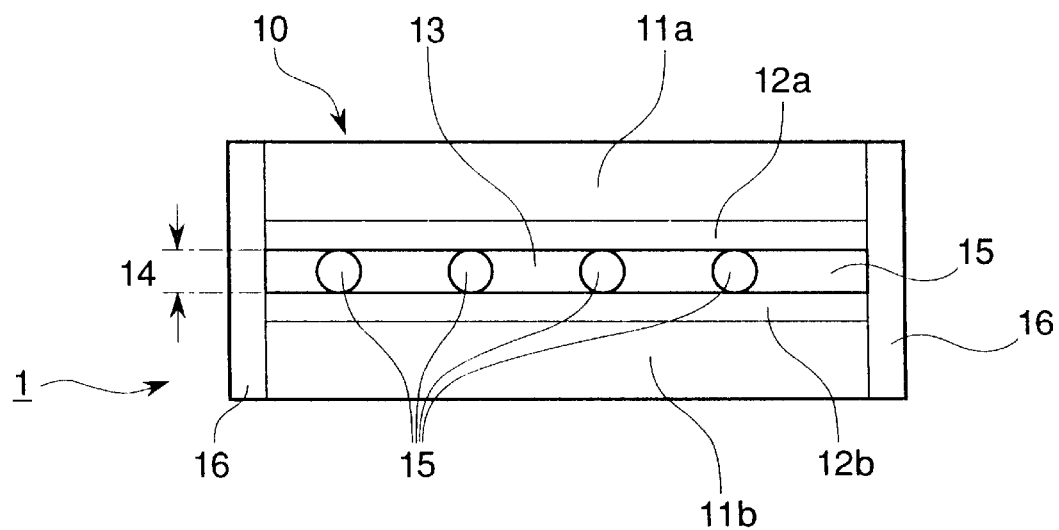
FIG. 2 is a schematic sectional view of another embodiment of a liquid crystal element using the liquid crystal composition of the present invention.

Each of FIG. 1 and FIG. 2 shows an embodiment of a liquid crystal cell for use in the liquid crystal element using the liquid crystal composition of the invention.

Referring to FIG. 1 and FIG. 2, a liquid crystal cell 10 includes a substrate 11a provided with an electrode 12a and a substrate 11b provided with an electrode 12b, and between the electrode 12a and the electrode 12b, a liquid crystal material (smectic liquid crystal material) 13 is filled.

Of the substrate 11a provided with an electrode 12a and the substrate 11b provided with an electrode 12b, one is transparent, and the other may be transparent or opaque. When the other substrate is opaque, the liquid crystal element having the liquid crystal cell 10 can be used as a reflection type liquid crystal element, e.g., a liquid crystal display element. When the two substrates are transparent, the liquid crystal element having the liquid crystal cell can 10 be used as a transmission type liquid crystal element, e.g., an optical switching element or an optical modulation element.

An orientation film (not shown) may be provided on the electrode side surface of at least one of the substrates. The orientation film is a layer serving to orientate the liquid crystal compound or the liquid crystal composition, which is in contact with said film in the liquid crystal cell, in the given direction. The orientation film can be obtained by, for example, forming a polyimide film on the electrode provided on the substrate and rubbing the surface of the polyimide film in the given direction.

In the liquid crystal cell 10, a spacer 15 is further provided between the electrodes to keep constant the distance between the electrodes constant in the liquid crystal cell.

In the liquid crystal cell 10 shown in FIG. 1, a film having a fixed thickness is used as the spacer 15, while in the liquid crystal cell 10 shown in FIG. 2, spherical particles having uniform diameters are used as the spacer 15. Fiber pieces having uniform diameters are also employable as the spacer 15. When a film of a fixed thickness is used as the spacer, the spacer is provided in the circumferences of the electrodes in the liquid crystal cell. When the spherical particles or the fiber pieces having uniform diameters are used, they are used as a mixture with the smectic liquid crystal material 13.

If the substrate of the liquid crystal cell contains impurities such as alkali metal, an alkali passivation film (not shown) may be provided between the substrate and the electrode so that the smectic liquid crystal material 13 is not deteriorated by the impurities through the substrate provided with the electrodes or the electrode.

Figure 7:
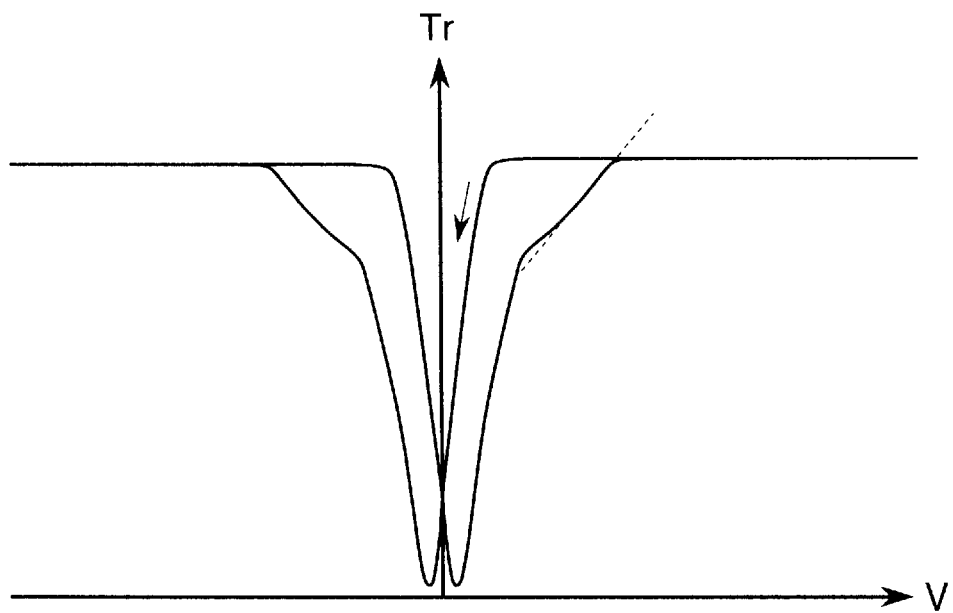
Figure 8:
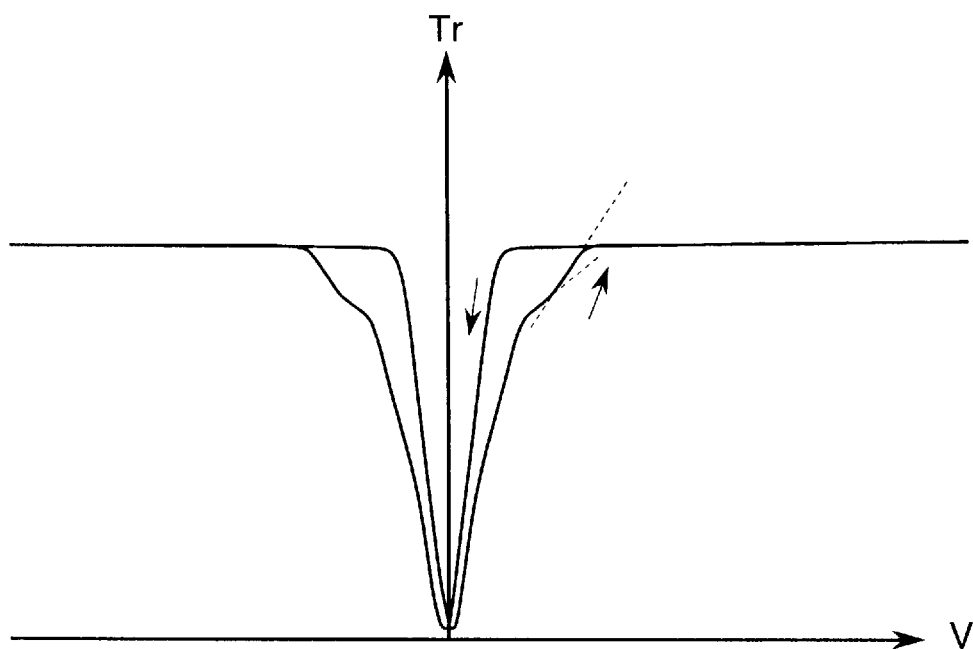
Figure 9:
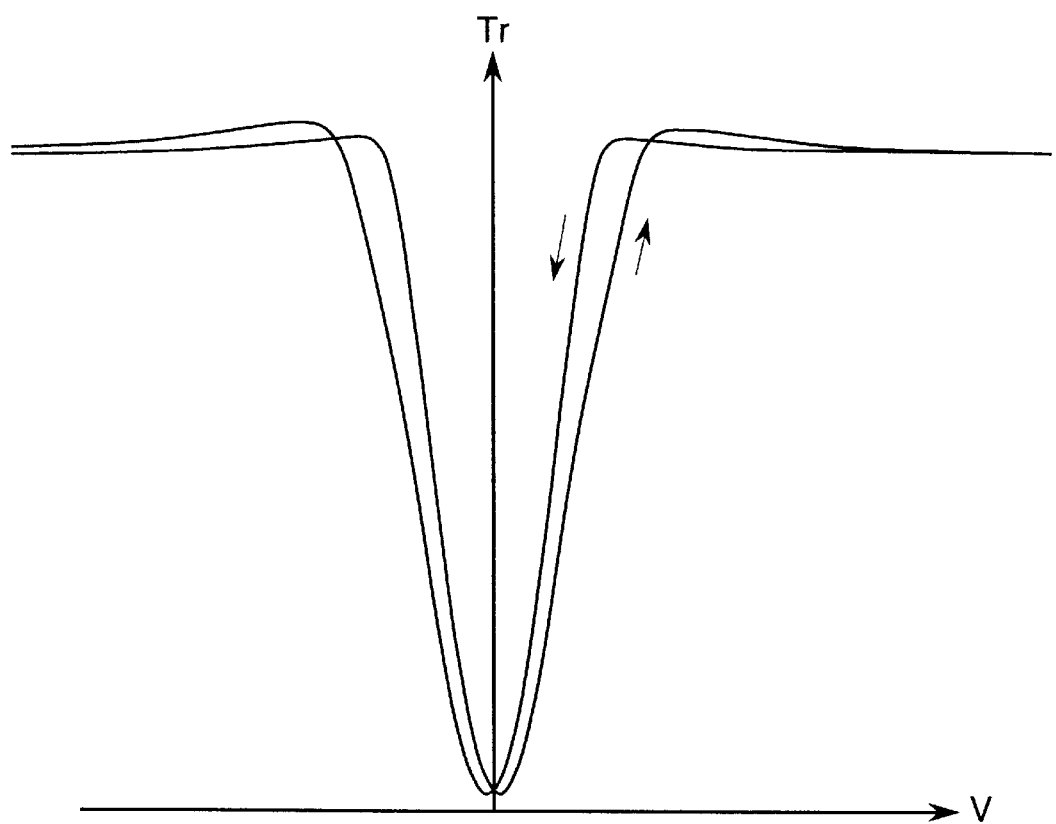
Figure 10:
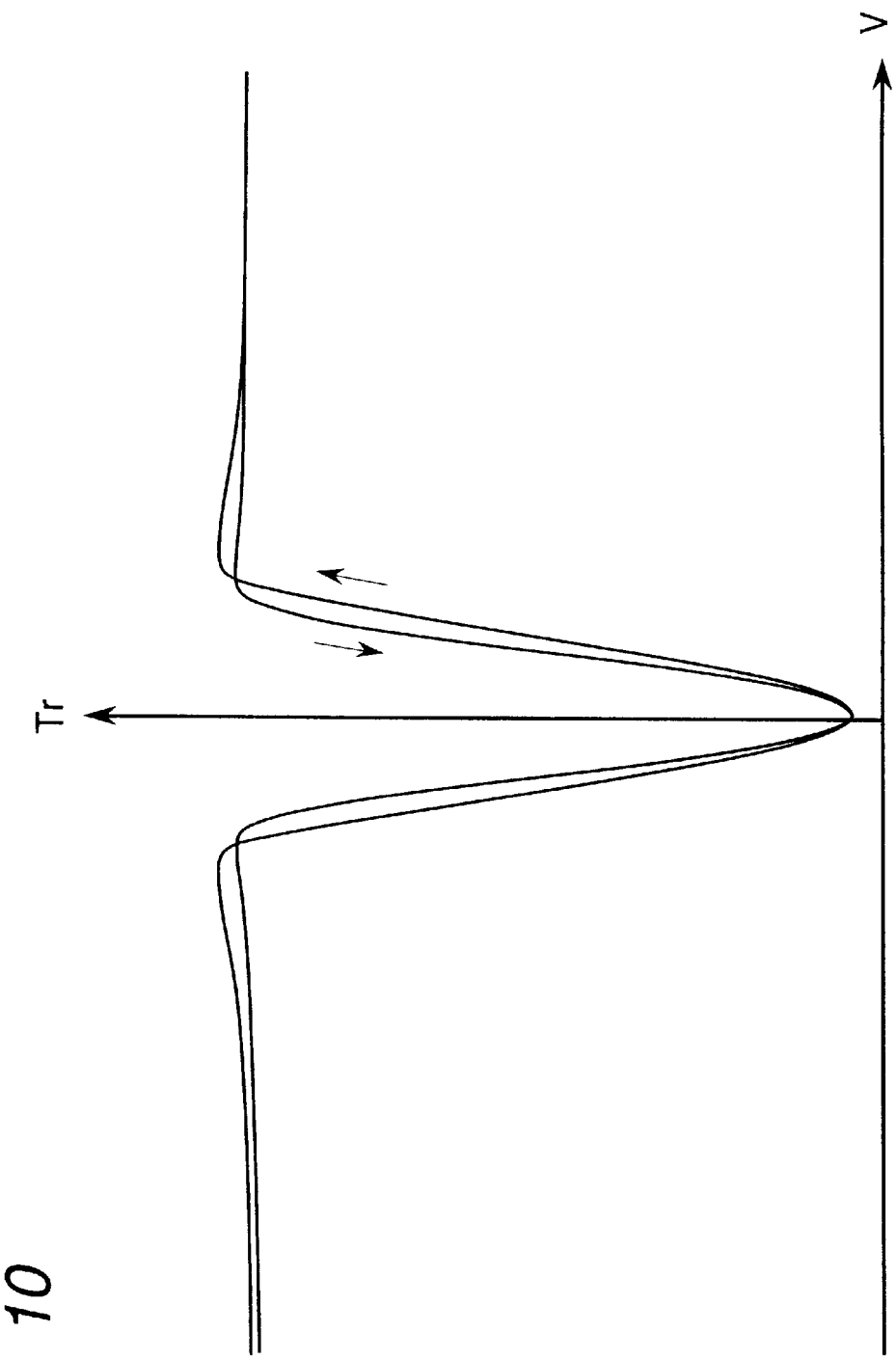
Figure 11:
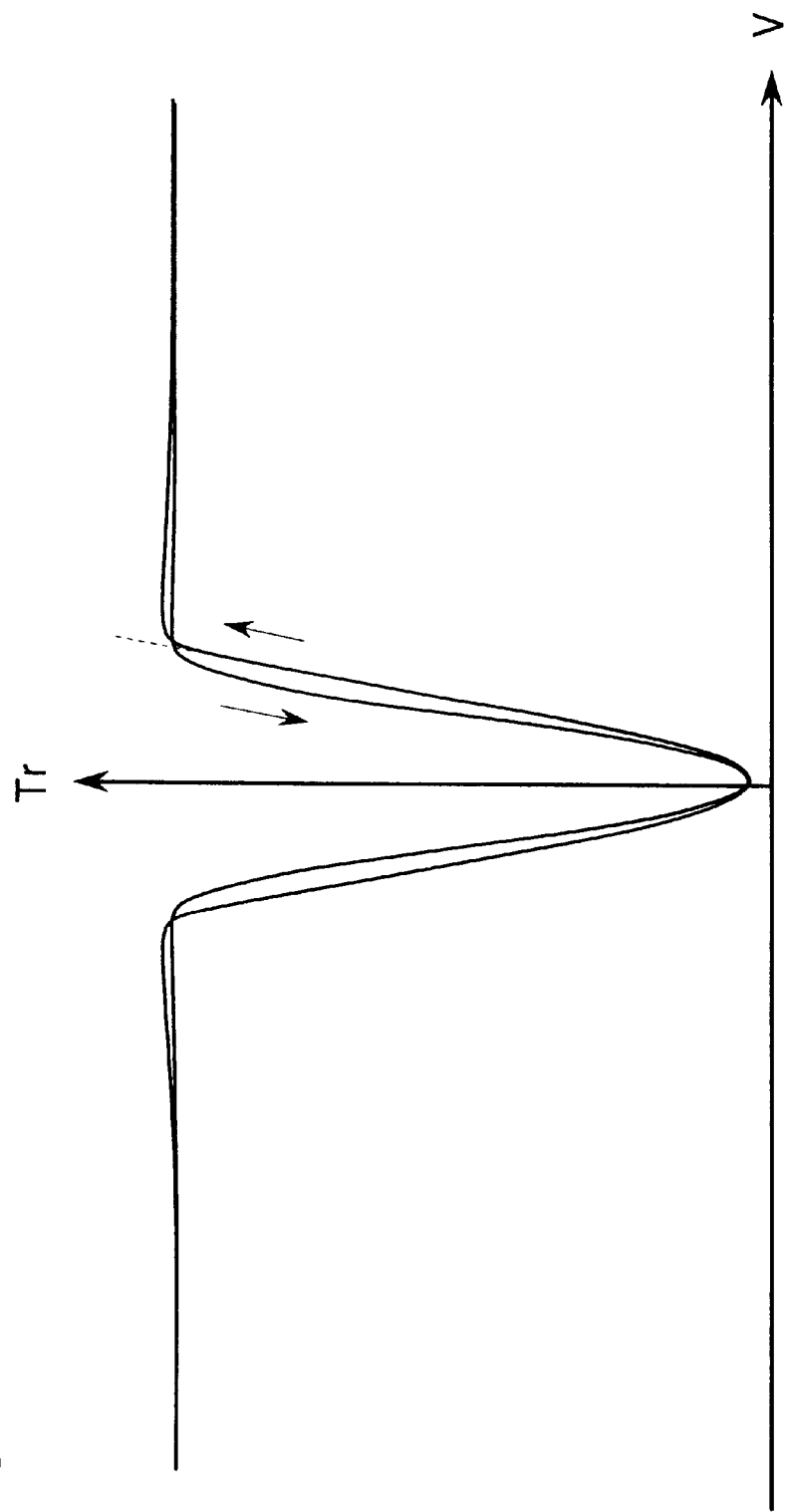
Figure 12:
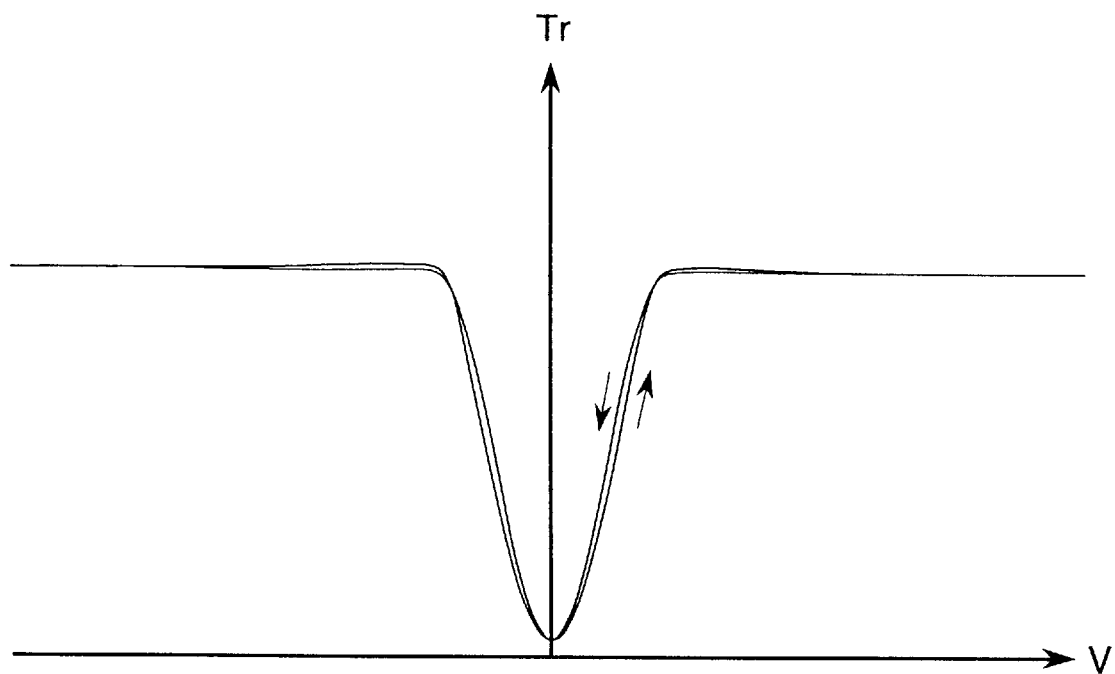

In the liquid crystal element using the liquid crystal composition of the invention, when a voltage is applied between the electrodes of the liquid crystal cell while the smectic liquid crystal material 13 filled inside the liquid crystal cell is kept in the predetermined liquid crystal phase, e.g., antiferroelectric liquid crystal phase, the orientation state of the liquid crystal phase changes according to the polarity and the intensity of the voltage. With the change of the orientation state, the polarization direction of the light incident on the liquid crystal cell is changed, and finally the quantity of the polarized light output in the given direction from the liquid crystal element continuously varies according to the intensity of the voltage applied between the electrodes 12a, 12b of the liquid crystal cell 1, as shown in FIG. 7.

In the liquid crystal element using the liquid crystal composition of the invention, image display, optical switching or optical modulation is conducted utilizing the variation of the polarized light in the given direction.

Figure 3:
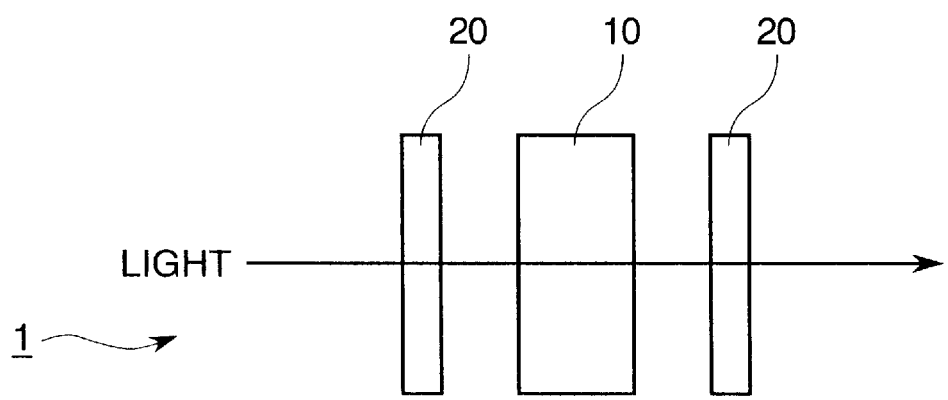
FIG. 3 is a schematic view of a basic structure of a liquid crystal element using the liquid crystal composition of the present invention.

FIG. 3 shows one embodiment of the liquid crystal element using the liquid crystal composition of the invention.

The liquid crystal element 1 shown in FIG. 3 is a transmission type liquid crystal element, and the element includes a liquid crystal cell 10 and a pair of polarization means 20, 20, e.g., polarizing plates, polarization beam splitters or ¼ wave plates. In the liquid crystal element 1, the liquid crystal cell 10 and the pair of the polarization means 20, 20 are arranged in such a manner that the light is transmitted by one polarization means 20, the liquid crystal cell and the other polarization means 20 in this order. The pair of the polarization means 20, 20 are further arranged in the parallel Nicols state or the crossed Nicols state, and positioning of these polarization means 20, 20 and the liquid crystal cell is made so that a difference Tr $(=Tr_{MAX}-Tr_{MIN})$ between the maximum transmittance $Tr_{MIN}$ and the minimum transmittance $Tr_{MIN}$ becomes maximum. However, when the incident light is composed of only a specific polarized component, e.g., vertically polarized component or horizontally polarized component, the polarization control means 20 arranged on the entrance side of the light (left side in FIG. 3) is omissible, and when the light output from the liquid crystal element is observed by an observer with polarizing glasses, the polarization control means 20 arranged on the exit side of the light (right side in FIG. 3) is omissible.

When the liquid crystal element using the liquid crystal composition of the invention is a reflection type liquid crystal element, the polarization control means 20 is placed between the observer and the liquid crystal cell 10. If the incident light is composed of only a specific polarized component, e.g., vertically polarized component or horizontally polarized component, this polarization control means 20 can be omitted.

The liquid crystal element using the liquid crystal composition of the invention can be variously modified according to the use purpose of the element, as far as the element has a liquid crystal cell comprising a pair of electrodes and a smectic liquid crystal material filled between the electrodes and exhibits gradation according to the intensity of the voltage applied between the electrodes, as described above.

The liquid crystal element using the liquid crystal composition of the invention can be driven by varying the intensity of the voltage applied between the electrodes of the liquid crystal cell provided in the element and thereby continuously or stepwise controlling the gradation given by the element.

When the gradation given by the electric liquid crystal element is continuously or stepwise controlled according to the intensity of the voltage applied between the electrodes of the liquid crystal cell, the control of the gradation is achieved in accordance with the electrooptic property of the smectic liquid crystal phase, and therefore the continuous or stepwise control of the gradation can be performed at a higher speed as compared with the case of using the convention nematic liquid crystal element.

According to the conventional antiferroelectric liquid crystal element-having such a property that the light quantity output from the element steeply varies at the threshold voltage when a voltage is applied between the electrodes of the liquid crystal cell, the gradation of a displayed image needs to be exhibited by changing the pixel density. In order to display an image of excellent gradation, therefore, the number of pixels must be increased, and if the number of pixels is increased, the frame frequency for the image display must be lowered.

In contrast therewith, in the driving method of the liquid crystal element using the liquid crystal composition of the invention, the quantity of the polarized light output in the given direction from the element continuously or stepwise varies according to the intensity of the voltage applied between the electrodes of the liquid crystal cell. In order to obtain a displayed image of excellent gradation, therefore, increase of the number of pixels is unnecessary, and lowering of the frame frequency associated with the increase of the number of pixels is naturally unnecessary.

Accordingly, the driving method of the liquid crystal element using the liquid crystal composition of the invention is favorable as a driving method of an liquid crystal element for displaying a photographic image which needs high gradation or as a driving method of an liquid crystal element for displaying moving images of natural motion.

EFFECT OF THE INVENTION

According to the first and the second compositions of the invention, by the mere change of a voltage applied between the electrodes of the liquid crystal cell provided in the liquid crystal element (particularly, smectic liquid crystal element), the quantity of a light output from the liquid crystal element continuously or stepwise varies according to the intensity of the voltage, and therefore an image of excellent gradation can be displayed at a high speed by means of an active matrix driving system.

According to the second liquid crystal composition of the invention, the quantity of a light output from the antiferroelectric liquid crystal element forms antiferroelectric hysteresis according to the voltage applied between the electrodes of the liquid crystal cell, and the antiferroelectric hysteresis can be made small.

By driving a liquid crystal cell filled with the second liquid crystal composition of the invention on an active matrix system, the liquid crystal element having the liquid crystal cell can display an image of excellent gradation, and the displayed images have a wide range of an angle at which the images are visible. Therefore, this driving method is favorable to display full color images.

EXAMPLE

The present invention is further described with reference to the following examples, but it should be construed that the invention is in no way limited to those examples.

In the following examples, phase transition temperatures of each liquid crystal material were measured by a DSC method. Identification of phases was made in the following manner. A liquid crystal element having a liquid crystal cell containing each liquid crystal material was prepared, and the orientation state of the liquid crystal material given after the liquid crystal material was electrooptically changed was observed by a polarization microscope.

stantially parallel to each other, to form a liquid crystal cell 10 shown in FIG. 1. The width of the cell gap 14 was adjusted to 2 μm by means of a spacer 15.

Into the cell gap 14 was poured a liquid crystal composition which consisted of the following compounds (I-1) to (I-4) all represented by the aforesaid formula (I) and the following compound (II-1) represented by the aforesaid formula (II) in the compounding ratio shown in Table 1 and was in an isotropic liquid crystal phase. Then, the liquid crystal cell 10 was sealed with a sealing material 16 and was slowly cooled to room temperature at a cooling rate of 1° C./min.

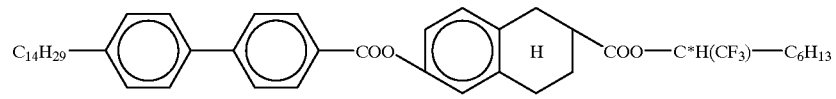
(I-1)

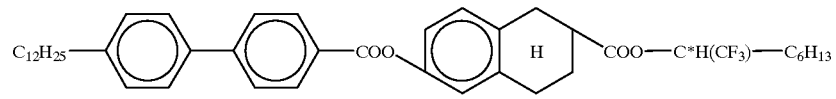
(I-2)

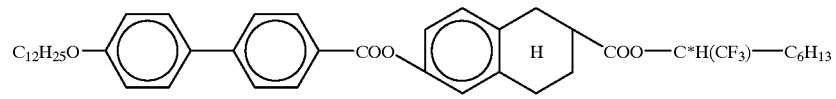
(I-3)

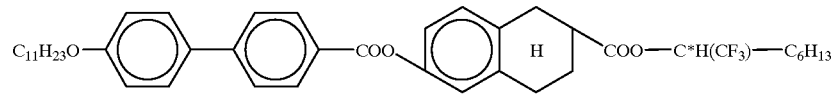
(I-4)

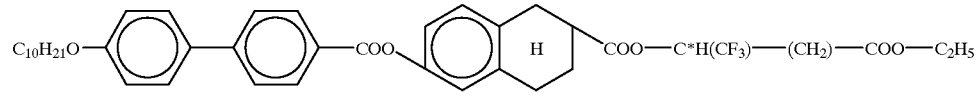
(II-1)

The phase transition temperatures TAF-F, TAC and TISO shown in the following tables mean a phase transition temperature (TAF-F) at which the liquid crystal material changes from the antiferroelectric liquid crystal phase to the ferroelectric liquid crystal phase, a phase transition temperature (TAC) at which the liquid crystal material changes from the ferroelectric liquid crystal phase to the SmA phase, and a phase transition temperature (TISO) at which the liquid crystal material changes from the SmA phase to the isotropic liquid phase, respectively, in the course of temperature rise.

Examples 1–6, Reference Examples 1 and 2

On transparent substrates 11a, 11b made of glass plates were formed transparent electrodes 12a, 12b made of ITO (indium tin oxide), respectively, and on each of the electrodes was formed an orientation film made of polyimide. Then, the orientation films were subjected to a rubbing treatment so that the molecules of the liquid crystal compound to be contacted with the films would be orientated in the given direction. The electrodes with the orientation films were arranged in such a manner that the orientation control directions of the orientation films were opposite and sub- Using the liquid crystal cell 10, a liquid crystal element 1 shown in FIG. 3 was prepared. As the polarization control means 20, polarizing plates were used, and the polarizing plates were arranged in such a manner that the polarization directions of the plates were at right angles to each other. Further, the liquid crystal cell 10 was arranged between the polarization control means 20 in such a manner that the quantity of a light transmitted by one polarization control means 20, the liquid crystal cell 10 and the other polarization control means 20 in this order (referred to as "transmitted light quantity of the liquid crystal element 1" hereinafter) became minimum to form the darkest state (Tr0) with the proviso that no voltage was applied between the electrodes 12a and 12b.

Then, a triangular wave voltage (frequency: 0.01 Hz, peak voltage: 30 V/μm) was applied between the transparent electrodes 12a and 12b of the liquid crystal cell 10 of the liquid crystal element 1 shown in FIG. 3 at room temperature, and the transmitted light quantity (light transmittance, Tr) of the liquid crystal element 1 was monitored.

The resulting V-Tr curves are shown in FIGS. 7 to 13.

The V-Tr curves given by the respective Liquid crystal elements 1 using the compositions of Examples 1 to 6 set forth in Table 1 are shown in FIGS. 7 to 12 in this order, and the V-Tr curve given by the liquid crystal element 1 using the composition of Reference Example 2 is shown in FIG. 13.

The threshold voltage, hysteresis width and gradation property were evaluated in the following manner.

(a) Threshold Voltage

Figure 4:
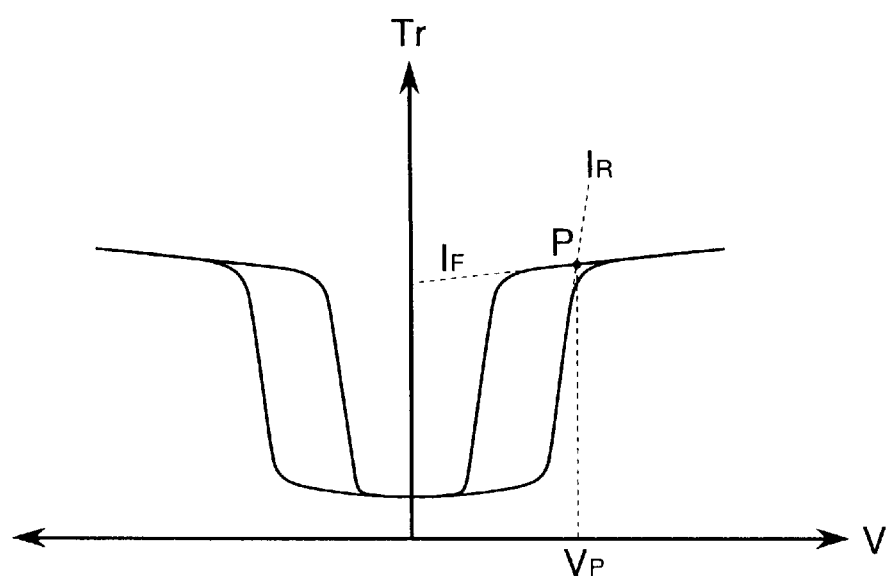
FIG. 4 is a drawing to explain a method for evaluating a threshold voltage necessary for changing the smectic liquid crystal material capable of exhibiting an antiferroelectric state filled between electrodes from the antiferroelectric state to a ferroelectric state by applying a voltage between the electrodes of the liquid crystal cell in the liquid crystal element.

When the voltage V applied between the electrodes 12a and 12b of the liquid crystal cell 10 is increased from zero in the positive direction, the state of the composition changes from the antiferroelectric state to the ferroelectric state, and the transmittance Tr of the liquid crystal element 1 is increased to form, for example, a V-Tr curve shown in FIG. 4. In case of FIG. 4, an intersection point P of the tangent line $I_R$ of the V-Tr curve and the tangent line $I_F$ of the V-Tr curve within the ferroelectric state region is found, and the voltage $V_P$ at this intersection point P is evaluated as the threshold voltage.

(b) Hysteresis Width

An average value $Tr_{HALF}$ of the maximum transmittance $Tr_{MAX}$ and the minimum transmittance $Tr_{MIN}$ shown in FIG. 6 is calculated from the following equation.

$$Tr_{HALF}=(Tr_{MAX}+Tr_{MIN})/2$$

A difference $V_W$ (=$V_{H1}-V_{H2}$) between the voltage $V_{H1}$ and the voltage $V_{H2}$ both of which correspond to the value of $Tr_{HALF}$ in the hysteresis curve shown in FIG. 6 is evaluated as a hysteresis width.

(c) Gradation Property

Referring to FIG. 5, an area $S_O$ of a rectangular triangle having as an oblique side a straight line PQ which has, as both ends, the intersection point P of the tangent lines $I_R$ and $I_F$ described in the evaluation method a) in accordance with FIG. 4 and an intersection point Q of an axis of ordinate and the hysteresis curve is found. An area $S_H$ of a hutched region enclosed with the straight line PQ and the V-Tr curve given by the liquid crystal element 1 when the state of the composition changes from the antiferroelectric state to the ferroelectric state is found.

The value calculated from the formula $S_H/S_O$ is regarded as a voltage gradation parameter L.

A voltage gradation parameter L of small value basically indicates excellent gradation property, but in the range of L<0.3, there is no significant difference in the gradation property.

The results of the evaluation are set forth in Table 1.

TABLE 1

| Type of | Example | | | | | | Reference Example | |
|---|---|---|---|---|---|---|---|---|
| Compound | 1 | 2 | 3 | 4 | 5 | 6 | 1 | 2 |
| (I-1) (wt %) | 10.3 | 10 | 9.44 | 8.88 | 8.6 | 7.1 | 5.7 | 14.3 |
| (I-2) (wt %) | 10.3 | 10 | 9.44 | 8.88 | 8.6 | 7.1 | 5.7 | 14.3 |
| (I-3) (wt %) | 41.2 | 40 | 37.7 | 35.4 | 34.3 | 28.6 | 22.9 | 57.1 |
| (I-4) (wt %) | 10.3 | 10 | 9.44 | 8.88 | 8.6 | 7.1 | 5.7 | 14.2 |
| (II-1) (wt %) | 27.9 | 30 | 34 | 38 | 40 | 50 | 60 | 0 |
| Voltage gradation parameter L | 0.29 | 0.32 | 0.10 | 0.19 | 0.21 | 0.14 | | 0.96 |
| Hysteresis width (volt) | 1.96 | 1.10 | 0.72 | 0.63 | 0.65 | 0.32 | | 11.3 |
| Threshold voltage (volt) | 8.8 | 7.5 | 6.9 | 6.3 | 6.1 | 5.0 | | 26.4 |
| Phase transition temperature | | | | | | | | |
| TAF-F[*1] | 78 | 77 | 75 | 73 | 73 | 68 | — | 86 |
| TAC[*2] | — | — | — | — | — | — | 63 | 91 |
| TISO | 100 | 99 | 96 | 93 | 93 | 87 | 79 | 113 |

[*1]TAF-F means an upper limit temperature of the SmC$_A$* phase.
[*2]TAC means an upper limit temperature of the SmC* phase.

As is apparent from Table 1, the compositions of Examples 1 to 6 containing the compounds represented by the formula (I) were each capable of exhibiting an antiferroelectric liquid crystal phase, and when the smectic liquid crystal composition capable of exhibiting the antiferroelectric phase was used, the voltage gradation parameter L was not more than 0.3. In contrast therewith, in Reference Example 2 wherein an antiferroelectric liquid crystal mixture of two or more compounds represented by the formula (I) was used, the voltage gradation parameter L was 0.96.

From the above results, it has been confirmed that if the smectic liquid crystal composition which contains the compound represented by the formula (I) and the compound represented by the formula (II-1) and is capable of exhibiting an antiferroelectric liquid crystal phase is used, the gradation property of the liquid crystal element is improved by virtue of the interaction between those compounds.

From the above results, it has been also confirmed that if the smectic liquid crystal composition which contains the compound represented by the formula (I) and the compound represented by the formula (II-1) and is capable of exhibiting an antiferroelectric liquid crystal phase is used, the hysteresis width and the threshold voltage of the V-Tr curve given by the liquid crystal element are improved by virtue of the interaction between those compounds.

In each the smectic liquid crystal compositions of Examples 1 to 6, the compound represented by the formula (II-1) was contained in an amount of 27.9 to 50% by weight. From this fact, it has been confirmed that, with increase of the amount of the compound represented by the formula (II-1), the hysteresis width and the threshold voltage become smaller and are more improved.

On the other hand, the liquid crystal composition of Reference Example 1 containing 60% by weight of the compound represented by the formula (II-1) did not exhibit the antiferroelectric liquid crystal phase.

Example 7

A liquid crystal element 1 was prepared in the same manner as in Example 1, except that a liquid crystal composition consisting of the following compounds (I-5) and (I-6) both represented by the formula (I) and the compound (II-1) represented by the formula (II) in the compounding ratio shown in Table 2 was used as the smectic liquid crystal material 13. The phase transition temperatures TAF-F, TAC and TISO of the liquid crystal composition and the V-Tr curve of the liquid crystal element 1 were measured to evaluate the gradation property (voltage gradation parameter L), hysteresis width and the threshold voltage.

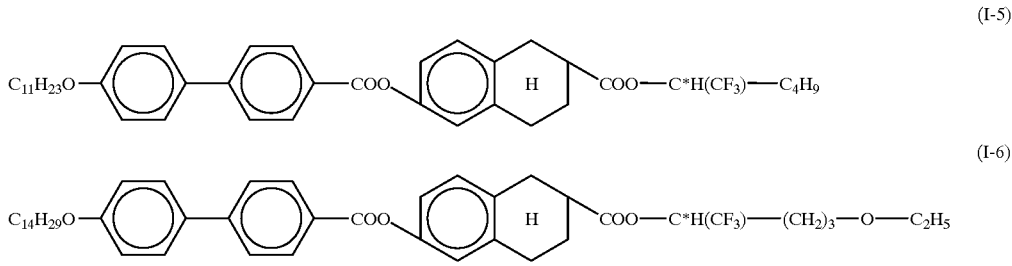

(I-5)

(I-6)

Figure 14:
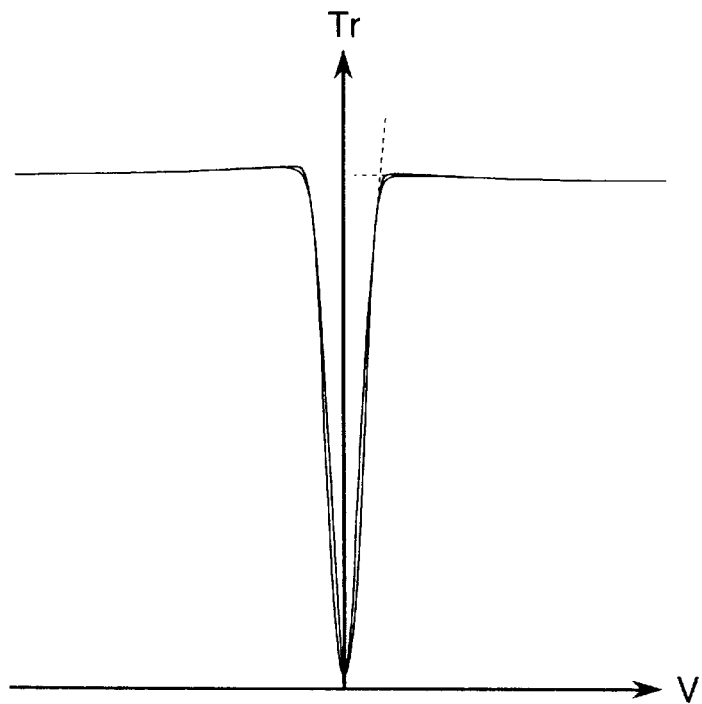

The V-Tr curve is shown in FIG. 14, and other results are set forth in Table 2.

TABLE 2

|  | | Example 7 |
|---|---|---|
| Type of Compound | | |
| (I-5) | (% by weight) | 48 |
| (I-6) | (% by weight) | 47 |
| (II-1) | (% by weight) | 5 |
| Voltage gradation parameter L | | 0.25 |
| Hysteresis width (volt) | | 0.33 |
| Threshold voltage (volt) | | 3.5 |
| Phase transition temperature (° C.) | | |
| TAF-F | | 80 |
| TAC | | 105 |
| TISO | | 132 |

As is apparent from Table 2, the composition of Example 7 was capable of exhibiting an antiferroelectric liquid crystal phase, and the voltage gradation parameter L of the smectic liquid crystal composition capable of exhibiting the antiferroelectric liquid crystal phase was not more than 0.3. This suggests that the liquid crystal element 1 having the liquid crystal cell 10 filled with the smectic liquid crystal composition can easily display an image of excellent gradation by changing the intensity of the voltage applied between the electrodes 12a and 12b of the liquid crystal cell 10.

From the fact that the V-Tr curve of the liquid crystal element 1 has a narrow hysteresis width and a low threshold voltage, it has been confirmed that this liquid crystal element 1 is suitable for being driven on the active matrix system.

Example 8

A liquid crystal element 1 was prepared in the same manner as in Example 1, except that a liquid crystal composition consisting of the following compounds (I-7) and (I-8) both represented by the formula (I) and the following compound (II-2) represented by the formula (II) in the compounding ratio shown in Table 3 was used as the smectic liquid crystal material 13. The phase transition temperatures TAF-F, TAC and TISO of the liquid crystal composition and the V-Tr curve of the liquid crystal element 1 were measured to evaluate the gradation property (voltage gradation parameter L), hysteresis width and the threshold voltage.

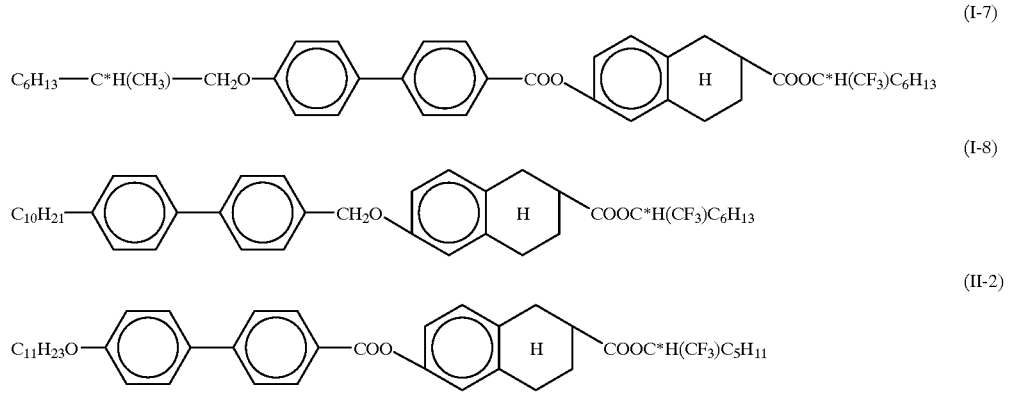

(I-7)

(I-8)

(II-2)

Figure 15:
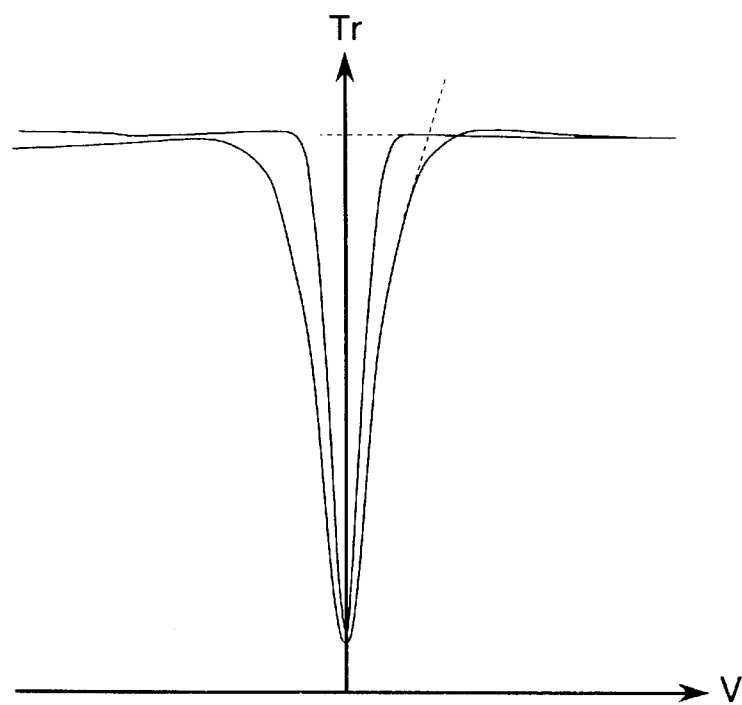

The V-Tr curve is shown in FIG. 15, and other results are set forth in Table 3.

TABLE 3

|  | | Example 8 |
|---|---|---|
| Type of Compound | | |
| (I-7) | (% by weight) | 20 |
| (I-8) | (% by weight) | 20 |
| (II-2) | (% by weight) | 60 |
| Voltage gradation parameter L | | 0.23 |
| Hysteresis width (volt) | | 0.94 |
| Threshold voltage (volt) | | 7.6 |

TABLE 3-continued

|  | Example 8 |
|---|---|
| Phase transition temperature (° C.) | |
| TAF-F | 82 |
| TAC | — |
| TISO | 107 |

As is apparent from Table 3, the composition of Example 8 was capable of exhibiting an antiferroelectric liquid crystal phase, and the voltage gradation parameter L of the smectic liquid crystal composition capable of exhibiting the antiferroelectric liquid crystal phase was not more than 0.3. This suggests that the liquid crystal element 1 having the liquid crystal cell 10 filled with the smectic liquid crystal composition can easily display an image of excellent gradation by changing the intensity of the voltage applied between the electrodes 12a and 12b of the liquid crystal cell 10.

From the fact that the V-Tr curve of the liquid crystal element 1 has a narrow hysteresis width and a low threshold voltage, it has been confirmed that this liquid crystal element 1 is suitable for being driven on the active matrix system.

As for the composition of Example 8, the compound of the formula (II-2) is identical with the compounds of the formulas (I-7) and (I-8) except that the chiral portion is an alkyl group having carbon atoms of an odd number. This suggests that a liquid crystal element of excellent gradation property can be obtained by the use of a smectic liquid crystal composition containing a mixture of the compound represented by the formula (I) and the compound having a structure common to that of the compound of the formula (I) except that the chiral portion is an alkyl group having carbon atoms of an odd number.

Example 9

A liquid crystal element 1 was prepared in the same manner as in Example 1, except that a liquid crystal composition consisting of the compound (I-1), the compound (I-8) and the compound (II-1) in the compounding ratio shown in Table 4 was used as the smectic liquid crystal material 13. The phase transition temperatures TAF-F, TAC and TISO of the liquid crystal composition and the V-Tr curve of the liquid crystal element 1 were measured to evaluate the gradation property (voltage gradation parameter L), hysteresis width and the threshold voltage.

Figure 16:
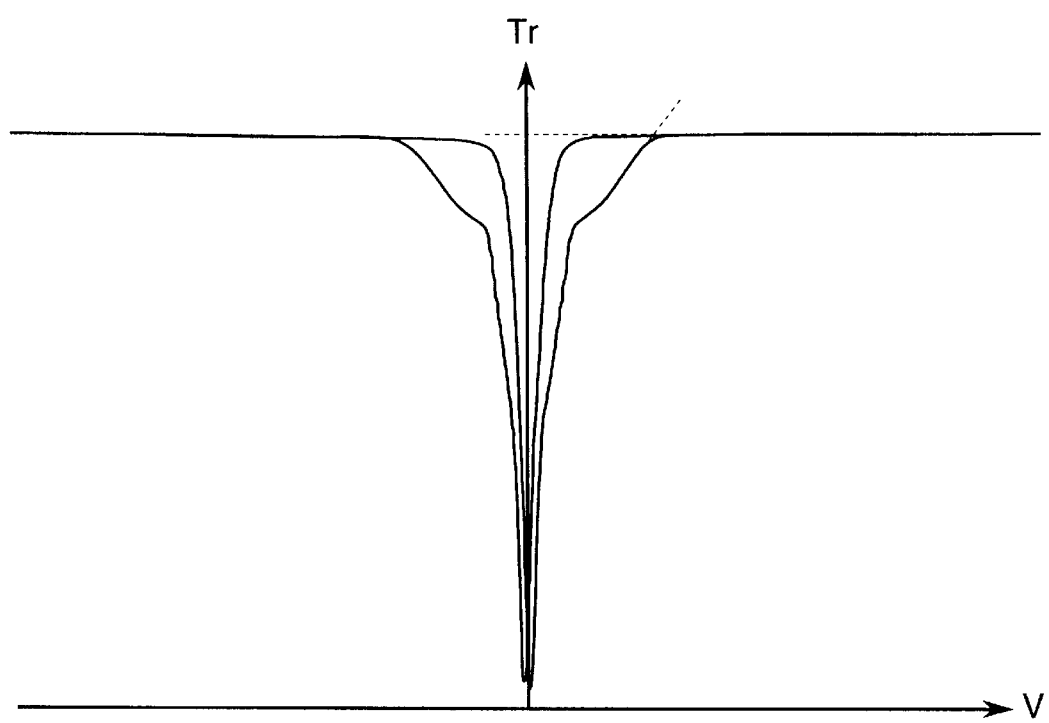

The V-Tr curve is shown in FIG. 16, and other results are set forth in Table 4.

TABLE 4

|  |  | Example 9 |
|---|---|---|
| Type of Compound | | |
| (I-1) | (% by weight) | 76 |
| (I-8) | (% by weight) | 5 |
| (II-1) | (% by weight) | 19 |
| Voltage gradation parameter L | | 0.50 |
| Hysteresis width (volt) | | 0.32 |
| Threshold voltage (volt) | | 5.1 |
| Phase transition temperature (° C.) | | |
| TAF-F | | 51 |
| TAC | | 56 |
| TISO | | 87 |

As is apparent from Table 4, the composition of Example 9 was-capable of exhibiting an antiferroelectric liquid crystal phase, and the voltage gradation parameter L of the smectic liquid crystal composition capable of exhibiting the antiferroelectric liquid crystal phase was not more than 0.5. This suggests that the liquid crystal element 1 having the liquid crystal cell 10 filled with the smectic liquid crystal composition can easily display an image of excellent gradation by changing the intensity of the voltage applied between the electrodes 12a and 12b of the liquid crystal cell 10.

From the fact that the V-Tr curve of the liquid crystal element 1 has a narrow hysteresis width and a low threshold voltage, it has been confirmed that this liquid crystal element 1 is suitable for being driven on the active matrix system.

Examples 10–12

A liquid crystal element 1 was prepared in the same manner as in Example 1, except that a liquid crystal composition consisting of the compounds (I-1) to (I-4) all represented by the formula (I), the following compounds (I-9) and (I-10) both represented by the formula (I), the compound (II-1) represented by the formula (II) and the following compound (II-3) represented by the formula (II) in the compounding ratio shown in Table 5 was used as the smectic liquid crystal material 13. The phase transition temperatures TAF-F, TAC and TISO of the liquid crystal composition and the V-Tr curve of the liquid crystal element 1 were measured to evaluate the gradation property (voltage gradation parameter L), hysteresis width and the threshold voltage.

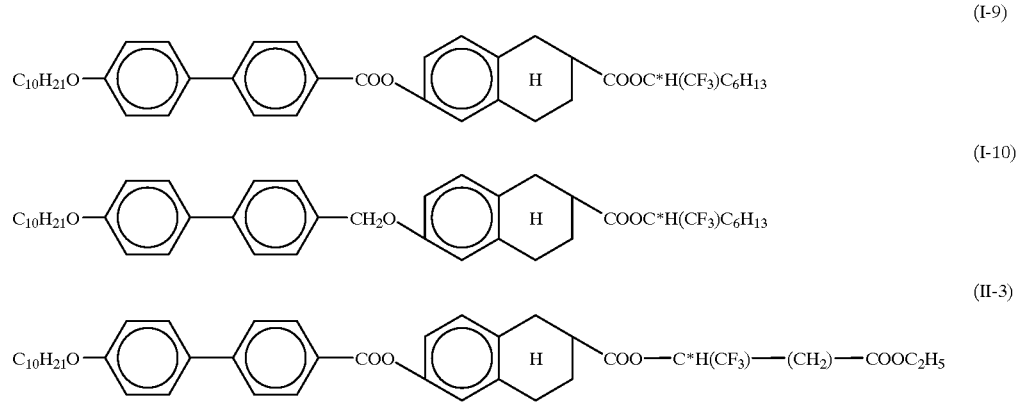

Figure 17:
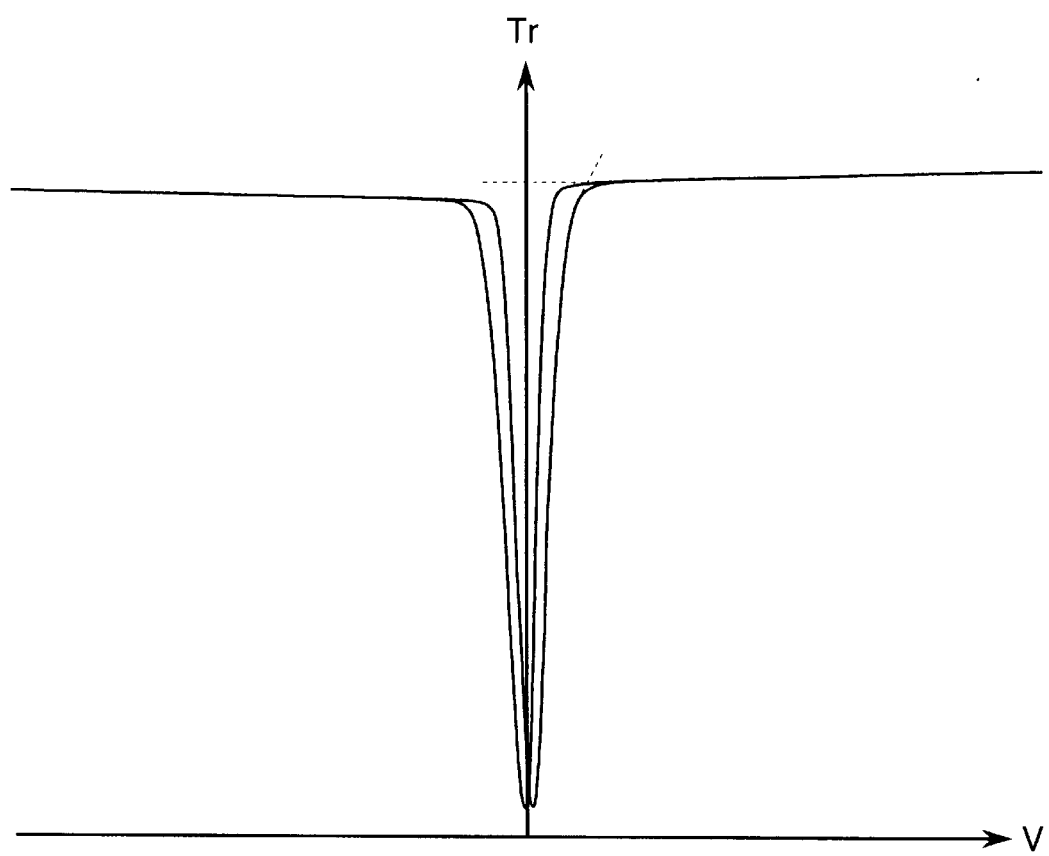
Figure 18:
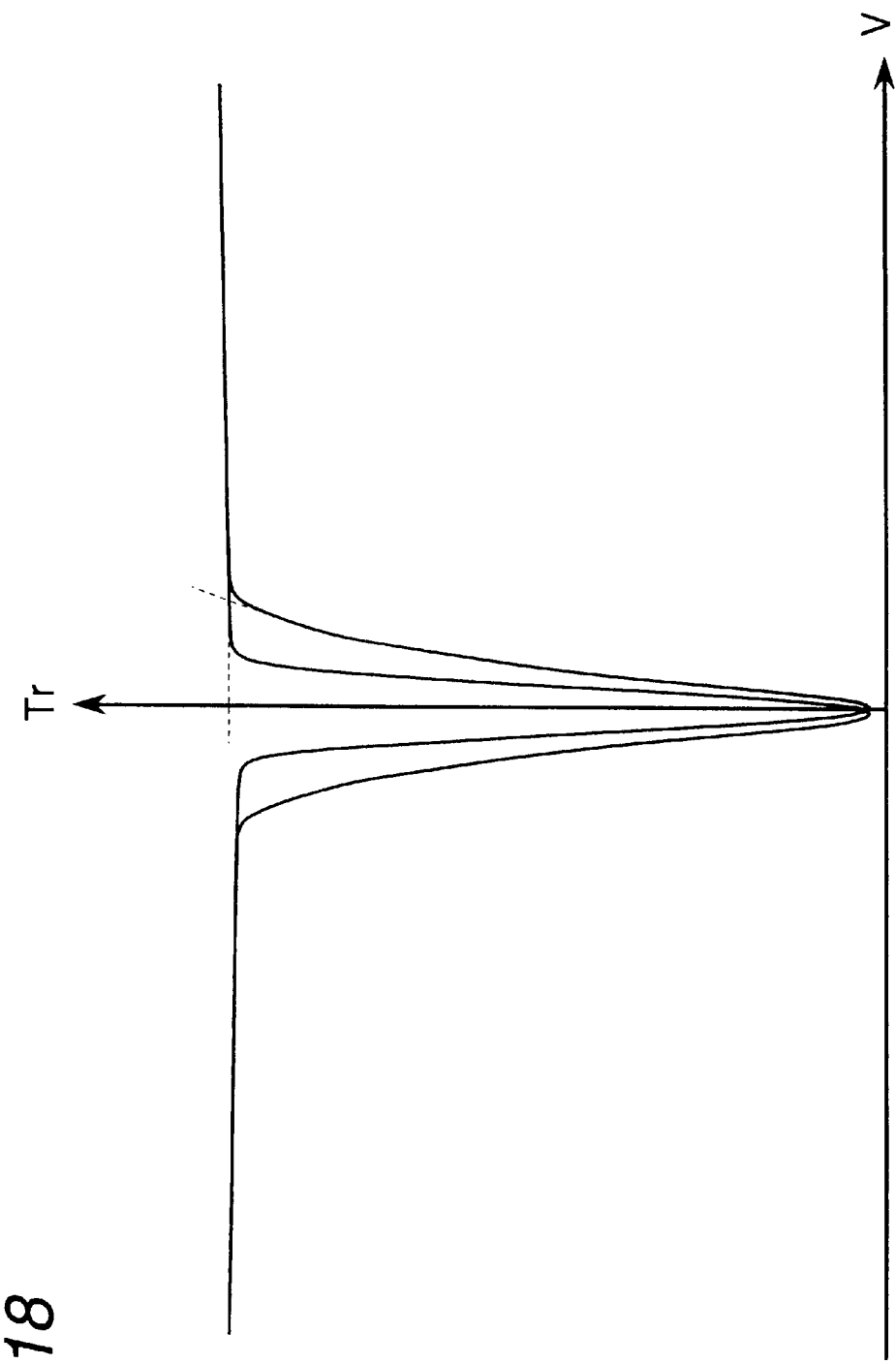
Figure 19:
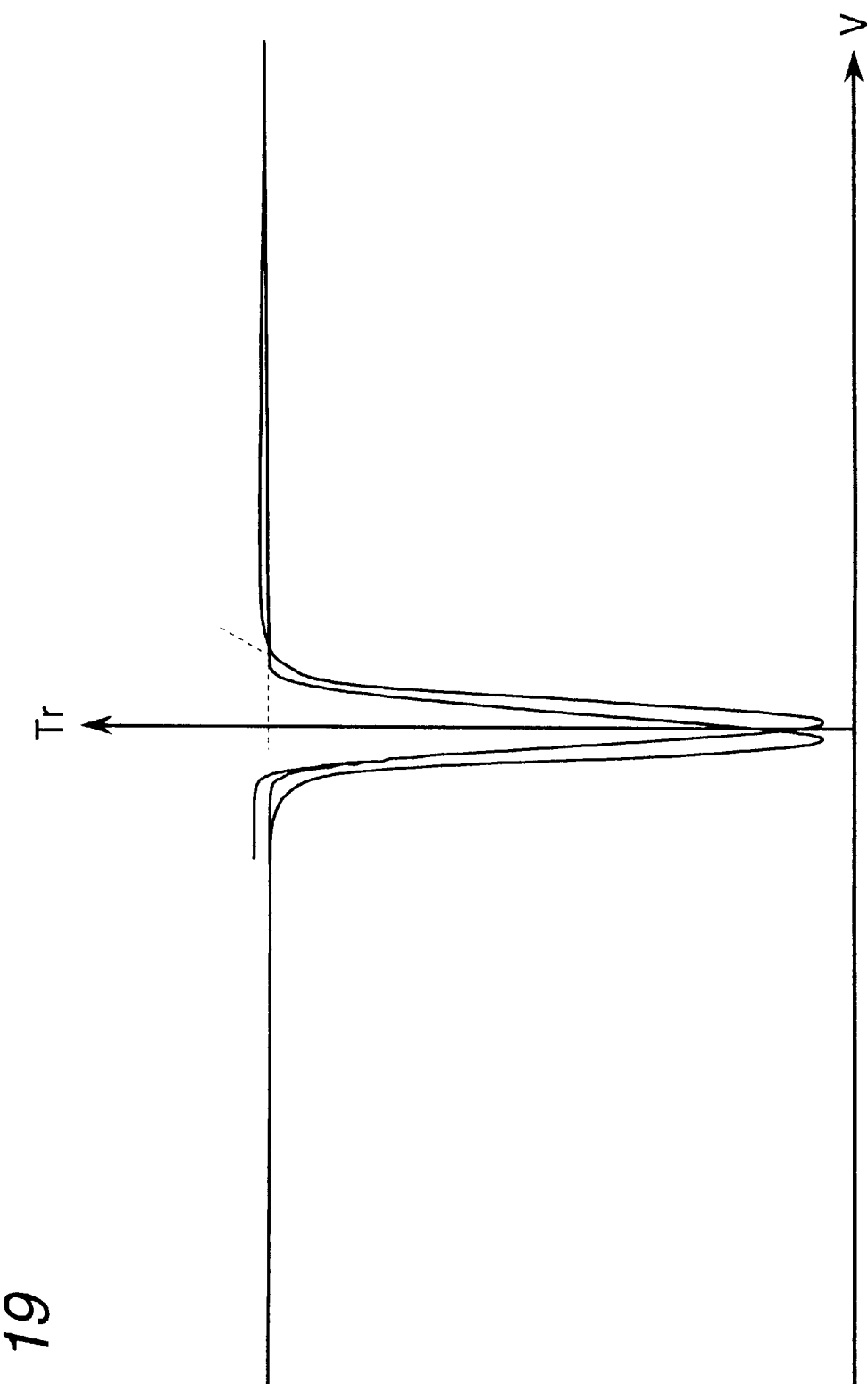

The V-Tr curves are shown in FIGS. 17 to 19, and other results are set forth in Table 5.

The V-Tr curves given by the respective liquid crystal compounds 1 using the compositions of Examples 10 to 12 set forth in Table 5 are shown in FIGS. 17 to 19 in this order.

TABLE 5

|  |  | Ex. 10 | Ex. 11 | Ex. 12 |
|---|---|---|---|---|
| Type of Compound |  |  |  |  |
| (I-1) | (% by weight) | 10 | 10 | 10 |
| (I-2) | (% by weight) | — | 10 | 10 |
| (I-3) | (% by weight) | — | 40 | 40 |
| (I-4) | (% by weight) | 10 | — | — |
| (I-9) | (% by weight) | 10 | 10 | 10 |
| (I-10) | (% by weight) | 40 | — | — |
| (II-1) | (% by weight) | 30 | 20 | — |
| (II-3) | (% by weight) | — | 10 | 30 |
| Voltage gradation parameter L |  | 0.25 | 0.23 | 0.14 |
| Hysteresis width (volt) |  | 0.47 | 0.71 | 0.52 |
| Threshold voltage (volt) |  | 2.9 | 5.2 | 2.7 |
| Phase transition temperature (° C.) |  |  |  |  |
| TAF-F |  | 68 | 68 | 78 |
| TAC |  | — | — | 91 |
| TISO |  | 92 | 98 | 118 |

As is apparent from Table 5, each of the compositions of Examples 10 to 12 was capable of exhibiting antiferroelectric liquid crystal phase, and the voltage gradation parameter L of each smectic liquid crystal composition capable of exhibiting the antiferroelectric liquid crystal phase was not more than 0.3. This suggests that the liquid crystal element 1 having the liquid crystal cell 10 filled with the smectic liquid crystal composition can easily display an image of excellent gradation by changing the intensity of the voltage applied between the electrodes 12a and 12b of the liquid crystal cell 10.

From the fact that the V-Tr curve of the liquid crystal element 1 has a narrow hysteresis width and a low threshold voltage, it has been confirmed that these liquid crystal elements 1 are suitable for being driven on the active matrix system.

From the results of Example 10, it has been confirmed that also the compound of the formula (I-10) having a methyleneoxy bond (—CH$_2$O—) in the skeleton structure is useful for preparing the smectic liquid crystal composition of the invention, similarly to the compounds of the formulas (I-1) to (I-9) each having a carbonyloxy bond (—COO—) in the skeleton structure.

From the results of Examples 11 and 12, the following has been confirmed. When the composition using a mixture of the compound of the formula (II-3) and the compound of the formula (I) is filled between the electrodes 12a and 12b of the liquid crystal cell 10, the quantity of the light output from the liquid crystal element 1 having the liquid crystal cell 10 varies over the wide voltage range by the application of a voltage between the electrodes 12a and 12b, whereby a liquid crystal element capable of easily controlling gradation according to the intensity of the voltage applied between the electrodes 12a and 12b of the liquid crystal cell 10 can be obtained, similarly to the composition using a mixture of the compound of the formula (II-1) or (II-2) and the compound of the formula (I).

Example 13

A liquid crystal element 1 was prepared in the same manner as in Example 1, except that a liquid crystal composition consisting of the compound (I-2) and the compound (I-6) in the compounding ratio shown in Table 6 was used as the smectic liquid crystal material 13. The phase transition temperatures TAF-F, TAC and TISO of the liquid crystal composition and the V-Tr curve of the liquid crystal element 1 were measured to evaluate the gradation property (voltage gradation parameter L), hysteresis width and the threshold voltage.

Figure 20:
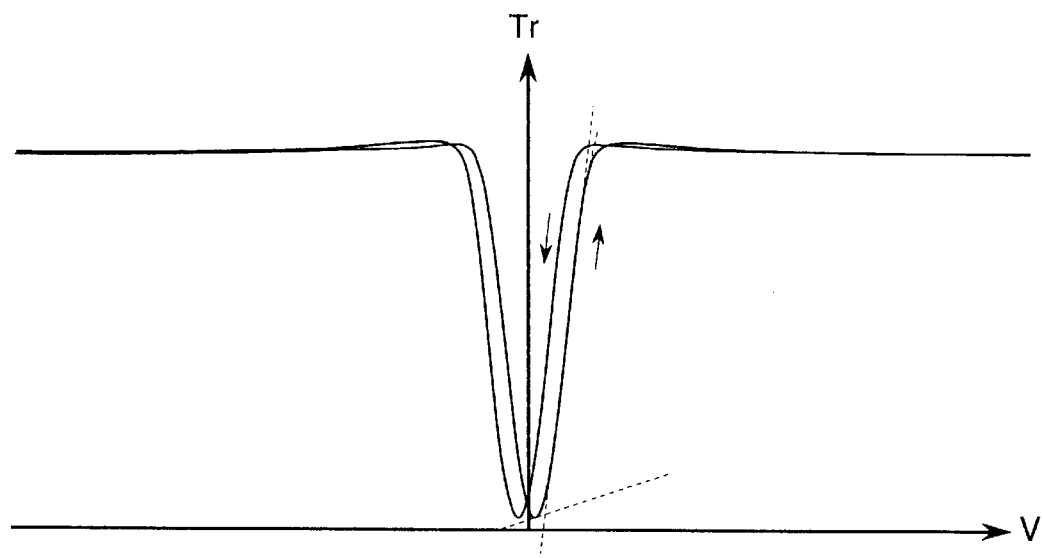

The V-Tr curve is shown in FIG. 20, and other results are set forth in Table 6.

TABLE 6

|  |  | Example 13 |
|---|---|---|
| Type of Compound |  |  |
| (I-2) | (% by weight) | 80 |
| (I-6) | (% by weight) | 20 |
| Voltage gradation parameter L |  | 0.23 |
| Hysteresis width (volt) |  | 1.1 |
| Threshold voltage (volt) |  | 4.0 |
| Phase transition temperature (° C.) |  |  |
| TAF-F |  | 82 |
| TAC |  | — |
| TISO |  | 102 |

Example 14

A liquid crystal element 1 was prepared in the same manner as in Example 1, except that a liquid crystal composition consisting of the compound (I-2) and the following compound (I-11) represented by the formula (I) in the compounding ratio shown in Table 7 was used as the smectic liquid crystal material 13. The phase transition temperatures TAF-F, TAC and TISO of the liquid crystal composition and the V-Tr curve of the liquid crystal element 1 were measured to evaluate the gradation property (voltage gradation parameter L), hysteresis width and the threshold voltage.

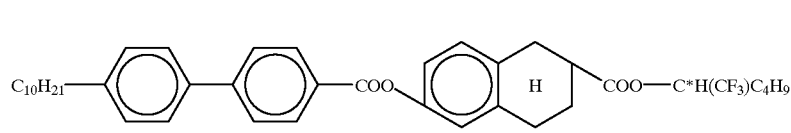

(I-11)

Figure 21:
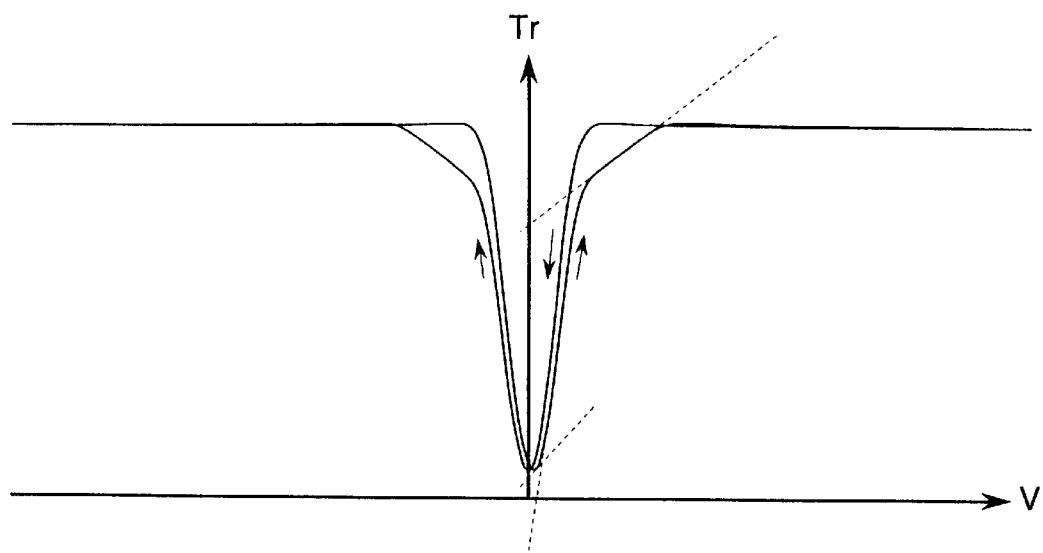

The V-Tr curve is shown in FIG. 21, and other results are set forth in Table 7.

TABLE 7

|  |  | Example 14 |
|---|---|---|
| Type of Compound |  |  |
| (I-2) | (% by weight) | 90 |
| (I-11) | (% by weight) | 10 |
| Voltage gradation parameter L |  | 0.11 |
| Hysteresis width (volt) |  | 0.5 |
| Threshold voltage (volt) |  | 3.2 |

TABLE 7-continued

|  | Example 14 |
|---|---|
| Phase transition temperature (° C.) | |
| TAF-F | 87 |
| TAC | — |
| TISO | 108 |

Example 15

A liquid crystal element 1 was prepared in the same manner at in Example 1, except that a liquid crystal composition consisting of the compound (I-6) and the following compound (I-12) represented by the formula (I) in the compounding ratio shown in Table 8 was used as the smectic liquid crystal material 13. The phase transition temperatures TAF-F, TAC and TISO of the liquid crystal composition and the V-Tr curve of the liquid crystal . element 1 were measured to evaluate the gradation property (voltage gradation parameter L), hysteresis width and the threshold voltage.

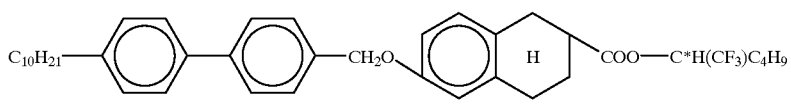

(I-12)

Figure 22:
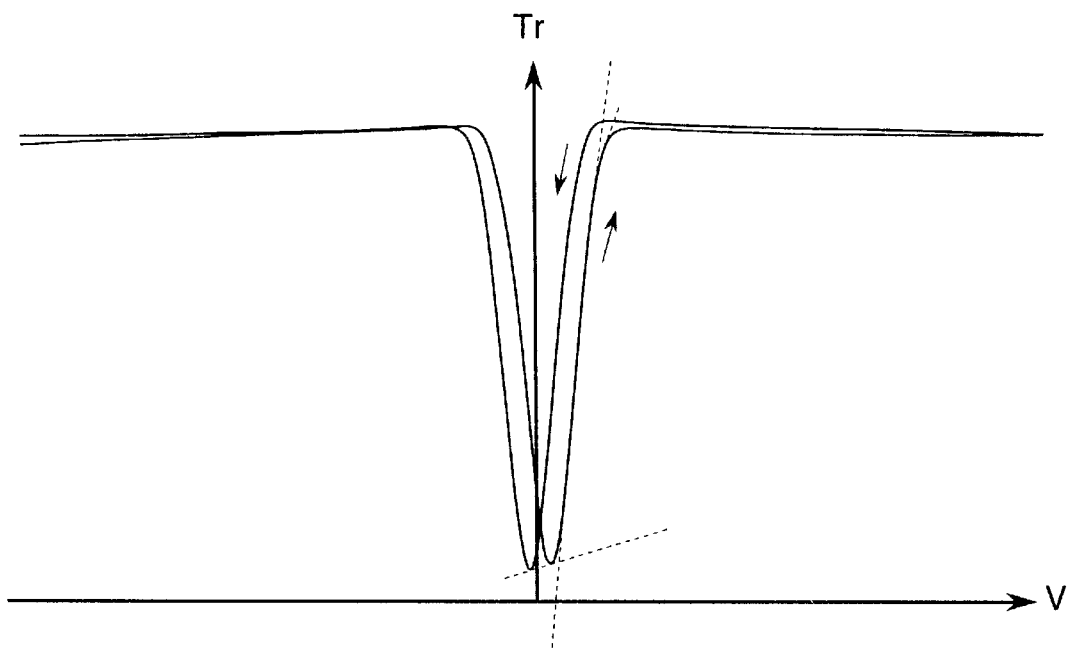

The V-Tr curve is shown in FIG. 22, and other results are set forth in Table 8.

TABLE 8

|  | Example 15 |
|---|---|
| Type of Compound | |
| (I-6) (% by weight) | 20 |
| (I-12) (% by weight) | 80 |
| Voltage gradation parameter L | 0.27 |
| Hysteresis width (volt) | 1.1 |
| Threshold voltage (volt) | 5.0 |
| Phase transition temperature (° C.) | |
| TAF-F | 75 |
| TAC | — |
| TISO | 85 |

Example 16

A liquid crystal element 1 was prepared in the same manner as in Example 1, except that a liquid crystal composition consisting of the compound (I-12) and the following compound (I-13) in the compounding ratio shown in Table 9 was used as the smectic liquid crystal material 13. The phase transition temperatures TAF-F, TAC and TISO of the liquid crystal composition and the V-Tr curve of the liquid crystal element 1 were measured to evaluate the gradation property (voltage gradation parameter L), hysteresis width and the threshold voltage.

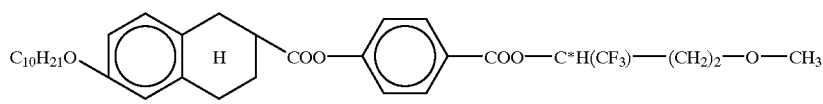

(I-13)

Figure 23:
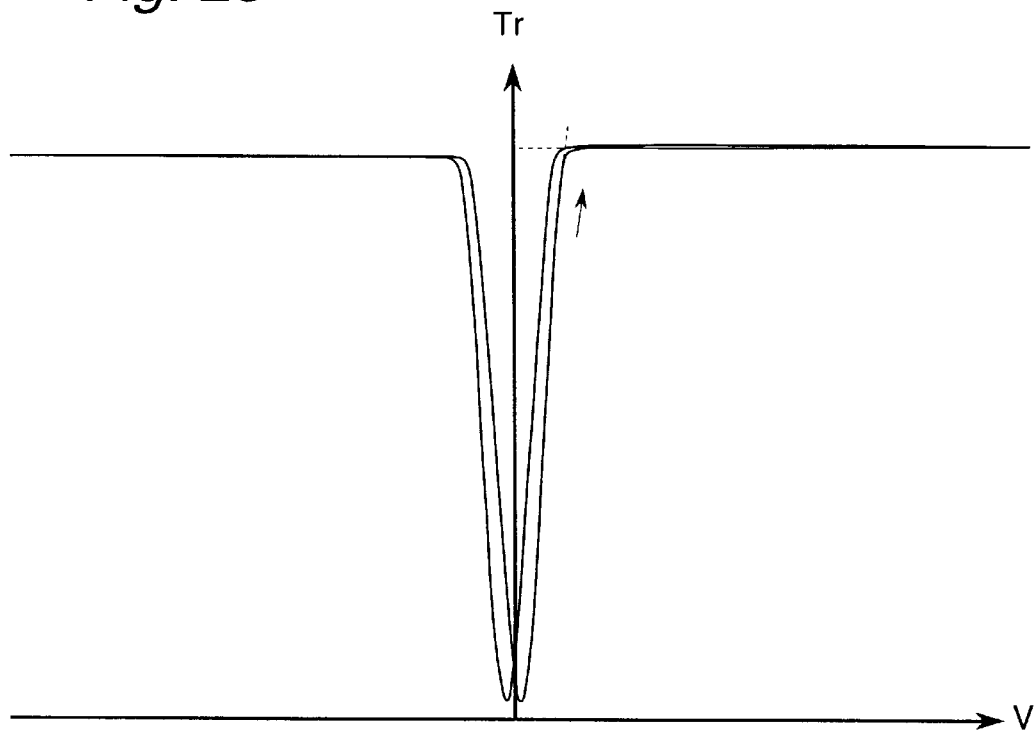

The V-Tr curve is shown in FIG. 23, and other results are set forth in Table 9.

TABLE 9

|  | Example 16 |
|---|---|
| Type of Compound | |
| (I-12) (% by weight) | 80 |
| (I-13) (% by weight) | 20 |
| Voltage gradation parameter L | 0.18 |
| Hysteresis width (volt) | 0.7 |
| Threshold voltage (volt) | 2.7 |

TABLE 9-continued

|  | Example 16 |
|---|---|
| Phase transition temperature (° C.) | |
| TAF-F | 59 |
| TAC | — |
| TISO | 65 |

Example 17

A liquid crystal element 1 was prepared in the same manner as in Example 1, except that a liquid crystal composition consisting of the compound (I-12) and the following compound (II-4) in the compounding ratio shown in Table 10 was used as the smectic liquid crystal material 13. The phase transition temperatures TAF-F, TAC and TISO of the liquid crystal composition and the V-Tr curve of the liquid crystal element 1 were measured to evaluate the gradation property (voltage gradation parameter L), hysteresis width and the threshold voltage.

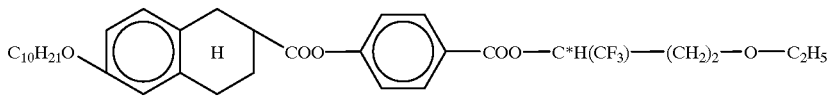

(II-4)

Figure 24:
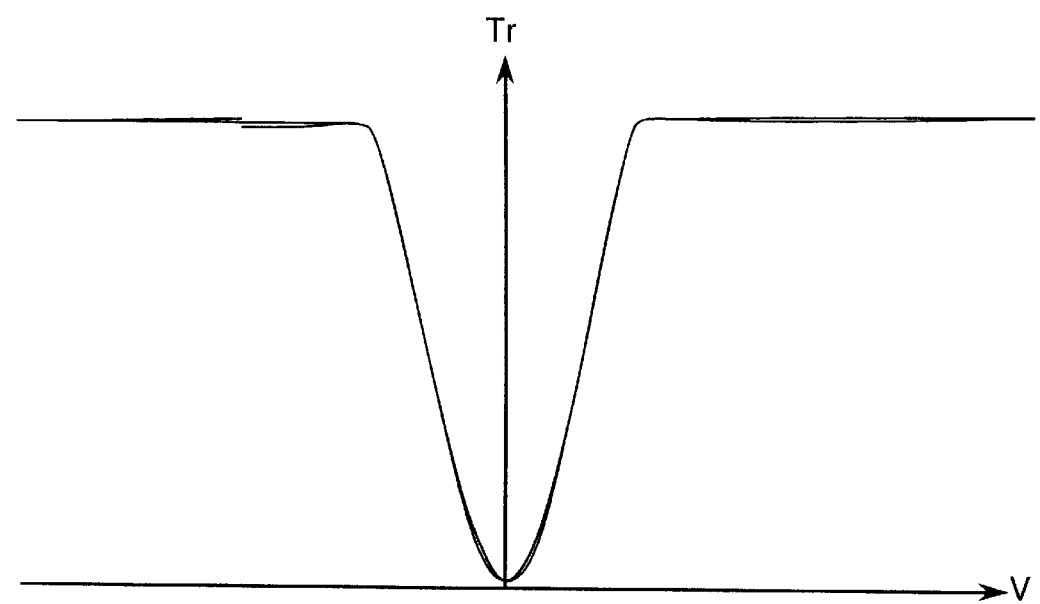

The V-Tr curve is shown in FIG. 24, and other results are set forth in Table 10.

TABLE 10

| Type of Compound | Example 17 |
|---|---|
| (I-12)   (% by weight) | 80 |
| (II-4)   (% by weight) | 20 |
| Voltage gradation parameter L | 0.01 |
| Hysteresis width (volt) | 0 |
| Threshold voltage (volt) | 8.2 |
| Phase transition temperature (° C.) | |
| TAF-F | 56 |
| TAC | — |
| TISO | 58 |

TABLE 11

| Type of Compound | Example 18 |
|---|---|
| (I-12)   (% by weight) | 80 |
| (I-14)   (% by weight) | 20 |
| Voltage gradation parameter L | 0.07 |
| Hysteresis width (volt) | 0.3 |
| Threshold voltage (volt) | 8.2 |
| Phase transition temperature (° C.) | |
| TAF-F | 53 |
| TAC | — |
| TISO | 55 |

Example 18

A liquid crystal element 1 was prepared in the same manner as in Example 1, except that a liquid crystal composition consisting of the compound (I-12) and the following compound (I-14) in the compounding ratio shown in Table 11 was used as the smectic liquid crystal material 13. The phase transition temperatures TAF-F, TAC and TISO of the liquid crystal composition and the V-Tr curve of the liquid crystal element 1 were measured to evaluate the gradation property (voltage gradation parameter L), hysteresis width and the threshold voltage.

Examples 19 and 20

A liquid crystal element 1 was prepared in the same manner as in Example 1, except that a liquid crystal composition consisting of the compounds (I-12) and (II-4) and the following compounds (I-15), (I-16) and (II-5) in the compounding ratio shown in Table 12 or Table 13 was used as the smectic liquid crystal material 13. The phase transition temperatures TAF-F, TAC and TISO of the liquid crystal composition and the V-Tr curve of the liquid crystal element 1 were measured to evaluate the gradation property (voltage gradation parameter L), hysteresis width and the threshold voltage.

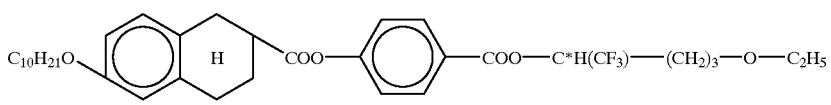

(I-14)

Figure 25:
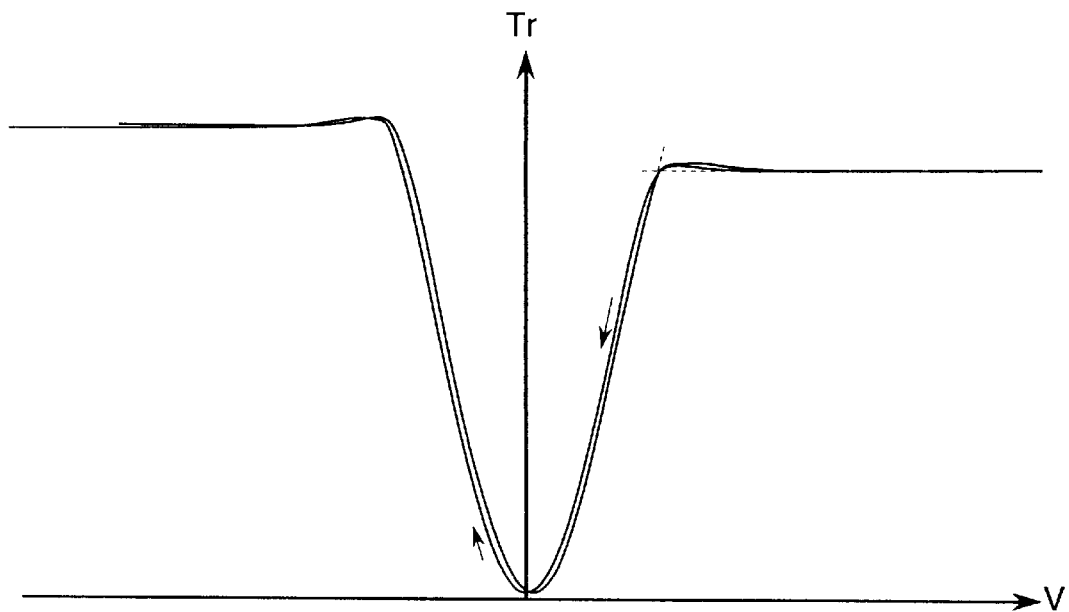

The V-Tr curve is shown in FIG. 25, and other results are set forth in Table 11.

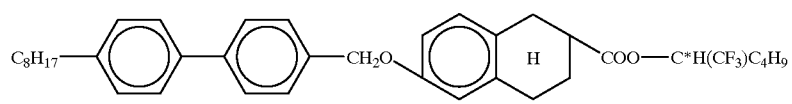

(I-15)

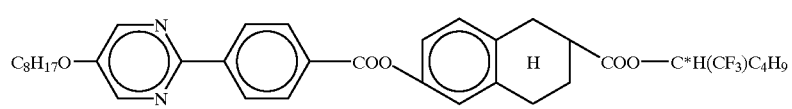

(I-16)

-continued

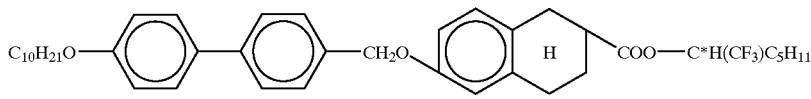
(II-5)

Figure 26:
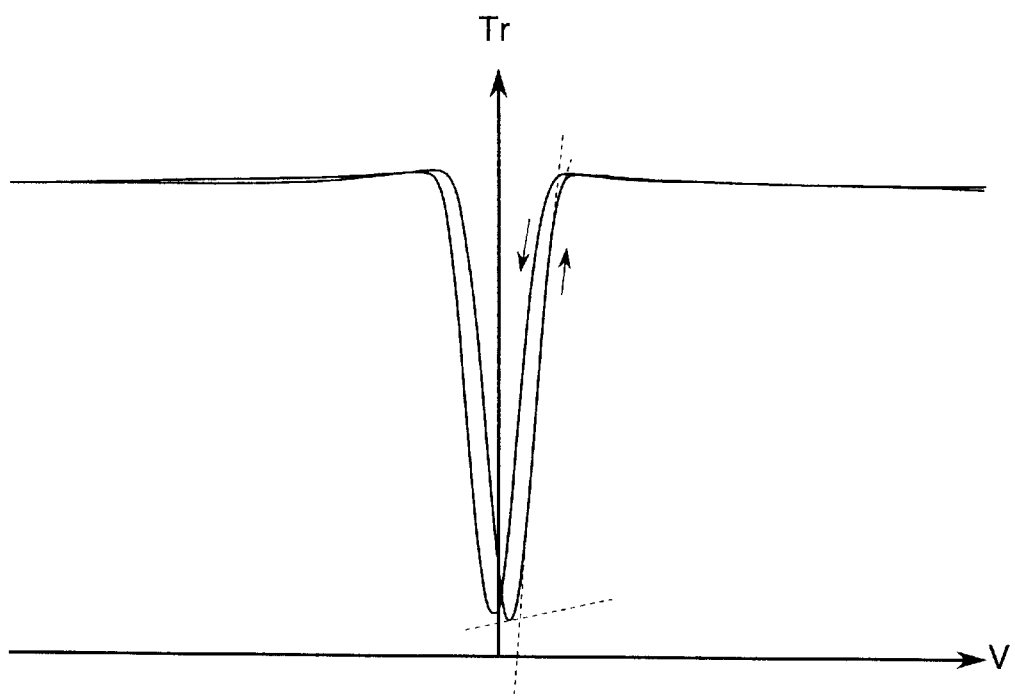
Figure 27:
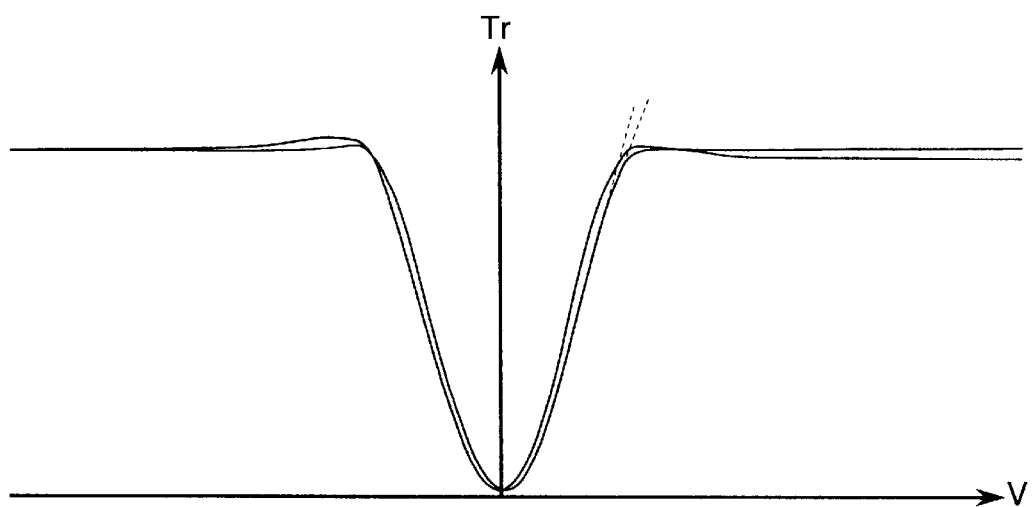

The V-Tr curve of Example 19 is shown in FIG. 26, the V-Tr curve of Example 20 is shown in FIG. 27, and other results are set forth in Table 12 and Table 13.

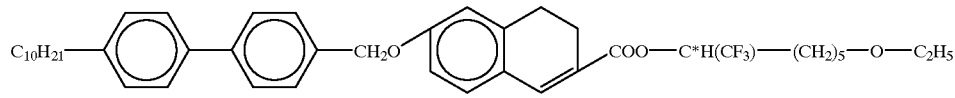
(I-17)

evaluate the gradation property (voltage gradation parameter L), hysteresis width and the threshold voltage.

Figure 28:
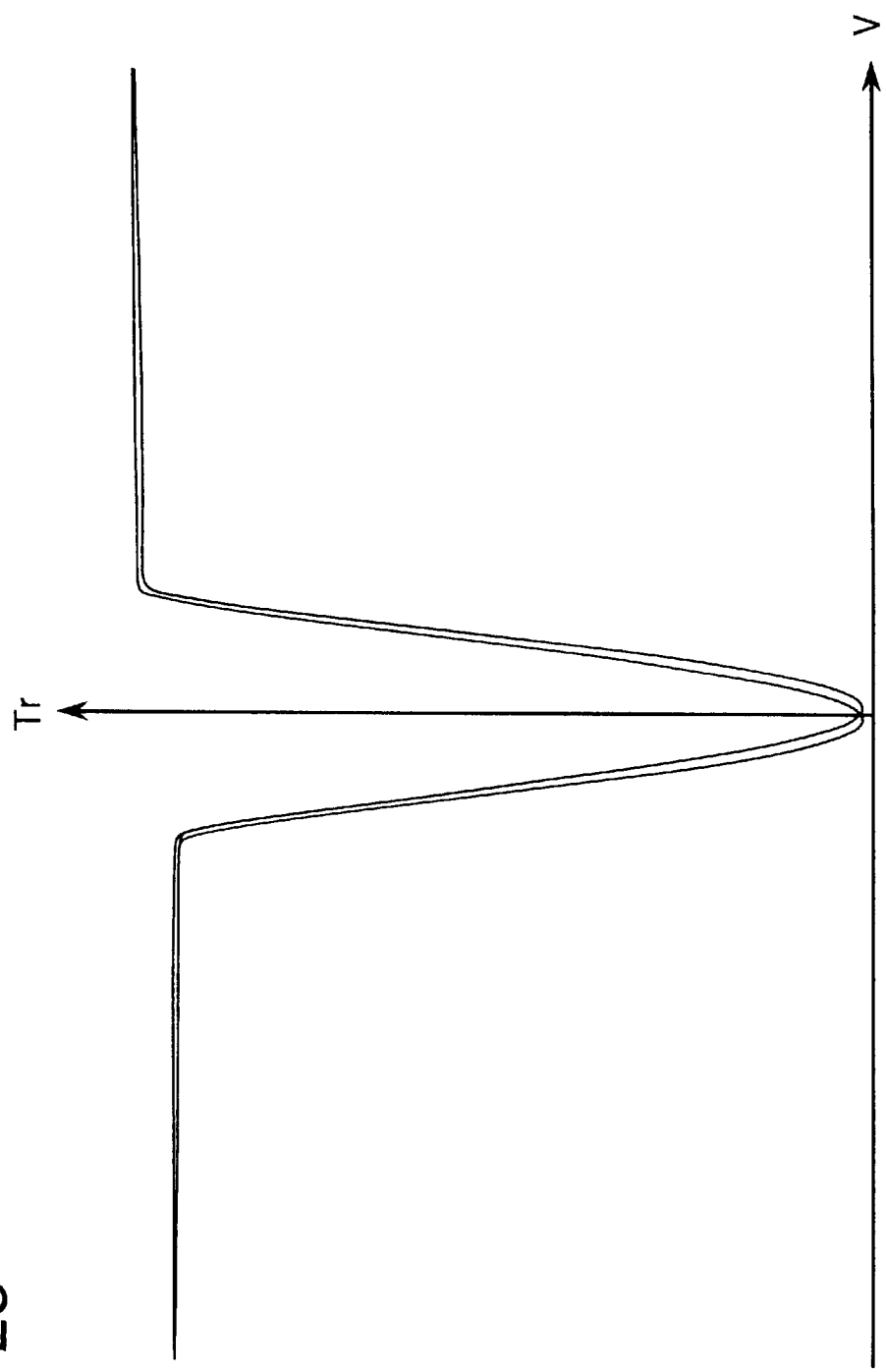
Figure 29:
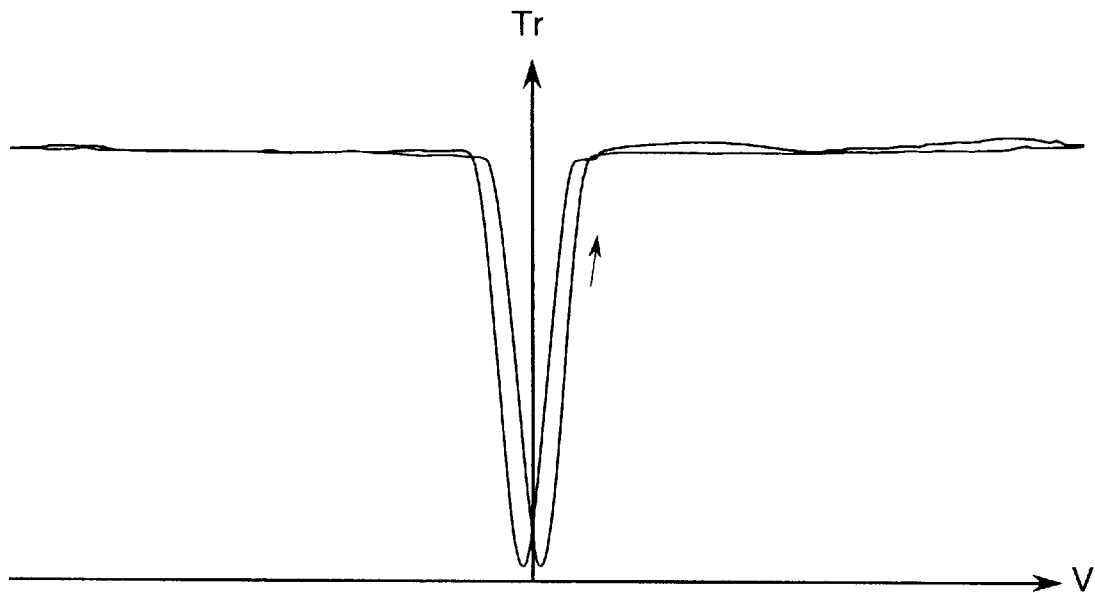

The V-Tr curve of Example 21 is shown in FIG. 28, the V-Tr curve of Example 22 is shown in FIG. 29, and other results are set forth in Table 14.

TABLE 12

|  |  | Example 19 |
|---|---|---|
| Type of Compound |  |  |
| (I-12) | (% by weight) | 80 |
| (I-15) | (% by weight) | — |
| (I-16) | (% by weight) | 20 |
| (II-4) | (% by weight) | — |
| (II-5) | (% by weight) | — |
| Voltage gradation parameter L |  | 0.29 |
| Hysteresis width (volt) |  | 1.1 |
| Threshold voltage (volt) |  | 4.0 |
| Phase transition temperature (° C.) |  |  |
| TAF-F |  | 53 |
| TAC |  | — |
| TISO |  | 55 |

TABLE 13

|  |  | Example 20 |
|---|---|---|
| Type of Compound |  |  |
| (I-12) | (% by mol) | 34 |
| (I-15) | (% by mol) | 14 |
| (I-16) | (% by mol) | 30 |
| (II-4) | (% by mol) | 10 |
| (II-5) | (% by mol) | 12 |
| Voltage gradation parameter L |  | 0.08 |
| Hysteresis width (volt) |  | 0.5 |
| Threshold voltage (volt) |  | 7.5 |
| Phase transition temperature (° C.) |  |  |
| TAF-F |  | 68 |
| TAC |  | — |
| TISO |  | 84 |

Examples 21 and 22

A liquid crystal element 1 was prepared in the same manner as in Example 1, except that a liquid crystal composition consisting of the compounds (I-12) and (I-14) and the following compound (I-17) in the compounding ratio shown in Table 14 was used as the smectic liquid crystal material 13. The phase transition temperatures TAF-F, TAC and TISO of the liquid crystal composition and the V-Tr curve of the liquid crystal element 1 were measured to

TABLE 14

|  |  | Ex. 21 | Ex. 22 |
|---|---|---|---|
| Type of Compound |  |  |  |
| (I-12) | (% by weight) | 64 | 56 |
| (I-14) | (% by weight) | 20 | 20 |
| (I-17) | (% by weight) | 16 | 24 |
| Voltage gradation parameter L |  | 0.09 | 0.21 |
| Hysteresis width (volt) |  | 0.4 | 0.9 |
| Threshold voltage (volt) |  | 5.6 | 2.7 |
| Phase transition temperature (° C.) |  |  |  |
| TAF-F |  | 54 | 43 |
| TAC |  | — | — |
| TISO |  | 56 | 44 |

Example 23

A liquid crystal element 1 was prepared in the same manner as in Example 1, except that a liquid crystal composition consisting of the compounds (I-12), (I-14), (I-15) and (II-5) in the compounding ratio shown in Table 15 was used as the smectic liquid crystal material 13. The phase transition temperatures TAF-F, TAC and TISO of the liquid crystal composition and the V-Tr curve of the liquid crystal element 1 were measured to evaluate the gradation property (voltage gradation parameter L), hysteresis width and the threshold voltage.

Figure 30:
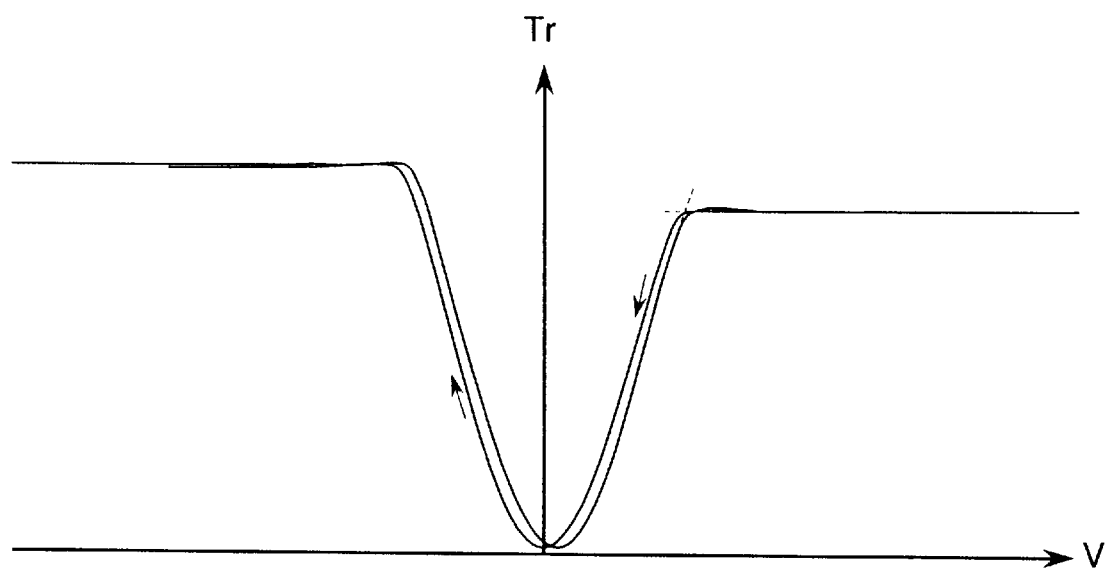

The V-Tr curve is shown in FIG. 30, and other results are set forth in Table 15.

TABLE 15

|  |  | Example 23 |
|---|---|---|
| Type of Compound |  |  |
| (I-12) | (% by mol) | 44 |
| (I-14) | (% by mol) | 19 |
| (I-15) | (% by mol) | 16 |
| (II-5) | (% by mol) | 20 |
| Voltage gradation parameter L |  | 0.10 |
| Hysteresis width (volt) |  | 0.6 |
| Threshold voltage (volt) |  | 7.9 |

47

TABLE 15-continued

| | Example 23 |
|---|---|
| Phase transition temperature (° C.) | |
| TAF-F | 58 |
| TAC | — |
| TISO | 64 |

Example 24

A liquid crystal element 1 was prepared in the same manner as in Example 1, except that a liquid crystal composition consisting of the compound (I-7) and the following compound (I-18) in the compounding ratio shown in Table 16 was used as the smectic liquid crystal material 13. The phase transition temperatures TAF-F, TAC and TISO of the liquid crystal composition and the V-Tr curve of the liquid crystal element 1 were measured to evaluate the gradation property (voltage gradation parameter L), hysteresis width and the threshold voltage.

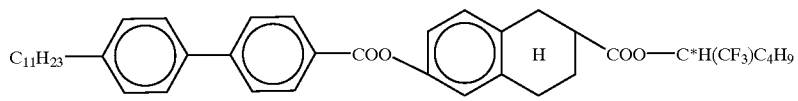

(I-18)

Figure 31:
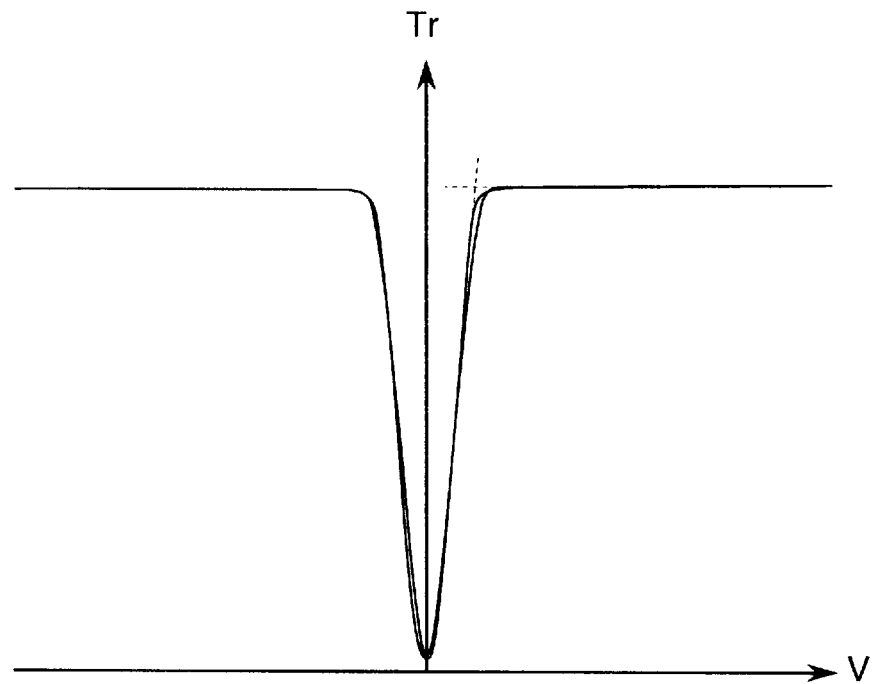

The V-Tr curve is shown in FIG. 31, and other results are set forth in Table 16.

TABLE 16

| | Example 24 |
|---|---|
| Type of Compound | |
| (I-7) (% by weight) | 20 |
| (I-18) (% by weight) | 80 |
| Voltage gradation parameter L | 0.02 |
| Hysteresis width (volt) | 0.0 |
| Threshold voltage (volt) | 3.6 |
| Phase transition temperature (° C.) | |
| TAF-F | 85 |
| TAC | — |
| TISO | 109 |

48

Example 25

A liquid crystal element 1 was prepared in the same manner as in Example 1, except that a liquid crystal composition consisting of the compound (I-11) and the following compound (I-19) in the compounding ratio shown in Table 17 was used as the smectic liquid crystal material 13. The phase transition temperatures TAF-F, TAC and TISO of the liquid crystal composition and the V-Tr curve of the liquid crystal element 1 were measured to evaluate the gradation property (voltage gradation parameter L), hysteresis width and the threshold voltage.

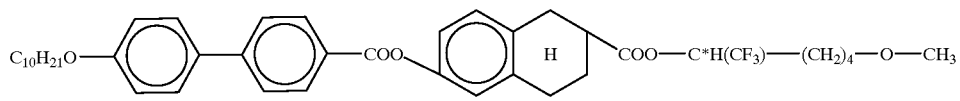

(I-19)

Figure 32:
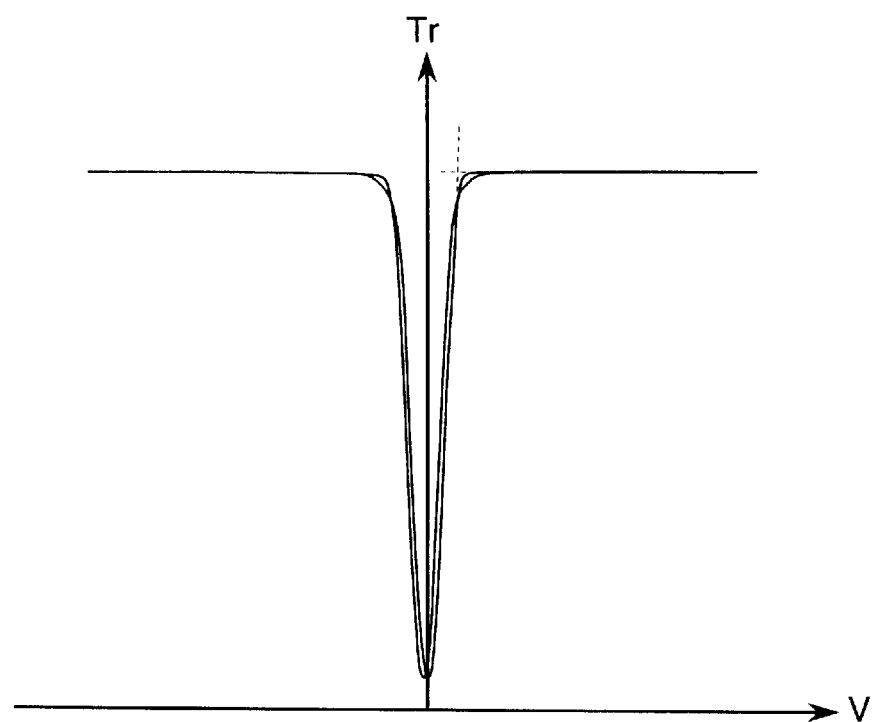

The V-Tr curve is shown in FIG. 32, and other results are set forth in Table 17.

TABLE 17

| | Example 25 |
|---|---|
| Type of Compound | |
| (I-11) (% by weight) | 50 |
| (I-19) (% by weight) | 50 |
| Voltage gradation parameter L | 0.13 |
| Hysteresis width (volt) | 0.1 |

TABLE 17-continued

| | Example 25 |
|---|---|
| Threshold voltage (volt) | 2.7 |
| Phase transition temperature (° C.) | |
| TAF-F | 86 |
| TAC | — |
| TISO | 114 |

Example 26

A liquid crystal element 1 was prepared in the same manner as in Example 1, except that a liquid crystal composition consisting of the compound (I-19) and the following compound (I-20) in the compounding ratio shown in Table 18 was used as the smectic liquid crystal material 13. The phase transition temperatures TAF-F, TAC and TISO of the liquid crystal composition and the V-Tr curve of the liquid crystal element 1 were measured to evaluate the gradation property (voltage gradation parameter L), hysteresis width and the threshold voltage.

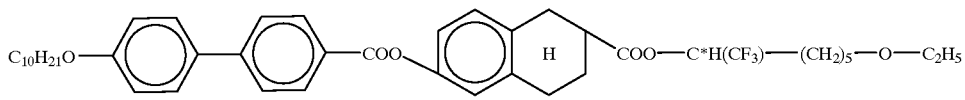

(I-20)

Figure 33:
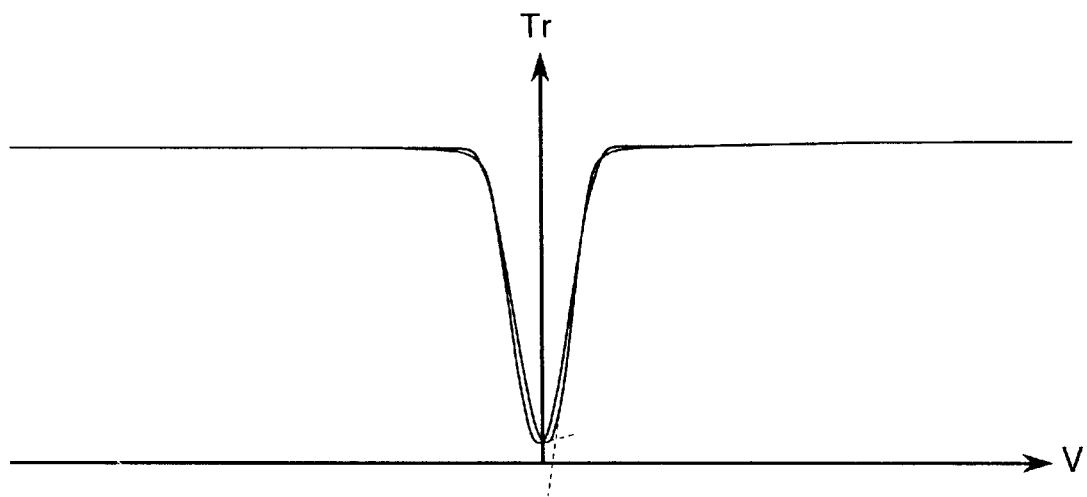

The V-Tr curve is shown in FIG. 33, and other results are set forth in Table 18.

TABLE 18

| Type of Compound | Example 26 |
|---|---|
| (I-19) (% by weight) | 50 |
| (I-20) (% by weight) | 50 |
| Voltage gradation parameter L | 0.01 |
| Hysteresis width (volt) | 0.1 |
| Threshold voltage (volt) | 2.6 |
| Phase transition temperature (° C.) | |
| TAF-F | 88 |
| TAC | — |
| TISO | 117 |

Example 27

A liquid crystal element 1 was prepared in the same manner as in Example 1, except that a liquid crystal composition consisting of the compound (I-20) and the following compound (I-21) in the compounding ratio shown in Table 19 was used as the smectic liquid crystal material 13. The phase transition temperatures TAF-F, TAC and TISO of the liquid crystal composition and the V-Tr curve of the liquid crystal element 1 were measured to evaluate the gradation property (voltage gradation parameter L), hysteresis width and the threshold voltage.

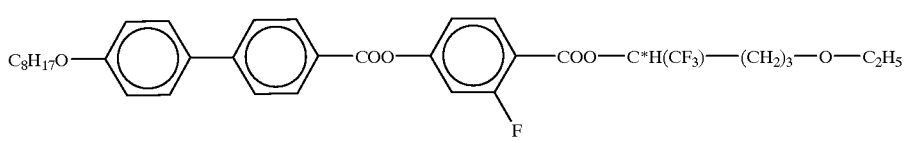

(I-21)

Figure 34:
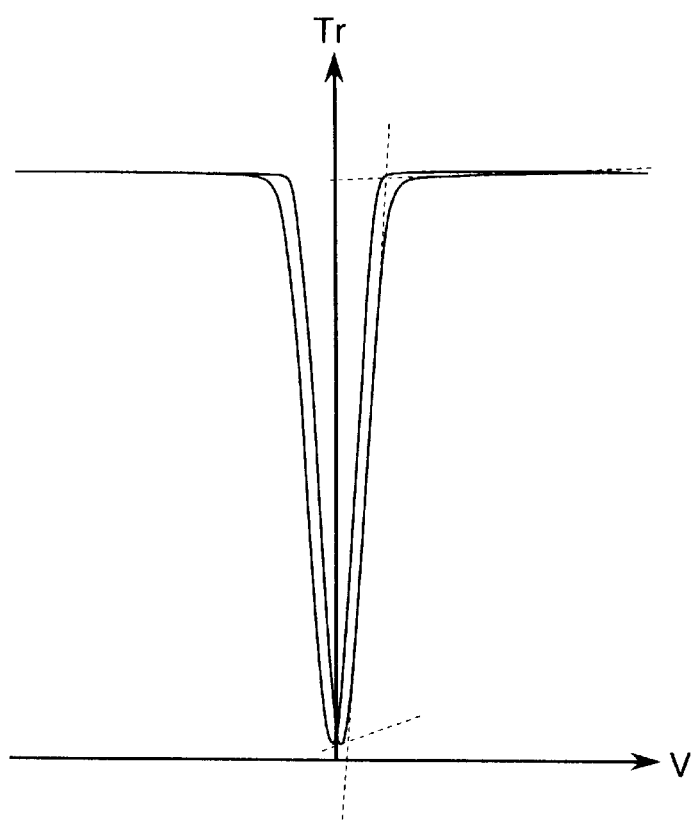

The V-Tr curve is shown in FIG. 34, and other results are set forth in Table 19.

TABLE 19

| Type of Compound | Example 27 |
|---|---|
| (I-20) (% by mol) | 50 |
| (I-21) (% by mol) | 50 |
| Voltage gradation parameter L | 0.18 |
| Hysteresis width (volt) | 1.1 |
| Threshold voltage (volt) | 4.8 |
| Phase transition temperature (° C.) | |
| TAF-F | 99 |
| TAC | — |
| TISO | 117 |

Example 28

A liquid crystal element 1 was prepared in the same manner as in Example 1, except that a liquid crystal composition consisting of the compounds (I-19) and (I-21) in the compounding ratio shown in Table 20 was used as the smectic liquid crystal material 13. The phase transition temperatures TAF-F, TAC and TISO of the liquid crystal composition and the V-Tr curve of the liquid crystal element 1 were measured to evaluate the gradation property (voltage gradation parameter L), hysteresis width and the threshold voltage.

Figure 35:
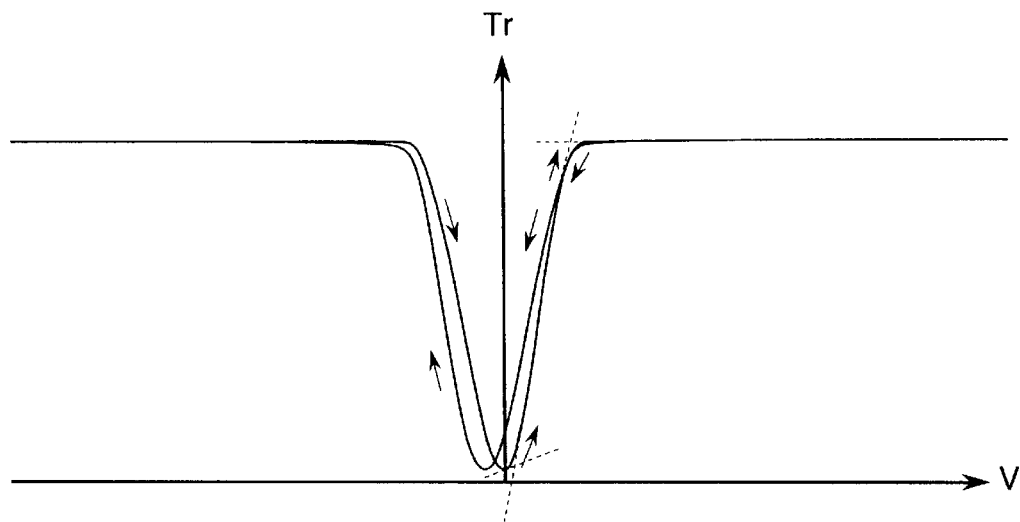

The V-Tr curve is shown in FIG. 35, and other results are set forth in Table 20.

TABLE 20

| Type of Compound | Example 28 |
|---|---|
| (I-19) (% by mol) | 40 |
| (I-21) (% by mol) | 60 |
| Voltage gradation parameter L | 0.21 |
| Hysteresis width (volt) | 0.5 |
| Threshold voltage (volt) | 3.2 |
| Phase transition temperature (° C.) | |
| TAF-F | 104 |
| TAC | — |
| TISO | 119 |

Example 29

A liquid crystal element 1 was prepared in the same manner as in Example 1, except that a liquid crystal composition consisting of the compounds (I-3) and (I-21) in the compounding ratio shown in Table 21 was used as the smectic liquid crystal material 13. The phase transition temperatures TAF-F, TAC and TISO of the liquid crystal composition and the V-Tr curve of the liquid crystal element 1 were measured to evaluate the gradation property (voltage gradation parameter L), hysteresis width and the threshold voltage.

Figure 36:
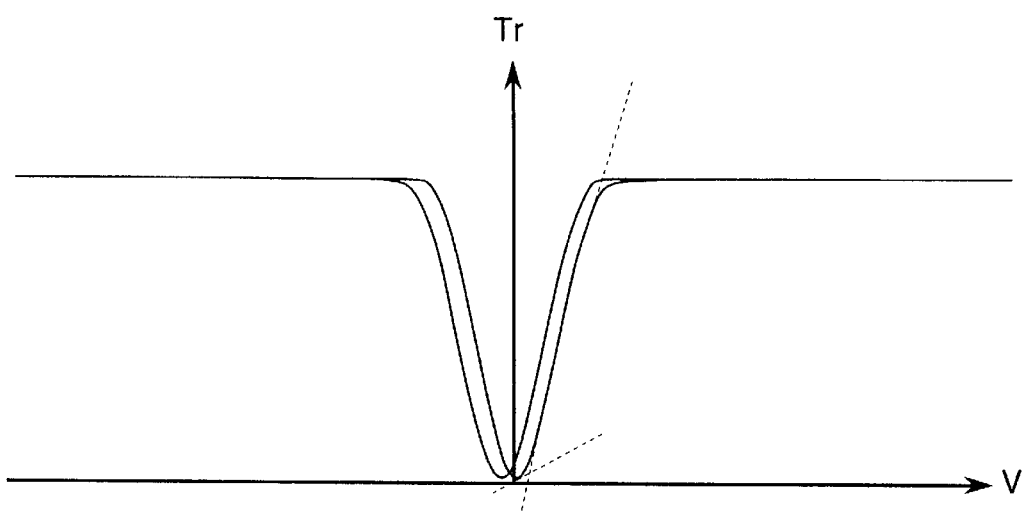

The V-Tr curve is shown in FIG. 36, and other results are set forth in Table 21.

TABLE 21

| | Example 29 |
|---|---|
| Type of Compound | |
| (I-3)  (% by mol) | 20 |
| (I-21) (% by mol) | 80 |
| Voltage gradation parameter L | 0.12 |
| Hysteresis width (volt) | 0.7 |
| Threshold voltage (volt) | 4.8 |
| Phase transition temperature (° C.) | |
| TAF-F | 105 |
| TAC | — |
| TISO | 110 |

Example 30

A liquid crystal element 1 was prepared in the same manner as in Example 1, except that a liquid crystal composition consisting of the compounds (I-18) and (I-21) in the compounding ratio shown in Table 22 was used as the smectic liquid crystal material 13. The phase transition temperatures TAF-F, TAC and TISO of the liquid crystal composition and the V-Tr curve of the liquid crystal element 1 were measured to evaluate the gradation property (voltage gradation parameter L), hysteresis width and the threshold voltage.

Figure 37:
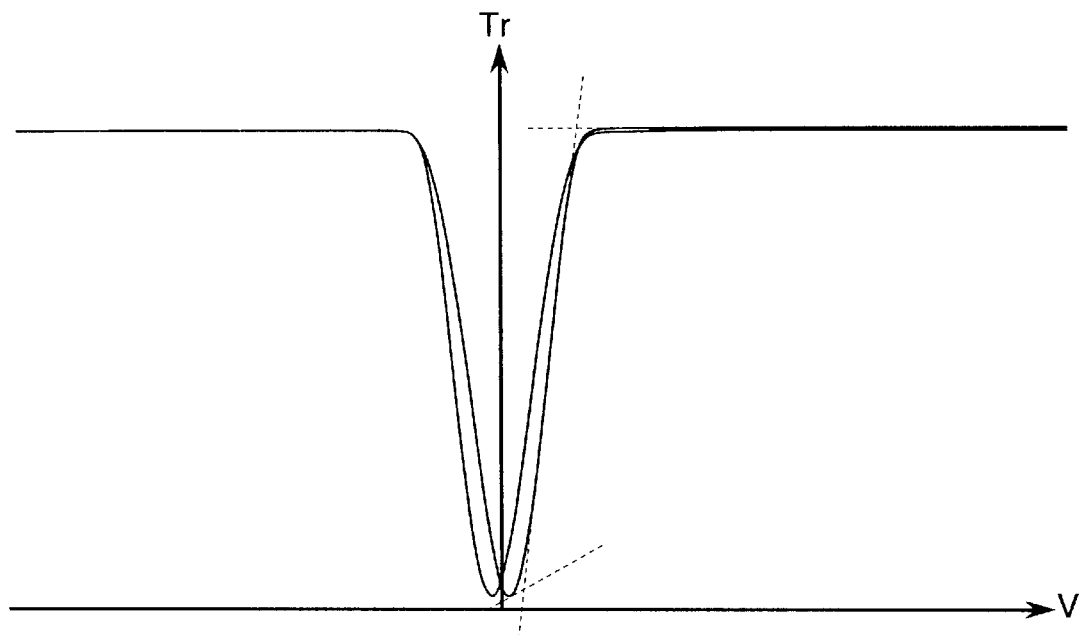

The V-Tr curve is shown in FIG. 37, and other results are set forth in Table 22.

TABLE 22

| | Example 30 |
|---|---|
| Type of Compound | |
| (I-18) (% by mol) | 20 |
| (I-21) (% by mol) | 80 |
| Voltage gradation parameter L | 0.21 |
| Hysteresis width (volt) | 0.1 |
| Threshold voltage (volt) | 3.7 |
| Phase transition temperature (° C.) | |
| TAF-F | 103 |
| TAC | — |
| TISO | 111 |

Example 31

A liquid crystal element 1 was prepared in the same manner as in Example 1, except that a liquid crystal composition consisting of the compound (I-21) and the following compound (I-22) in the compounding ratio shown in Table 23 was used as the smectic liquid crystal material 13. The phase transition temperatures TAF-F, TAC and TISO of the liquid crystal composition and the V-Tr curve of the liquid crystal element 1 were measured to evaluate the gradation property (voltage gradation parameter L), hysteresis width and the threshold voltage.

Figure 38:
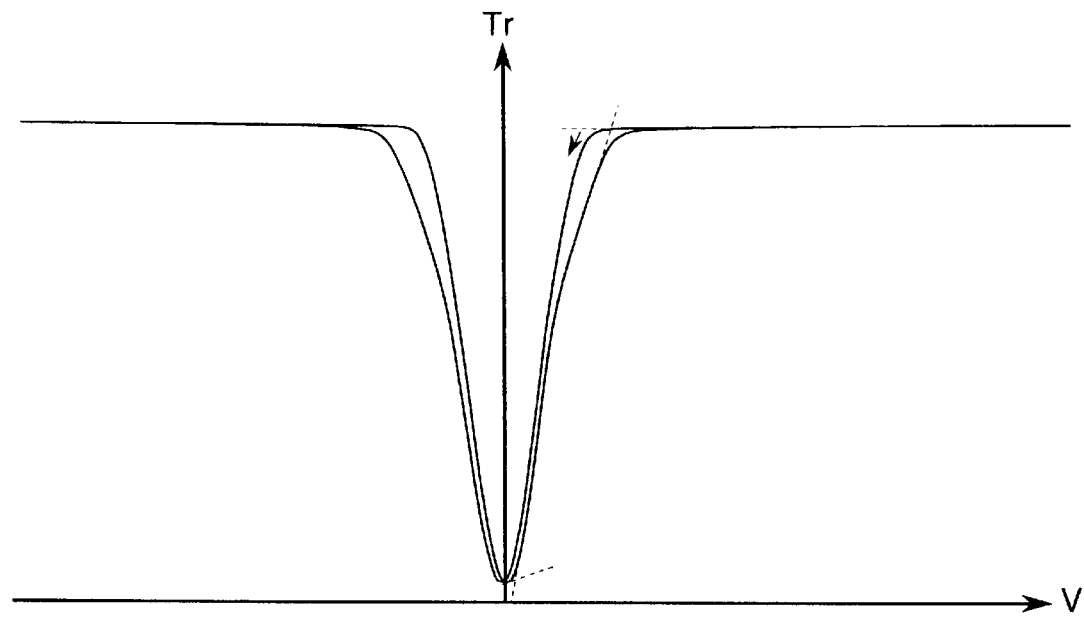

The V-Tr curve is shown in FIG. 38, and other results are set forth in Table 23.

TABLE 23

| | Example 31 |
|---|---|
| Type of Compound | |
| (I-21) (% by mol) | 50 |
| (I-22) (% by mol) | 50 |
| Voltage gradation parameter L | 0.06 |
| Hysteresis width (volt) | 0.3 |
| Threshold voltage (volt) | 4.0 |
| Phase transition temperature (° C.) | |
| TAF-F | 97 |
| TAC | — |
| TISO | 112 |

Example 32

A liquid crystal element 1 was prepared in the same manner as in Example 1, except that a liquid crystal composition consisting of the compounds (I-6) and (I-21) in the compounding ratio shown in Table 24 was used as the smectic liquid crystal material 13. The phase transition temperatures TAF-F, TAC and TISO of the liquid crystal composition and the V-Tr curve of the liquid crystal element 1 were measured to evaluate the gradation property (voltage gradation parameter L), hysteresis width and the threshold voltage.

Figure 39:
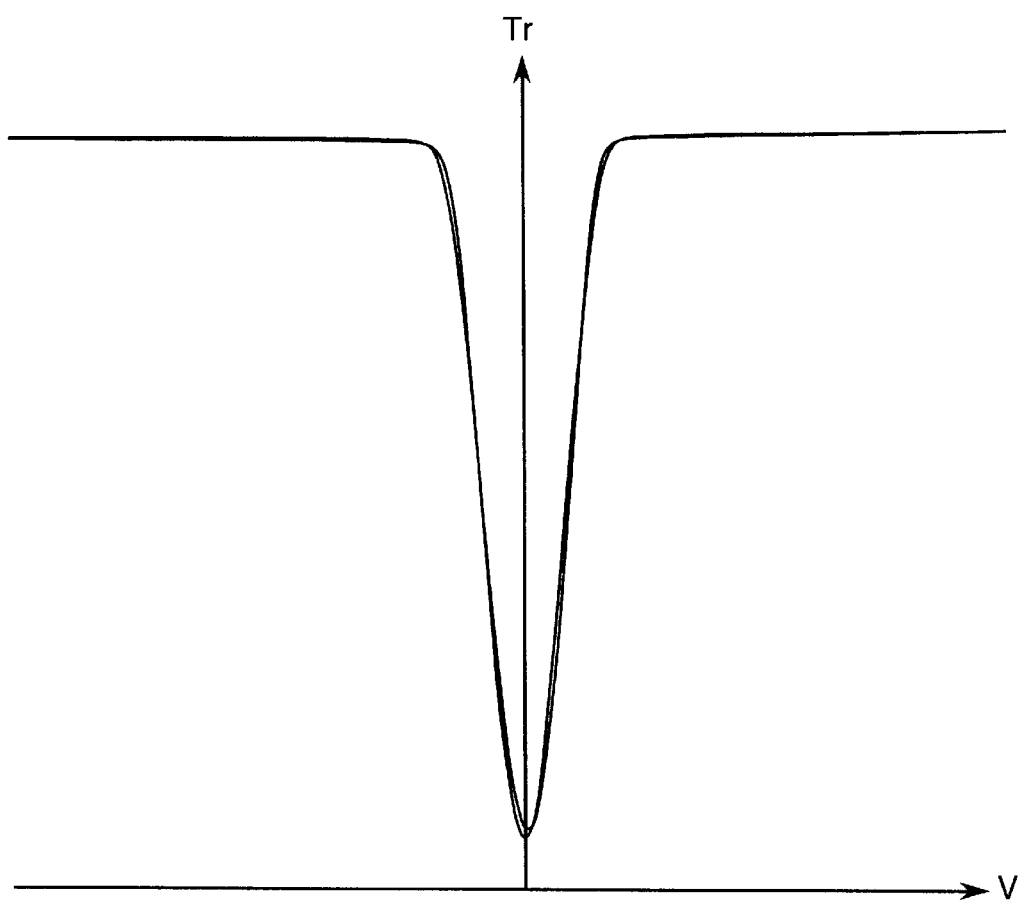

The V-Tr curve is shown in FIG. 39, and other results are set forth in Table 24.

TABLE 24

| | Example 32 |
|---|---|
| Type of Compound | |
| (I-6)  (% by mol) | 50 |
| (I-21) (% by mol) | 50 |
| Voltage gradation parameter L | 0.04 |
| Hysteresis width (volt) | 0.2 |
| Threshold voltage (volt) | 4.4 |
| Phase transition temperature (° C.) | |
| TAF-F | 90 |
| TAC | — |
| TISO | 104 |

Example 33

A liquid crystal element 1 was prepared in the same manner as in Example 1, except that a liquid crystal composition consisting of the compound (I-21) and the following compound (I-23) in the compounding ratio shown in Table 25 was used as the smectic liquid crystal material 13. The phase transition temperatures TAF-F, TAC and TISO of the liquid crystal composition and the V-Tr curve of the liquid crystal element 1 were measured to evaluate the gradation property (voltage gradation parameter L), hysteresis width and the threshold voltage.

(I-22)

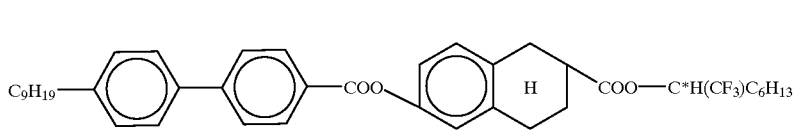

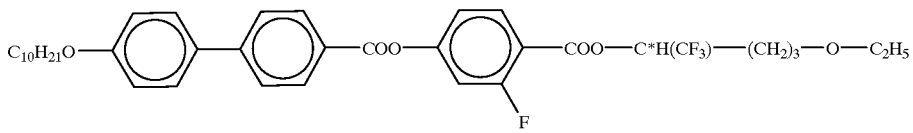

(I-23)

Figure 40:
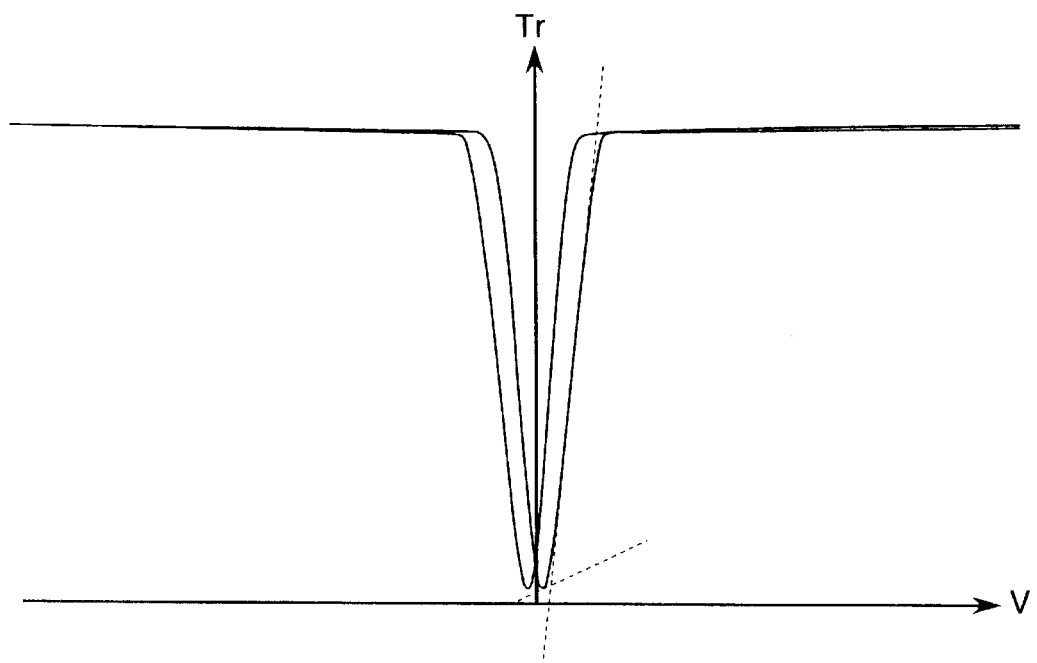

The V-Tr curve is shown in FIG. 40, and other results are set forth in Table 25.

TABLE 25

|  | Example 33 |
|---|---|
| Type of Compound | |
| (I-21)   (% by mol) | 20 |
| (I-23)   (% by mol) | 80 |
| Voltage gradation parameter L | 0.17 |
| Hysteresis width (volt) | 1.1 |
| Threshold voltage (volt) | 2.6 |
| Phase transition temperature (° C.) | |
| TAF-F | 50 |
| TAC | — |
| TISO | 57 |

Example 34

A liquid crystal element 1 was prepared in the same manner as in Example 1, except that a liquid crystal composition consisting of the compound (I-21) and the following compound (I-24) in the compounding ratio shown in Table 26 was used as the smectic liquid crystal material 13. The phase transition temperatures TAF-F, TAC and TISO of the liquid crystal composition and the V-Tr curve of the liquid crystal element 1 were measured to evaluate the gradation property (voltage gradation parameter L), hysteresis width and the threshold voltage.

Figure 41:
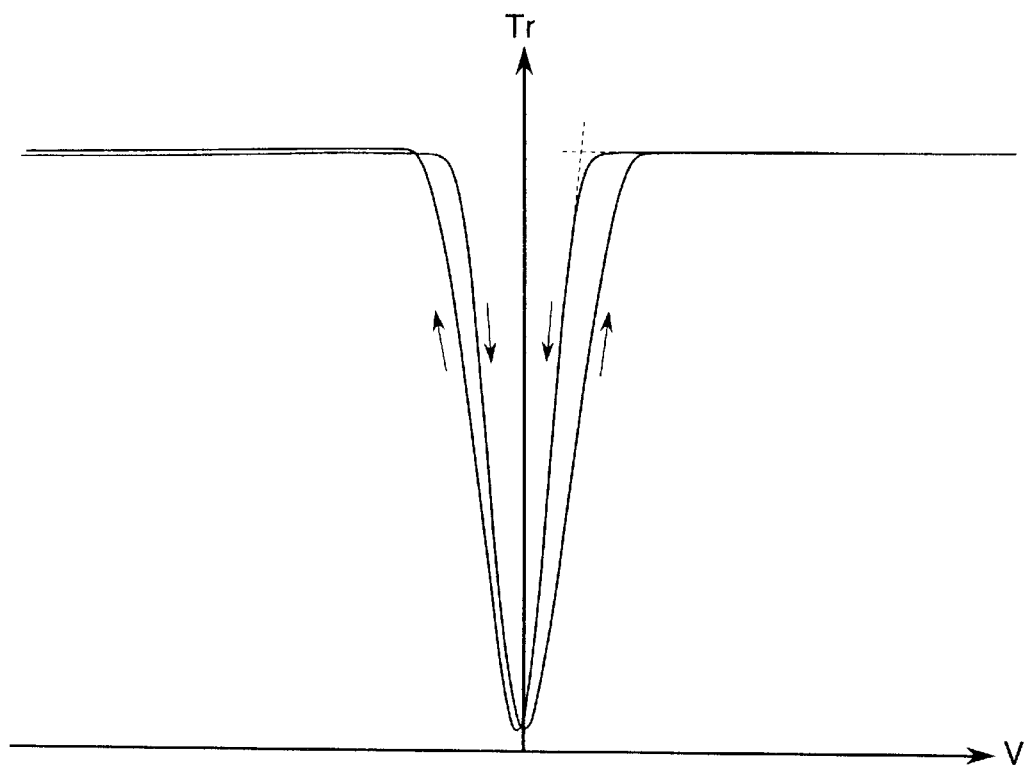

The V-Tr curve is shown in FIG. 41, and other results are set forth in Table 26.

TABLE 26

|  | Example 34 |
|---|---|
| Type of Compound | |
| (I-21)   (% by mol) | 20 |
| (I-24)   (% by mol) | 80 |
| Voltage gradation parameter L | 0.33 |
| Hysteresis width (volt) | 1.8 |
| Threshold voltage (volt) | 5.7 |
| Phase transition temperature (° C.) | |
| TAF-F | 98 |
| TAC | — |
| TISO | 100 |

Example 35

A liquid crystal element 1 was prepared in the same manner as in Example 1, except that a liquid crystal composition consisting of the compound (I-23) and the following compound (I-25) in the compounding ratio shown in Table 27 was used as the smectic liquid crystal material 13. The phase transition temperatures TAF-F, TAC and TISO of the liquid crystal composition and the V-Tr curve of the liquid crystal element 1 were measured to evaluate the gradation property (voltage gradation parameter L), hysteresis width and the threshold voltage.

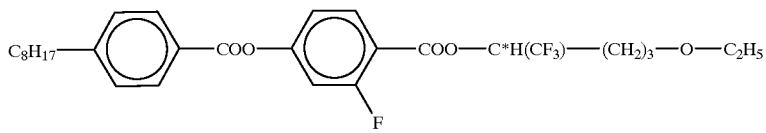

(I-24)

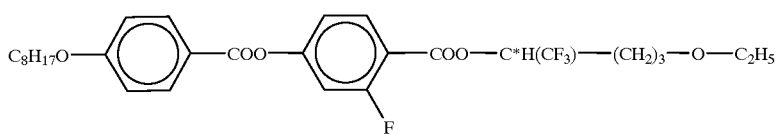

(I-25)

Figure 42:
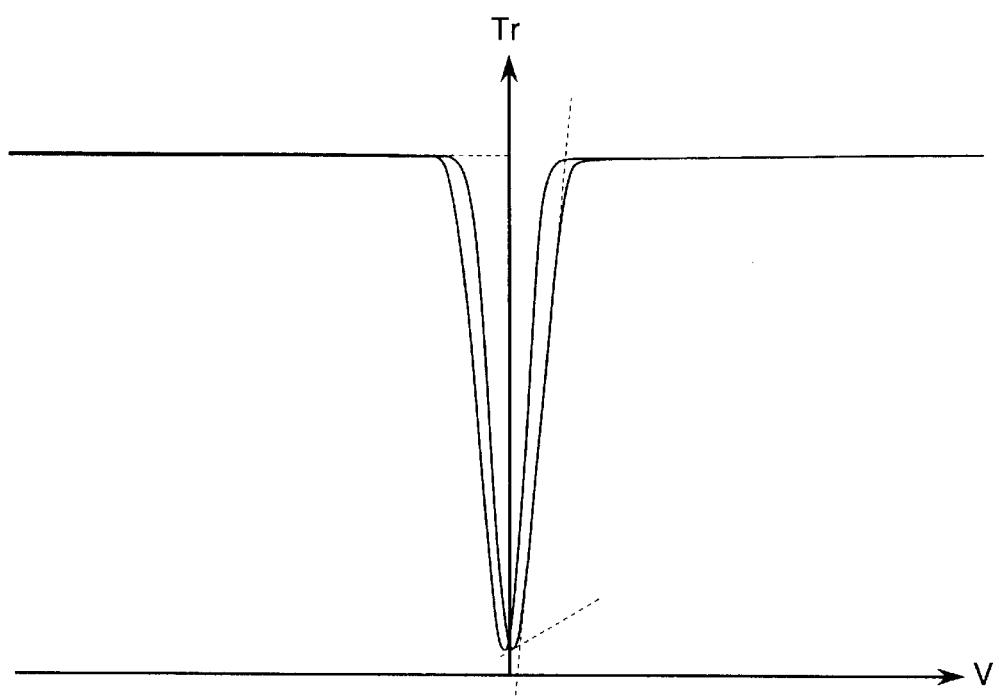

The V-Tr curve is shown in FIG. 42, and other results are set forth in Table 27.

TABLE 27

| | Example 35 |
|---|---|
| Type of Compound | |
| (I-23) (% by mol) | 50 |
| (I-25) (% by mol) | 50 |
| Voltage gradation parameter L | 0.15 |
| Hysteresis width (volt) | 0.7 |
| Threshold voltage (volt) | 2.9 |
| Phase transition temperature (° C.) | |
| TAF-F | 61 |
| TAC | — |
| TISO | 64 |

Example 36

A liquid crystal element 1 was prepared in the same manner as in Example 1, except that a liquid crystal composition consisting of the compound (I-23) and the following compound (I-26) in the compounding ratio shown in Table 28 was used as the smectic liquid crystal material 13. The phase transition temperatures TAF-F, TAC and TISO of the liquid crystal composition and the V-Tr curve of the liquid crystal element 1 were measured to evaluate the gradation property (voltage gradation parameter L), hysteresis width and the threshold voltage.

TABLE 28

| | Example 36 |
|---|---|
| Type of Compound | |
| (I-23) (% by mol) | 50 |
| (I-26) (% by mol) | 50 |
| Voltage gradation parameter L | 0.09 |
| Hysteresis width (volt) | 0.5 |
| Threshold voltage (volt) | 2.9 |

TABLE 28-continued

| | Example 36 |
|---|---|
| Phase transition temperature (° C.) | |
| TAF-F | 57 |
| TAC | — |
| TISO | 69 |

As is apparent from the above results, each of the compositions of Examples 13 to 36 was capable of exhibiting antiferroelectric liquid crystal phases, and the voltage gradation parameter L of each smectic liquid crystal composition capable of exhibiting the antiferroelectric liquid crystal phase was less than 0.6. This suggests that the liquid crystal element 1 having the liquid crystal cell 10 filled with the smectic liquid crystal composition can easily display an image of excellent gradation by changing the intensity of the voltage applied between the electrode 12a and the electrode 12b of the liquid crystal cell 10.

From the fact that the V-Tr curve of the liquid crystal element 1 has a narrow hysteresis width and a low threshold voltage, it has been confirmed that these liquid crystal elements 1 are suitable for being driven on the active matrix system.

Example 37

Two glass substrates each having a transparent electrode made of ITO (indium tin oxide) on one surface side were

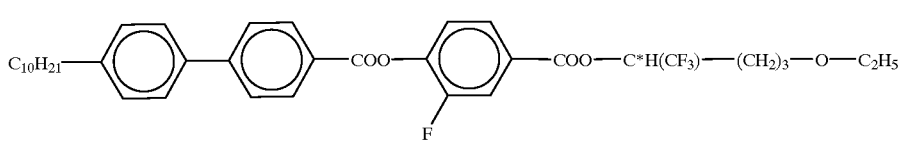

(I-26)

Figure 43:
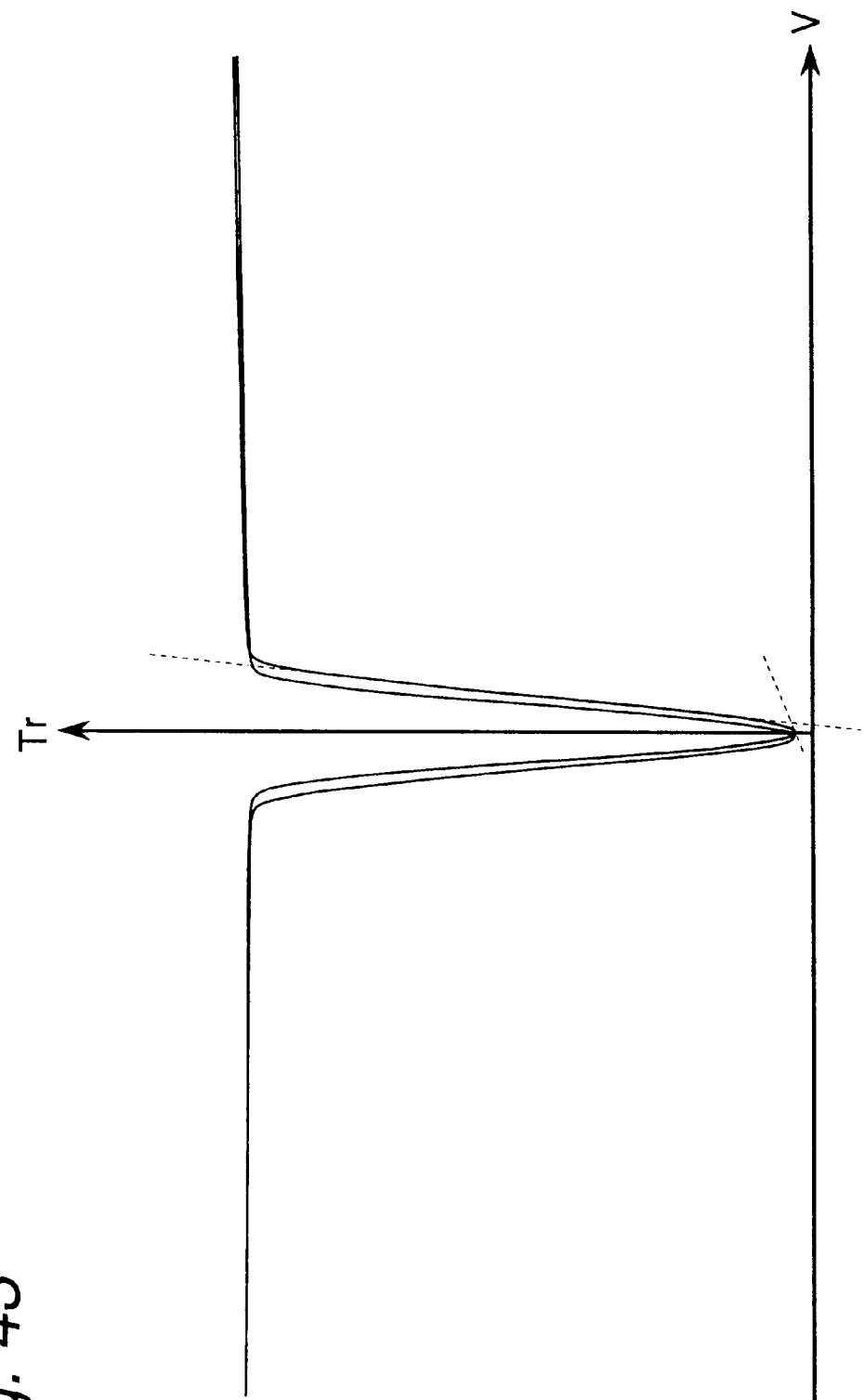

The V-Tr curve is shown in FIG. 43, and other results are set forth in Table 28.

prepared. On the ITO transparent electrode of each glass substrate, a polyimide orientation film was formed, and the surface of the polyimide film was subjected to rubbing treatment in the given direction. A cell was assembled in such a manner that the transparent electrodes faced each other through spherical spacers having a mean particle diameter of about 2 μm, and all the peripheries of the glass substrates were bonded together with an adhesive except the inlet portion for the liquid crystal material.

Into the cell, a mixture of the following antiferroelectric liquid crystal compound A and the following ferroelectric liquid crystal compound B was poured as an isotropic liquid, through the liquid crystal material inlet of the cell.

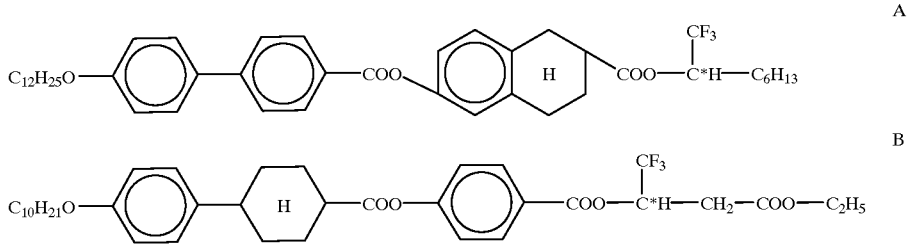

Then, the cell was slowly cooled to room temperature at a rate of 1° C./min, and the liquid crystal material inlet was sealed with an adhesive to prepare a liquid crystal cell.

On a stage of a polarization microscope wherein two polarizing plates were arranged in the crossed Nicols state, the liquid crystal cell was placed in such a manner that the-polarization axes of the polarizing-plates were substantially parallel to the rubbing directions of the polyimide orientation films formed inside the liquid crystal cell and that the polarization axes met the rubbing directions at an angle ranging from −10° to +10°. Then, a triangular wave voltage (frequency: 0.01 Hz) was applied to the liquid crystal cell to measure the light quantity (transmitted light quantity) observed by the polarization microscope. The light quantity varied according to the intensity of the applied voltage to form a hysteresis curve. When the hysteresis curve within the positive voltage region and the hysteresis curve within the negative voltage region were asymmetrical, they were made symmetrical by rotating the liquid crystal cell on the stage of the polarization microscope.

FIG. 45 shows a relationship between the amount of the antiferroelectric liquid crystal compound A (or the amount of the ferroelectric liquid crystal compound B) in the mixture of the antiferroelectric liquid crystal compound A and the ferroelectric liquid crystal compound B, and the shape of the hysteresis curve.

It can be seen from FIG. 45 that the shape of the hysteresis curve continuously varies according to the amount of the antiferroelectric liquid crystal compound A (or the amount of the ferroelectric liquid crystal compound B) in the mixture.

When the amount of the antiferroelectric liquid crystal compound A in the mixture is 1 to 60% by weight, preferably 5 to 50% by weight, the hysteresis wide of the hysteresis curve becomes small, that is, the gradation of an image displayed by the antiferroelectric liquid crystal element can be improved. On the other hand, when the amount thereof exceeds 60% by weight, the quantity $T_0$ of the light output from the antiferroelectric liquid crystal element under application of no voltage to the liquid crystal cell is increased, and besides the hysteresis width of the hysteresis curve becomes large, whereby the shape of the hysteresis curve approximates a shape peculiar to the ferroelectric liquid crystal element.

FIG. 46 shows a relationship between the amount (ρ % by weight) of the ferroelectric liquid crystal compound B in the mixture of the antiferroelectric liquid crystal compound A and the ferroelectric liquid crystal compound B, and the parameter G defined by the equation (B).

It can be seen from FIG. 46 that when the amount of the ferroelectric liquid crystal compound B in the mixture is less than ρc % by weight (about 55% by weight), the parameter G takes a positive value, and when the amount the ferroelectric liquid crystal compound B in the mixture exceeds ρc % by weight (about 55% by weight), the parameter G takes a negative value. The parameter G diverges at the ρc % by weight (about 55% by weight) of the ferroelectric liquid crystal compound B in the mixture. The liquid crystal element using the liquid crystal composition of the invention gives a hysteresis curve of small hysteresis width, and the parameter G defined by the equation (B) at which an image of excellent gradation can be displayed is in the range of 0 to 0.3.

What is claimed is:

1. A smectic liquid crystal composition having a voltage gradation parameter L of less than 0.6, said voltage gradation parameter L being defined by the following equation with the proviso that: (a) the smectic liquid crystal composition is filled between a pair of transparent electrodes provided in a cell; ($b_1$) a pair of polarization direction control means are arranged in the crossed Nicols state on both sides of the liquid crystal cell; ($b_2$) said polarization direction control means and said liquid crystal cell are further arranged so that a light is transmitted by one of the polarization direction control means, the liquid crystal cell and the other of the polarization direction control means in this order; (c) said polarization direction means and said liquid crystal cell are still further arranged so that, when a voltage V is applied between the pair of the transparent electrodes, the transmittance Tr of the light transmitted in the above order increases in accordance with an intensity of the voltage V; and (d) when a voltage V—light transmittance TR correlation is measured, a hysteresis curve is formed between the voltage V and the light transmittance Tr, and a tangent line $I_R$ of the hysteresis curve within a region wherein the light transmittance Tr steeply increases when the voltage V is increased intersects a tangent line $I_F$ of the hysteresis curve within a region which is adjacent to the voltage-steep increase region and which is on the higher-voltage side, at an intersection point P;

$$L = S_H / S_O$$

wherein $S_O$ is an area of a rectangular triangle having as an oblique side a straight line PQ which has, as both ends, the intersection point P and an intersection point Q of an axis of ordinate (V=0) and the hysteresis curve; and $S_H$ is an area of a region enclosed with the straight line PQ, the hysteresis curve within a region wherein the light transmittance Tr steeply increases, and a constant-voltage straight line which passes the intersection point P, wherein said smectic liquid crystal composition comprises at least two antiferroelectric liquid crystal compounds represented by the following formula (I):

$$R^1(O)_m—Z—Y—E—COO—C^*HX—R^4 \qquad (I)$$

wherein Z is a group selected from the group consisting of

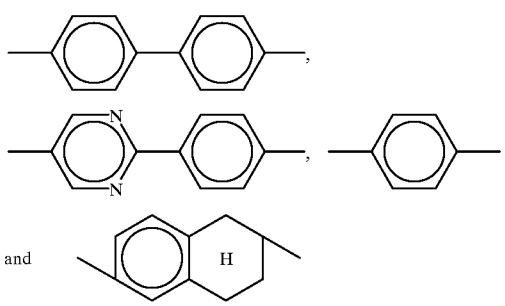

E is a group selected from the group consisting of

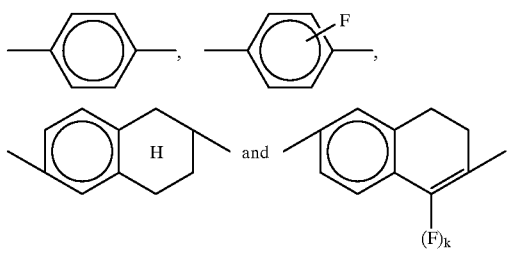

(k=0 or 1); and $R^1$ is an alkyl group of 6 to 16 carbon atoms, with the proviso that hydrogen atoms in the alkyl group may be replaced with halogen atoms, a part of methylene groups and/or halomethylene groups in the alkyl group may be replaced with —O— group, and when methylene group(s) and/or halomethylene group(s) in the alkyl group are replaced with plural —O— groups, these plural —O— groups are not adjacent to each other;

$R^4$ is a straight-chain alkyl group having carbon atoms of an even number selected from 4, 6 and 8 or a group wherein one methylene group in said straight-chain alkyl group is replaced with —O— group;

X is a group selected from the group consisting of —CH$_3$ group, —CH$_2$F group, —CHF$_2$ group and —CF$_3$ group;

Y is a group selected from the group consisting of —COO—, —CH$_2$O—, —CH$_2$CH$_2$— and —OCH$_2$—; and m is an integer of 0 or 1, and K is an integer of 0 or 1, provided that at lease one of Z and E in one of said antiferroelectric liquid crystal compounds of the formula (I) is

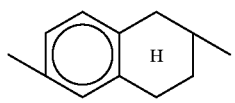

and $R^4$s in both said antiferroelectric liquid crystal compounds of the formula (I) each is an alkyl group containing the —O— group, or provided that at least one of Z and E in one of said antiferroelectric liquid crystal compounds of the formula (I) is

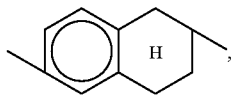

and $R^4$ in one of said antiferroelectric liquid crystal compound of the formula (I) is an alkyl group containing no —O— group and $R^4$ of the other antiferroelectric liquid crystal compound is selected from the group consisting of a C4 or C8 alkyl group having no —O— group, a C4 or C8 alkyl group having the —O— group and a C6 alkyl group having the —O— group which forms an —OCH$_2$Ch$_3$ terminal group, or provided that one of Z and E in one of said antiferroelectric liquid crystal compounds of the formula (I) is

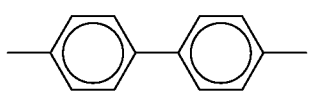

and the other is a group other than

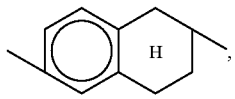

and $R^4$ is selected from a C4 alkyl group containing the —O— group and a C6 alkyl group containing the —O— group which forms an —OCH$_2$CH$_3$ terminal group.

2. The smectic liquid crystal composition as claimed in claim 1, wherein Z in the formula (I) is

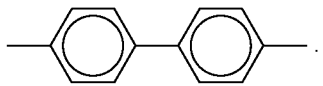

3. The smectic liquid crystal composition as claimed in claim 1, wherein said composition comprises plural antiferroelectric liquid crystal compounds which are each represented by the formula (I) and are different from each other in at least one of Z, E and $R^4$ in the formula (I).

4. A smectic liquid crystal composition having a voltage gradation parameter L of less than 0.6, said voltage gradation parameter L being defined by the following equation with the proviso that: (a) the smectic liquid crystal composition is filled between a pair of transparent electrodes provided in a cell; (b$_1$) a pair of polarization direction control means are arranged in the crossed Nicols state on both sides of the liquid crystal cell; (b$_2$) said polarization direction control means and said liquid crystal cell are further arranged so that a light is transmitted by one of the polarization direction control means, the liquid crystal cell and the other of the polarization direction control means in this order; (c) said polarization direction means and said liquid crystal cell are still further arranged so that, when a voltage V is applied between the pair of the transparent electrodes, the transmittance Tr of the light transmitted in the above order increases in accordance with an intensity of the voltage V; and (d) when a voltage V—light transmittance Tr correlation is measured, a hysteresis curve is formed between the voltage V and the light transmittance Tr, and a tangent line $I_R$ of the hysteresis curve within a region wherein the light transmittance Tr steeply increases when the voltage V is increased intersects a tangent line $I_F$ of the hysteresis curve within a region which is adjacent to the voltage-steep increase region and which is on the higher-voltage side, at an intersection point P;

$$L = S_H/S_O$$

wherein $S_O$ is an area of a rectangular triangle having as an oblique side a straight line PQ which has, as both ends, the intersection point P and an intersection point Q of an axis of ordinate (V=O) and the hysteresis curve; and $S_H$ is an area of a region enclosed with the straight line PQ, the hysteresis curve within a region wherein the light transmittance Tr steeply increases, and a constant-voltage straight line which passes the intersection point P, wherein said smectic liquid crystal composition comprises at least one antiferroelectric liquid crystal compounds represented by the following formula (I):

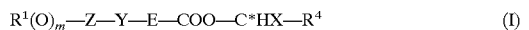

wherein
Z is a group selected from the group consisting of

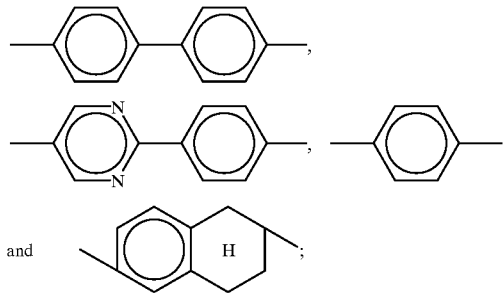

E is a group selected from the group consisting of

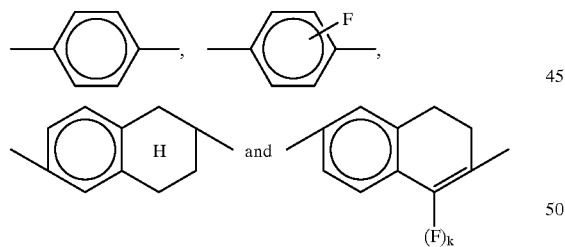

(k=0 or 1); and $R^1$ is an alkyl group of 6 to 16 carbon atoms, with the proviso that hydrogen atoms in the alkyl group may be replaced with halogen atoms, a part of methylene groups and/or halomethylene groups in the alkyl group may be replaced with —O— group, and when methylene group(s) and/or halomethylene group(s) in the alkyl group are replaced with plural —O— groups, these plural —O— groups are not adjacent to each other;

$R^4$ is a straight-chain alkyl group having carbon atoms of an even number selected from 4, 6 and 8 or a group wherein one methylene group in said straight-chain alkyl group is replaced with —O— group;

X is a group selected from the group consisting of —CH$_3$ group, —CH$_2$F group, —CHF$_2$ group and —CF$_3$ group;

Y is a group selected from the group consisting of —COO—, —CH$_2$O—, —CH$_2$CH$_2$— and —OCH$_2$—; and m is an integer of 0 or 1, and K is an integer of 0 or 1, and a liquid crystal compound represented by the following formula (II):

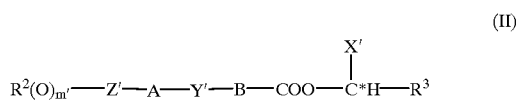

wherein
Z' is a group selected from the group consisting of

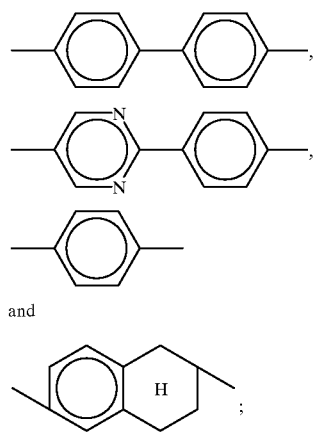

A is a group selected from the group consisting of

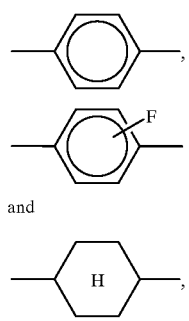

or a single bond;
B is a group selected from the group consisting of

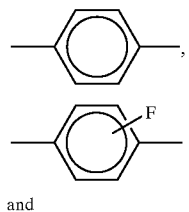

-continued

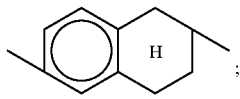;

R² is an alkyl group of 6 to 16 carbon atoms, with the proviso that hydrogen atoms in the alkyl group may be replaced with halogen atoms, a part of methylene groups and/or halomethylene groups in the alkyl group may be replaced with —O— group, and when methylene group(s) and/or halomethylene group(s) in the alkyl group are replaced with plural —O— groups, these plural —O— groups are not adjacent to each other;

R³ is a straight-chain alkyl group having carbon atoms of an odd number selected from 3, 5, 7 and 9, with the proviso that one of C—C bonds in the alkyl group may be interrupted by —COO— group, hydrogen atoms in the alkyl group may be replaced with halogen atoms other than an iodine atom, and a part of ethylene groups in the alkyl group may be each —CH=CH— or —C≡C—;

X' is a group selected from the group consisting of —CH₃ group, —CH₂F group, —CHF₂ group and —CF₃ group;

Y' is a group selected from the group consisting of —COO—, —CH₂O—, —CH₂CH₂— and —OCH₂— and B is

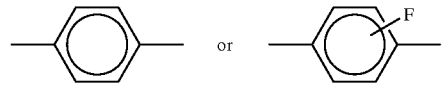

and R³ is an alkyl group containing the —COO— group.

5. The smectic liquid crystal composition as claimed in claim 4, wherein Z' in the formula (II) is

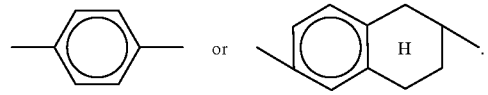.

6. The smectic liquid crystal composition as claimed in claim 5, wherein the antiferroelectric liquid crystal compound is represented by the following formula (Ia) and the liquid crystal compound is represented by the following formula (IIa);

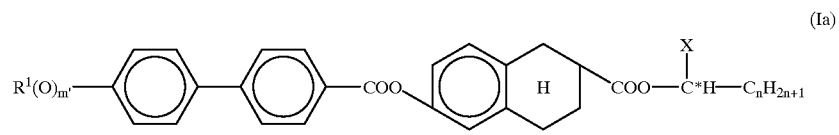

(Ia)

m' is an integer of 0 or 1, provided that R⁴s of said antiferroelectric liquid crystal compounds of the formula (I) and said liquid crystal compounds of the formula (II) are each an alkyl group having no —O— group, wherein R¹ is a straight-chain alkyl group of 6 to 16 carbon atoms,
n is an integer selected from 4 and 8,
X is —CH₃ group or —CF₃ group, and
m is an integer of 0 or 1;

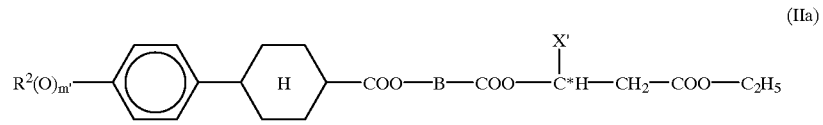

(IIa)

provided that R⁴ of said antiferroelectric liquid crystal compound of the formula (I) is selected from the group consisting of a C4 or C8 alkyl group containing no —O— group and a C4 or C6 alkyl group containing the —O— group, or provided that, in said liquid crystal compound of the formula (Ii), A is

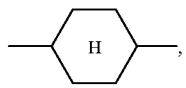, wherein

B is a group selected from the group consisting of

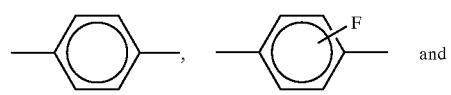

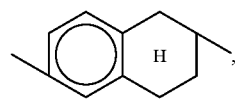,

R₂ is a straight-chain alkyl group of 6 to 16 carbon atoms,
X' is —CH₃ group or —CF₃ group, and
m' is an integer of 0 or 1.

7. The smectic liquid crystal composition as claimed in claim 5, wherein the antiferroelectric liquid crystal compound is represented by the following formula (Ib) and the liquid crystal compound is represented by the following formula (IIb);

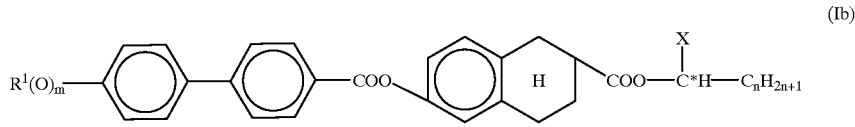
(Ib)

wherein
$R^1$ is the same group as that of $R^1$ in the formula (I),
n is an integer selected from 4, 6 and 8,
X is —$CH_3$ group or —$CF_3$ group, and
m is an integer of 0 or 1;

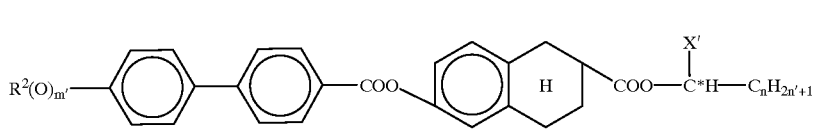
(IIb)

wherein
$R^2$ is the same group as that of $R^2$ in the formula (I),
n' is an integer selected from 3, 5, 7 and 9,
X' is —$CH_3$ group or —$CF_3$ group, and
m' is an integer of 0 or 1.

8. The smectic liquid crystal composition as claimed in claim 5, wherein the antiferroelectric liquid crystal compound is represented by the following formula (Ic) and the liquid crystal compound is represented by the following formula (IIc);

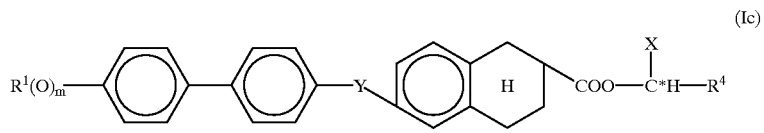
(Ic)

wherein
$R^1$, Y, $R^4$ and m have the same meanings as those of the corresponding symbols in the formula (I), and
X is —$CH_3$ group or —$CF_3$ group;

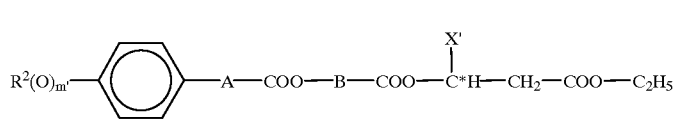
(IIc)

wherein

A, B, $R^2$ and m' have the same meanings as those of the corresponding symbols in the formula (II), and
X' is —$CH_3$ group or —$CF_3$ group,
provided that $R^4$ of said antiferroelectric liquid crystal compound is selected from the group consisting of a C4 or C8 alkyl group containing no oxygen atom and a C4 or C6 alkyl group containing an oxygen atom replaced with a carbon atom.

9. The smectic liquid crystal composition as claimed in claim 8, wherein Y is —COO— group.

10. The smectic liquid crystal composition as claimed in claim 8, wherein Y is —$CH_2O$— group.

11. The smectic liquid crystal composition as claimed in claim 8, wherein Y is —$CH_2CH_2$— group.

12. The smectic liquid crystal composition as claimed in claim 5, wherein the antiferroelectric liquid crystal compound is represented by the following formula (Id) and the liquid crystal compound is represented by the following formula (IId);

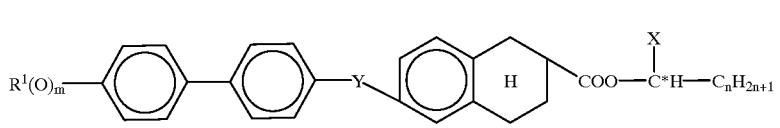
(Id)

wherein
R¹, Y and m have the same meanings as those of the corresponding symbols in the formula (I),
X is —CH₃ group or —CF₃ group, and
n is an integer selected from 4, 6 and 8;

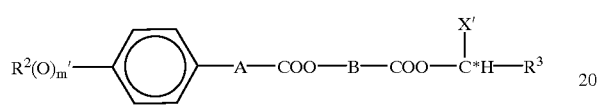
(IId)

wherein
A, B, R² and m' have the same meanings as those of the corresponding symbols in the formula (II),
R³ is a straight-chain hydrocarbon group of 4 to 8 carbon atoms, with the proviso that a hydrogen atom in the hydrocarbon group may be replaced with a halogen atom other than an iodine atom, and
X' is —CH₃ group or —CF₃ group.

13. A smectic liquid crystal composition having a parameter G of 0 to 0.3, said parameter G being defined by the following equation (B) with the proviso that: the liquid crystal composition is filled between a pair of transparent electrodes provided in a liquid crystal cell; two polarizing plates are arranged so that a polarized light output from one polarizing plate is transmitted by the liquid crystal cell and a polarized light having a polarization direction crossing that of the above polarized light at right angles is output from the other polarizing plate; the liquid crystal cell is arranged so that the light quantity (T) of the light output from the other polarizing plate varies in accordance with a voltage V applied between the transparent electrodes of the liquid crystal cell, to form a hysteresis curve which is substantially symmetrical with respect to the voltage of 0 (V=0) between a positive voltage region and a negative voltage region; and when the absolute value |V| of the voltage V is increased to the predetermined value $|V|_{min}$, the light quantity T becomes a maximum value $T_{max}$;

$$G = \frac{T_{max}/2 - T_{min}}{T_{max}/2 - T_0} \times \frac{S}{(T_{max} - T_{min}) \times |V|_{min}}$$ (B)

wherein $|V|_{min}$ and $T_{max}$ have the same meanings as described above; S is an area of a region enclosed with the V-T hysteresis curve shown in the positive or negative voltage region; $T_{min}$ is a minimum value of the light quantity T; and $T_0$ is a light quantity T given when no voltage is applied,
wherein said smectic liquid crystal composition comprises at least one antiferroelectric liquid crystal compounds represented by the following formula (I):

R¹(O)$_m$—Z—Y—E—COO—C*HX—R⁴ (I)

wherein

Z is a group selected from the group consisting of

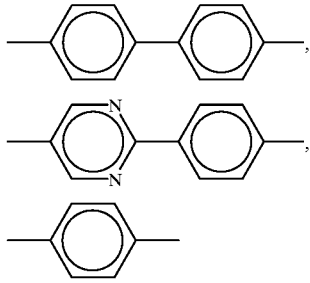

and

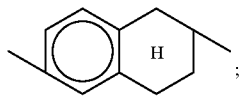

E is a group selected from the group consisting of

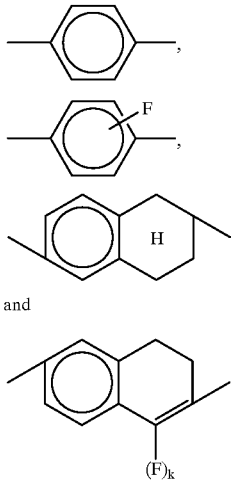

(F)$_k$ (k=0 or 1); and
R¹ is an alkyl group of 6 to 16 carbon atoms, with the proviso that hydrogen atoms in the alkyl group may be replaced with halogen atoms, a part of methylene groups and/or halomethylene groups in the alkyl group may be replaced with —O— group, and when methylene group(s) and/or halomethylene group(s) in the alkyl group are replaced with plural —O— groups, these plural —O— groups are not adjacent to each other;
R⁴ is a straight-chain alkyl group having carbon atoms of an even number selected from 4, 6 and 8 or a group wherein one methylene group in said straight-chain alkyl group is replaced with —O— group;
X is a group selected from the group consisting of —CH₃ group, —CH₂F group, —CHF₂ group and —CF₃ group;

Y is a group selected from the group consisting of —COO—, —CH$_2$O—, —CH$_2$CH$_2$— and —OCH$_2$—; and m is an integer of 0 or 1, and K is an integer of 0 or 1, and a liquid crystal compound represented by the following formula (II):

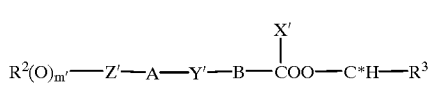
(II)

wherein

Z' is a group selected from the group consisting of

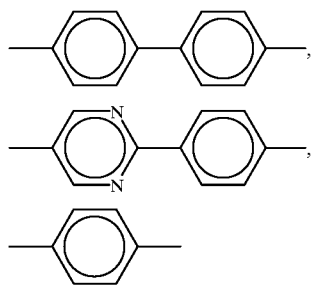

A is a group selected from the group consisting of

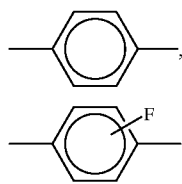

and

or a single bond;

B is a group selected from the group consisting of

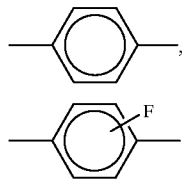

R$^2$ is an alkyl group of 6 to 16 carbon atoms, with the proviso that hydrogen atoms in the alkyl group may be replaced with halogen atoms, a part of methylene groups and/or halomethylene groups in the alkyl group may be replaced with —O— group, and when methylene group(s) and/or halomethylene group(s) in the alkyl group are replaced with plural —O— groups, these plural —O— groups are not adjacent to each other;

R$^3$ is a straight-chain alkyl group having carbon atoms of an odd number selected from 3, 5, 7 and 9, with the proviso that one of C—C bonds in the alkyl group may be interrupted by —COO— group, hydrogen atoms in the alkyl group may be replaced with halogen atoms other than an iodine atom, and a part of ethylene groups in the alkyl group may be each —CH=CH— or —C≡C—;

X' is a grip selected from the group consisting of —CH$_3$ group, —CH$_2$F group, —CHF$_2$ group and —CF$_3$ group;

Y' is a group selected from the group consisting of —COO—, —CH$_2$O—, —CH$_2$CH$_2$— and —OCH$_2$; and m' is an integer of 0 or 1, provided that R$^4$s of said antiferroelectric liquid crystal compounds of the formula (I) and said liquid crystal compounds of the formula (II) are each an alkyl group having no —O— group, provided that R$^4$ of said antiferroelectric liquid crystal compound of the formula (I) is selected from the group consisting of a C4 or C8 alkyl group containing no —O— group and a C4 or C6 alkyl group containing the —O— group, or provided that, in said liquid crystal compound of the formula (II), A is

B is

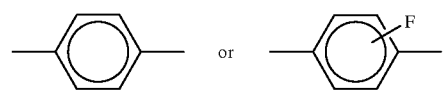

and R$^3$ is an alkyl group containing the —COO— group.

14. The liquid crystal composition as claimed in claim 13, wherein said composition contains 40 to 99% by weight of an antiferroelectric liquid crystal compound and 60 to 1% by weight of a ferroelectric liquid crystal compound.

15. The liquid crystal composition as claimed in claim 14, wherein the antiferroelectric liquid crystal compound is capable of being in a chiral smectic C$_A$* phase and the ferroelectric liquid crystal compound is capable of being in a chiral smectic C* phase.

16. The liquid crystal composition as claimed in claim 13, wherein said composition is a liquid crystal composition which is driven on an active matrix system.

17. A smectic liquid crystal composition having a parameter G of 0 to 0.3, said parameter G being defined by the following equation (B) with the proviso that: the liquid crystal composition is filled between a pair of transparent electrodes provided in a liquid crystal cell; two polarizing plates are arranged so that a polarized light output from one polarizing plate is transmitted by the liquid crystal cell and a polarized light having a polarization direction crossing that of the above polarized light at right angles is output from the other polarizing plate; the liquid crystal cell is arranged so that the light quantity (T) of the light output from the other polarizing plate varies in accordance with a voltage V applied between the transparent electrodes of the liquid crystal cell, to form a hysteresis curve which is substantially symmetrical with respect to the voltage of 0 (V=0) between a positive voltage region and a negative voltage region; and when the absolute value |V| of the voltage V is increased to the predetermined value $|V|_{min}$, the light quantity T becomes a maximum value $T_{max}$;

$$G = \frac{T_{max}/2 - T_{min}}{T_{max}/2 - T_0} \times \frac{S}{(T_{max} - T_{min}) \times |V|_{min}} \quad (B)$$

wherein $|V|_{min}$ and $T_{max}$ have the same meanings as described above; S is an area of a region enclosed with the V-T hysteresis curve shown in the positive or negative voltage region; $T_{min}$ is a minimum value of the light quantity T; and $T_0$ is a light quantity T given when no voltage is applied, wherein said smectic liquid crystal composition comprises at least two antiferroelectric liquid crystal compounds represented by the following formula (I):

$$R^1(O)_m—Z—Y—E—COO—C^*RX—R^4 \quad (I)$$

wherein

Z is a group selected from the group consisting of

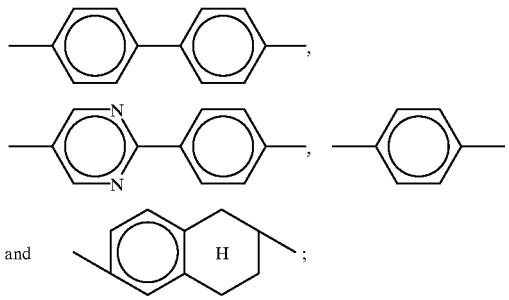

E is a group selected from the group consisting of

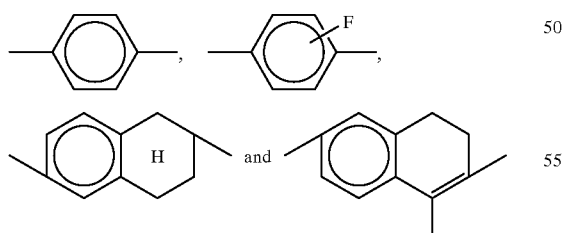

(k=0 or 1); and

R¹ is an alkyl group of 6 to 16 carbon atoms, with the proviso that hydrogen atoms in the alkyl group may be replaced with halogen atoms, a part of methylene groups and/or halomethylene groups in the alkyl group may be replaced with —O— group, and when methylene group(s) and/or halomethylene group(s) in the alkyl group are replaced with plural —O— groups, these plural —O— groups are not adjacent to each other;

R⁴ is a straight-chain alkyl group having carbon atoms of an even number selected from 4, 6 and 8 or a group wherein one methylene grip in said straight-chain alkyl group is replaced with —O— group;

X is a group selected from the group consisting of —CH₃ group, —CH₂F group, —CHF₂ group and —CF₃ group;

Y is a group selected from the group consisting of —COO—, —CH₂O—, —CH₂CH₂— and —OCH₂—; and m is an integer of 0 or 1, and K is an integer of 0 or 1, provided that at least one of Z and E in one of said antiferroelectric liquid crystal compounds of the formula (I) is

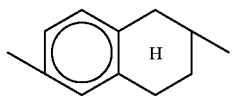

and R⁴s in both said antiferroelectric liquid crystal compounds of the formula (I) each is an alkyl group containing the —O— group, or provided that at least one of Z and E in one of said antiferroelectric liquid crystal compounds of the formula (I) is

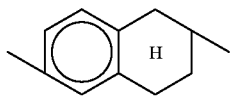

and R⁴ in one of said antiferroelectric liquid crystal compound of the formula (I) is an alkyl group containing no —O— group and R⁴ of the other antiferroelectric liquid crystal compound is selected from the group consisting of a C4 or C8 alkyl group having no —O— group, a C4 or C8 alkyl group having the —O— group and a C6 alkyl group having the —O— group which forms an —OCH₂CH₃ terminal group, or provided that one of Z and E in one of said antiferroelectric liquid crystal compounds of the formula (I) is

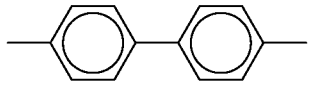

and the other is a group other than

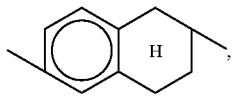

and R⁴ is selected from a C4 alkyl group containing the —O— group and a C6 alkyl group containing the —O— group which forms an —OCH₂CH₃ terminal group.

* * * * *